/ Patent Number: 5,688,437
Date of Patent: Nov. 18, 1997

United States Patent [19]
Sato et al.

[54] LIQUID CRYSTAL COMPOSITION, LIQUID CRYSTAL DEVICE USING THE COMPOSITION, LIQUID CRYSTAL APPARATUS AND DISPLAY METHOD

[75] Inventors: Koichi Sato, Atsugi; Hiroyuki Kitayama, Isehara; Kenji Shinjo, Atsugi; Katsutoshi Nakamura, Hiratsuka; Shinichi Nakamura, Isehara, all of Japan

[73] Assignee: Canon Kabushiki Kaisha, Tokyo, Japan

[21] Appl. No.: 422,262

[22] Filed: Apr. 14, 1995

[30] Foreign Application Priority Data

Apr. 14, 1994 [JP] Japan ................ 6-075929
Apr. 14, 1994 [JP] Japan ................ 6-075930
Jul. 26, 1994 [JP] Japan ................ 6-174088

[51] Int. Cl.⁶ ........... C09K 19/34; C09K 19/32; C09K 19/12; C09K 19/20
[52] U.S. Cl. ........... 252/299.61; 252/299.62; 252/299.66; 252/299.01; 252/299.63; 252/299.67; 252/299.4; 252/299.64; 252/299.6
[58] Field of Search ........... 252/299.61, 299.62, 252/299.66, 299.67, 299.01, 299.6, 299.65, 299.63, 299.4, 299.64

[56] References Cited

U.S. PATENT DOCUMENTS 4,367,924  1/1983  Clark et al. ................ 359/56 X
4,798,680  1/1989  Nohira et al. ................ 252/299.01

(List continued on next page.)

FOREIGN PATENT DOCUMENTS 0255236   2/1988  European Pat. Off. .
0360521   3/1990  European Pat. Off. .
4034123   4/1992  Germany .
56-107216  8/1981  Japan .
2069443   3/1990  Japan .
2142753   5/1990  Japan .
2196785   8/1990  Japan .
3072466   3/1991  Japan .
29984     1/1992  Japan .
4013649   1/1992  Japan .
4026679   1/1992  Japan .

(List continued on next page.)

OTHER PUBLICATIONS

Research Disclosure (British), vol. 224, No. 345 (1993) 34573.
D. Coates and G.W. Gray, The Liquid Crystal Properties of Some Cyano-Substituted Aryl Esters, 1976, pp. 249-262, Molecular Crystals and Liquid Crystals, v. 37, No. 1-4.

(List continued on next page.)

Primary Examiner—C. H. Kelly
Attorney, Agent, or Firm—Fitzpatrick, Cella, Harper & Scinto

[57] ABSTRACT

A liquid crystal composition includes a liquid crystal containing at least one mesomorphic compound having a cholesteric phase (Ch phase)-free mesomorphic phase, and at least one compound (e) having a limit of solubility in the liquid crystal and being contained in the composition in a proportion ranging from 20% of the limit of solubility to below the limit of solubility. The liquid crystal composition may preferably include the liquid crystal containing at least one fluorine-containing mesomorphic compound (a) having a fluorocarbon terminal portion and a hydrocarbon terminal portion, and at least one achiral compound (b), a the compound (e), having a specific ring structure and a specific terminal alkyl group free from a perfluorocarbon atom. The compound having a Ch phase-free mesomorphic phase, preferably the compound (a), and the compound (e), preferably the compound (b) are effective in providing the liquid crystal composition with a layer structure of so-called bookshelf or a layer structure having a small inclination angle (closer to bookshelf structure). The liquid crystal composition is useful in improving response characteristics and display characteristics, particularly a contrast ratio, of a liquid crystal device using the liquid crystal composition.

64 Claims, 7 Drawing Sheets

L. C. MOLECULE

Iso PHASE

Ch PHASE

SmA PHASE

Sm C PHASE

U.S. PATENT DOCUMENTS

| | | | |
|---|---|---|---|
| 4,876,027 | 10/1989 | Yoshinaga et al. | 252/299.65 |
| 4,886,619 | 12/1989 | Janulis | 252/299.1 |
| 5,082,587 | 1/1992 | Janulis | 252/299.01 |
| 5,098,600 | 3/1992 | Nakamura et al. | 252/299.61 |
| 5,116,530 | 5/1992 | Togano et al. | 252/299.61 |
| 5,176,845 | 1/1993 | Yamada et al. | 252/299.61 |
| 5,190,688 | 3/1993 | Sage et al. | 252/299.01 |
| 5,240,637 | 8/1993 | Shinjo et al. | 252/299.61 |
| 5,244,595 | 9/1993 | Yamada et al. | 252/299.61 |
| 5,244,596 | 9/1993 | Takiguchi et al. | 252/299.61 |
| 5,250,217 | 10/1993 | Shinjo et al. | 252/299.61 |
| 5,250,219 | 10/1993 | Mori et al. | 252/299.61 |
| 5,262,082 | 11/1993 | Janulis et al. | 252/299.01 |
| 5,350,539 | 9/1994 | Mishina et al. | 252/299.4 |
| 5,385,692 | 1/1995 | Iwaki et al. | 252/299.62 |
| 5,399,291 | 3/1995 | Janulis et al. | 252/299.01 |
| 5,417,883 | 5/1995 | Epstein et al. | 252/299.01 |
| 5,482,650 | 1/1996 | Janulis et al. | 252/299.01 |

FOREIGN PATENT DOCUMENTS

| | | |
|---|---|---|
| 4046176 | 2/1992 | Japan . |
| 4128274 | 4/1992 | Japan . |
| 4211674 | 8/1992 | Japan . |
| 7010849 | 1/1993 | Japan . |
| 5262678 | 10/1993 | Japan . |
| 128235 | 5/1994 | Japan . |
| WO90 01021 | 2/1990 | WIPO . |
| WO91 00897 | 1/1991 | WIPO . |
| 93/22396 | 11/1993 | WIPO . |
| WO93 22396 | 11/1993 | WIPO . |

OTHER PUBLICATIONS

Yukio Ouchi et al., Smectic C Chevron Layer Structure Studied by X–Ray Diffraction, May 1988, pp. L725–L728, Japanese Journal of Applied Physics, v. 27.

H. Zaschke, 5–n–Alkyl–2–(4–n–alkoxy–phenyl)–pyrimidine, 1975, pp. 617–630, Journal Für Praktische Chemie, 317,4.

J.P. Van Meter and B.H. Klanderman, Mesomorphic Properties of Some Phenyl Benzoate Derivatives, 1973, pp. 271–284, Molecular Crystals and Liquid Crystals, v. 22, No. 3 and 4.

M. Schadt and W. Helfrich, Voltage–Dependent Optical Activity of a Twisted Nematic Liquid Crystal, Feb. 15, 1971, pp. 127–128, Applied Physics Letters, v. 18, No. 4.

A.D. L. Chandani et al., Tristable Switching in Surface Stabilized Ferroelectric Liquid Crystals with a Large Spontaneous Polarization, May 1988, pp. L729–L732, Japanese Journal of Applied Physics, v. 27, No. 5.

Fukuda et al., Structures and Properties of Ferroelectric Liquid Crystals (1990) 344–357.

Epstein et al., The 4th Internal Ferroelectric Liquid Crystal Conference p. 46 (1993) 169–170.

Fukuda, Future Liquid Crystal Display and its Materials, Section 3.1 (1992) 37–72.

FIG. 7A-1
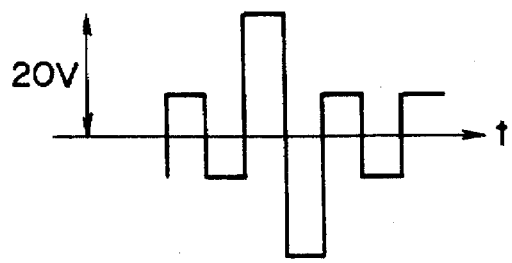
FIG. 7A-2
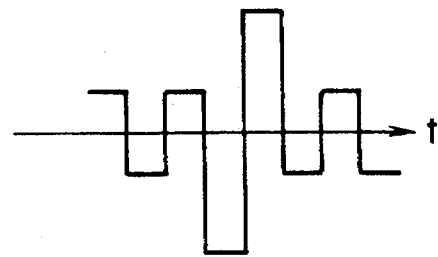
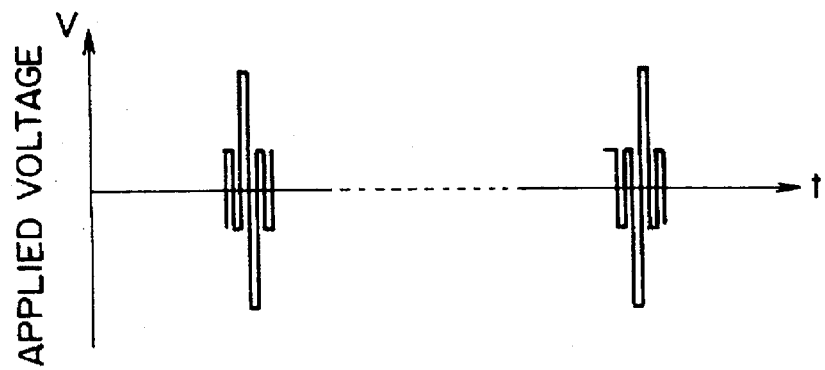
FIG. 7A
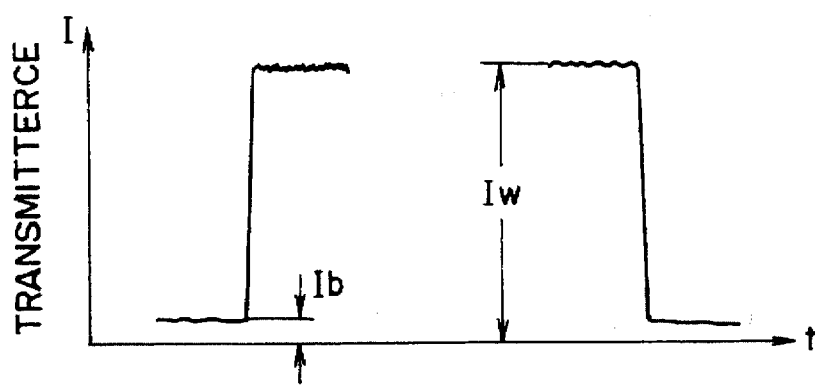
FIG. 7B

LIQUID CRYSTAL COMPOSITION, LIQUID CRYSTAL DEVICE USING THE COMPOSITION, LIQUID CRYSTAL APPARATUS AND DISPLAY METHOD

FIELD OF THE INVENTION AND RELATED ART

The present invention relates to a liquid crystal composition, particularly a chiral smectic liquid crystal composition, and a liquid crystal device using the liquid crystal composition, including a light-valve for use in flat-panel displays, projection displays, printers, etc. The present invention also relates to a liquid crystal apparatus using the device particularly as a display device, and a display method of using the composition.

There has been known a cathode ray tube (CRT) as a display device. The CRT has widely been used as a display terminal for outputting motion pictures of a television receiver or a video tape recording (VTR) apparatus or used as a monitor for a personal computer. However, the CRT encounters problems when outputs still images, in view of its characteristics, such that visibility or observability is liable to be lowered by, e.g., scanning fringe due to flicker or insufficient resolution and that degradation or deterioration of a fluorescent substance due to a surface memory is caused to occur in some cases. In recent years, it has been found that an electromagnetic wave generated by the CRT adversely affects the human body. As a result, the CRT can break the health of video display terminal (VDT) operators in some cases. In addition, the CRT has a structure including a large volume behind a picture area (display portion), whereby space-saving utilization of an office or a house in which the CRT is used is hindered.

Liquid crystal devices have been used as a display device having solved the above-mentioned problems of the CRT. For instance, there have been known liquid crystal devices using use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

One of the above-mentioned TN-type liquid crystal devices is a simple matrix-type liquid crystal device having the advantage of inexpensive production costs. When the liquid crystal device is driven by using an electrode matrix structure with an improved pixel density in accordance with a multiplex driving scheme, the liquid crystal device is liable to encounter a problem of occurrence of crosstalk, so that the number of pixels is restricted. Further, the uses of the device as a display device is also limited since the response speed is too slow, i.e., on the order of at least several milli-seconds.

In recent years, there have been proposed liquid crystal devices using a thin film transistor (TFT). These liquid crystal devices can control a display state pixel by pixel since each pixel is provided with a transistor, whereby the devices solve problems of crosstalk and response speed. However, as these devices have a larger picture area, it is industrially more difficult to prepare a liquid crystal device with no defective pixels. Even if it is possible to prepare such a liquid crystal device, the device is more expensive.

To overcome the above-mentioned drawbacks of such conventional liquid crystal devices, the use of liquid crystal devices using a liquid crystal material having bistability has been proposed by Clark and Lagerwall (e.g. Japanese Laid-Open Patent Appln. (JP-A) No. 56-107216; U.S. Pat. No. 4,367,924, etc.). In this instance, as the liquid crystal material having bistability, a ferroelectric liquid crystal having chiral smectic C-phase (SmC*) or H-phase (SmH*) is generally used. The ferroelectric liquid crystal can effect inversion switching due to its spontaneous polarization, thus showing a very high response speed. Further, the ferroelectric liquid crystal shows bistable states (bistability) having a memory characteristic and is excellent in view angle characteristics, so that a liquid crystal device using a ferroelectric liquid crystal is considered suitable for a display device or light-valve having properties including high-speed responsiveness, high resolution and a large picture area. In recent years, there has been proposed an anti-ferroelectric chiral smectic liquid crystal device using three stable states, as described in "Japanese Journal of Applied Physics" vol. 27, p. L729 (1988) by Chanani and Takezoe et al.

Such a liquid crystal device using a chiral smectic liquid crystal, however, encounters a problem such that a contrast ratio is lowered by occurrence of a zig-zag alignment defect in some cases, as described in "Structures and Properties of Ferroelectric Liquid Crystals" (1990) by Atsuo Fukuda and Hideo Takezoe issued by Corona Publishing Co. Ltd. (Tokyo Japan). The reason why the zigzag defect occurs may be attributable to the fact that a layer of a chiral smectic liquid crystal disposed between a pair of substrates constituting a cell structure includes two kinds of chevron layer structures.

In order to solve the above problem, there has been known a method wherein a chevron layer structure is caused to align in one direction by providing a prescribed pretilt angle and a twisted state of liquid crystal molecules between an upper and lower substrates is changed to a uniform state.

On the other hand there has been the recent trend in layer structure of a (chiral smectic) liquid crystal wherein a high contrast ratio is intended to be realized by suppressing a chevron layer structure resulting in a low contrast ratio and providing the liquid crystal with a bookshelf layer structure (hereinafter referred to as "bookshelf structure") in which boundaries of each liquid crystal layer are disposed in parallel with each other or with a structure closer to the bookshelf structure (e.g., Atsuo Fukuda (Editor)) "Future Liquid Crystal Display and its Materials (Zisedai Ekisho Display To Ekisho Zairyo)" (1992), issued by K. K. CMC (Tokyo Japan). One of methods for realizing a bookshelf structure is a method of using a naphthalene-based liquid crystal material having a particular structure. In this method, however, the resultant liquid crystal device has a tilt angle of about 10 degrees, which is considerably smaller than an ideal tilt angle of 22.5 degrees providing a maximum transmittance, thus resulting in a low transmittance or a low contrast. In addition, such a liquid crystal material fails to exhibit a bookshelf structure reversibly with respect to temperature in many cases. Another method for giving a bookshelf structure may include one inducing a bookshelf structure by externally applying an electric field to a liquid crystal device. Such a method, however, involves a problem of unstability against external stimuli such as temperature. In addition, various other problems are presumably present in order to put a liquid crystal material exhibiting a bookshelf structure into practical use since such a material has just discovered or proposed.

Further, in recent years, there have been proposed a mesomorphic (liquid crystal) compound having a perfluoroether terminal portion (U.S. Pat. Nos. 5,082,587 and 5,262,082 and Internal Publication No. WO93/22396) and a liquid crystal composition (Ken A. Epstein: The 4th Internal Ferroelectric Liquid Crystal Conference, P-46 (1993)) as materials exhibiting a bookshelf structure or a structure closer thereto. By using these liquid crystal materials, it is possible to provide a bookshelf structure or a structure showing a small layer inclination angle and being closer to the bookshelf structure without using external fields such as an external electric field. These liquid crystal materials also provide the optimum tilt angle.

However, these liquid crystal materials (compounds and compositions) are required to show a further improved alignment state and involve problems such that the above-mentioned bookshelf structure or the structure closer thereto having a small layer inclination angle is unstable against a temperature change, that a tilt angle is excessively large thereby to provide a poor transmittance, and that many of the above liquid crystal materials do not have a cholesteric phase, so that it has been difficult to finally obtain a sufficiently good alignment state in many cases.

SUMMARY OF THE INVENTION

An object of the present invention is to provide a liquid crystal composition, particularly a chiral smectic liquid crystal composition showing a good alignment state and stably exhibiting a bookshelf structure or a structure, having a small layer inclination angle, closer to the bookshelf structure against a temperature change, thereby to realize a liquid crystal device having improved properties such as high responsiveness, high contrast, high definition and high brightness.

Another object of the present invention is to provide a large picture area-liquid crystal device stably exhibiting the above mentioned properties.

Another object of the present invention is to provide a large-area liquid crystal device having the above-mentioned improved properties by using the above liquid crystal composition, a liquid crystal apparatus particularly a liquid crystal display apparatus showing excellent display characteristics by using the above liquid crystal device, and a display method using the above liquid crystal composition or the liquid crystal device.

According to the present invention, there is provided a liquid crystal composition, comprising:

at least one fluorine-containing mesomorphic compound (a) comprising a fluorocarbon terminal portion having at least one caternary ether oxygen and a hydrocarbon terminal portion, the terminal portions being connected by a central core, the compound (a) having smectic phase or having latent smectic phase; and at least one achiral compound (b) comprising: a substituted or unsubstituted central ring structure containing at least one ring, capable of having an element different from carbon atom, selected from a cycloaliphatic ring, an aromatic ring, and a fused ring of these rings and containing a first linkage connected with said ring; and comprising one or two unsubstituted or substituted terminal alkyl groups free from a perfluorocarbon atom connected with said central ring structure by a second linkage.

According to the present invention, there is also provided a liquid crystal composition, comprising:

a liquid crystal comprising one or at least two mesomorphic compounds, said liquid crystal (c) comprising at least one fluorine-containing mesomorphic compound (a) comprising a fluorocarbon terminal portion and a hydrocarbon terminal portion, the terminal portions being connected by a central core, the fluorine-containing mesomorphic compound having smectic phase or having latent smectic phase; and at least one compound (d) having a limit of solubility in the liquid crystal (c), said liquid crystal composition containing said compound (d) in a proportion ranging from 20% of the limit of solubility to below the limit of solubility.

According to the present invention, there is further provided a liquid crystal composition, comprising: a liquid crystal comprising at least one mesomorphic compound having a mesomorphic phase free from cholesteric phase; and at least one compound (e) having a limit of solubility in the liquid crystal, said liquid crystal composition containing said compound (e) in a proportion ranging from 20% of the limit of solubility to below the limit of solubility.

The present invention provides a liquid crystal device comprising a pair of electrode plates and any one of the liquid crystal compositions described above disposed between the electrode plates.

The present invention further provides a liquid crystal apparatus including the liquid crystal device, particularly including a display panel comprising the liquid crystal device.

The present invention still further provides a display method of using any one of the liquid crystal compositions described above and controlling the alignment direction of liquid crystal molecules in accordance with image data to effect display.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7A, 7A-1 and 7A-2 show a driving waveform for use in measurement of contrast adopted in Examples appearing hereinafter and FIG. 7B is a graph showing a relationship between time and transmittance detected in measurement of contrast in the Examples.

DETAILED DESCRIPTION OF THE INVENTION

The liquid crystal composition according to a first aspect of the present invention is characterized by using the fluorine-containing mesomorphic compound (a) and the achiral compound (b) respectively described above in combination.

The liquid crystal composition of the present invention may preferably be a chiral smectic liquid crystal composition and more preferably be a ferroelectric liquid crystal composition. When the liquid crystal composition of the present invention is used in a liquid crystal device, a liquid crystal layer can exhibit a bookshelf structure or a structure closer thereto having a small layer inclination angle without using, e.g., an external electric field. In addition, such a liquid crystal composition further improves a uniform alignment characteristic and a stability against a temperature change with respect to the above layer structure (i.e., bookshelf structure or a structure closer thereto).

Figure 2:
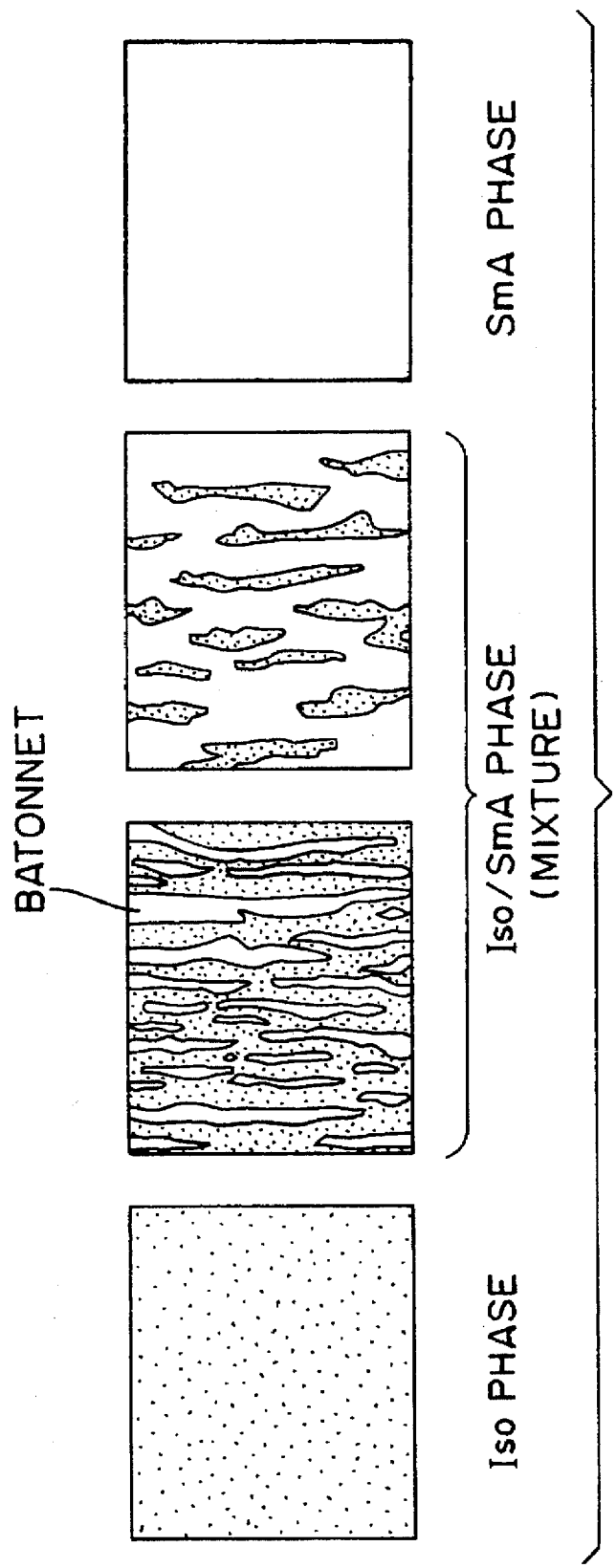
FIG. 2 is a set of schematic views illustrating the course of a phase transition of a liquid crystal exhibiting no cholesteric phase.

More specifically, by mixing the mesomorphic compound (a) with the achiral compound (b) containing a terminal alkyl group having no perfluorocarbon atom specifically described hereinbelow to constitute a liquid crystal composition, it is possible to moderate a temperature change of a spacing of a liquid crystal layer at the time of forming batonnets, i.e., a seed liquid crystal or an elongated shape region as shown in FIG. 2, in a mesomorphic phase at high temperature, e.g., in a isotropic phase (Iso)—smectic A phase (SmA) mixture phase at around a phase transition temperature from Iso to SmA, thus resulting in an improved alignment state.

The compound (a) used in the liquid crystal composition of the invention contains a fluorocarbon terminal portion having a caternary ether oxygen, preferably a terminal perfluoroether group. The compound (a) has a smectic (mesomorphic) phase or a latent smectic (mesomorphic) phase. Herein, the compound (a) having a latent smectic phase means a compound not showing a smectic phase by itself but showing a smectic phase when used together with a compound having a smectic phase or another compound having a latent smectic phase.

On the other hand, the compound (b) used in combination with the compound (a) has a central ring structure having at least one ring and an alkyl group which has not a perfluorocarbon atom. Herein, "perfluorocarbon atom" means all of carbon atoms of an alkyl group in which a terminal chain (e.g., —$CH_3$) is trifluorinated (i.e., —$CF_3$) and an inner chain (e.g., —$CH_2$—) is difluorinated (i.e., —$CF_2$—). Examples of an alkyl group having perfluorocarbon atom may preferably include a perfluoroalkyl group, a perfluoroalkylene group and a perfluoroether group. The central ring structure of the compound (b) may preferably have at least two rings. Examples of such a ring may include those identical to those for $\gamma^1$, $\gamma^2$ and $\gamma^3$ in the formula (II) appearing hereinafter. The above mentioned at least two rings are connected with each other by a first linkage such as a divalent group including those identical to those for $\beta^1$, $\beta^2$ and $\beta^3$ in the formula (II). The central ring structure and one or two terminal alkyl groups free from a perfluorocarbon atom are connected with each other by a second linkage, examples of which include those identical to those for $\beta^1$ and $\beta^4$ in the formula (II).

Hereinbelow, the fluorine-containing mesomorphic compound (a) will be explained more specifically.

The term "mesomorphic compound" used herein covers not only a compound assuming a mesomorphic (liquid crystal) phase but also a compound not assuming a mesomorphic phase per se as long as a liquid crystal composition containing such a compound assumes a mesomorphic phase.

The mesomorphic compound (a) used in the liquid crystal composition of the invention may preferably have —$D(C_xF_{2x+1}O)_zC_yF_{2y+1}$ in which x is independently 1–10 for each $C_xF_{2x+1}O$ group;
y is 1–10;
z is 1–10; and D is a single bond, —COO—$C_rH_{2r}$—, —O$C_rH_{2r}$—, —O—$(C_sH_{2s}O)_tC_rH_{2r}$—, —OSO$_2$—, —SO$_2$—, —SO$_2$—$C_rH_{2r}$—, —$C_rH_{2r}$—N($C_pH_{2p+1}$)—SO$_2$—, or —$C_rH_{2r}$—N($C_pH_{2p+1}$)—CO— wherein r and r' are independently 1–20, s is independently 1–10 for each $C_sH_{2s}O$ group, t is 1–6 and p is 0–4.

The mesomorphic compound (a) having —$D(C_xF_{2x+1}O)_zC_yF_{2y+1}$ (perfluoroether group) is effective in readily providing a bookshelf structure.

The mesomorphic compound (a) may preferably have a central core containing at least two ring structures capable of having a substituent and at least one linkage. Examples of the ring structures may include aromatic rings; heteroaromatic rings containing at least one heteroatom of N, O or S; alicycles (or cycloaliphatic rings) capable of having one or two non-adjacent —$CH_2$— groups replaced by O or S; and fused rings of these rings. Examples of the linkage may include a single bond, —COO—, —COS—, —HC=N— or —COSe—.

The mesomorphic compound (a) may preferably be replaced by the following formula (I):

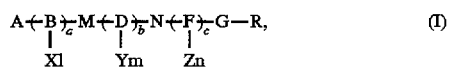

in which

B, D and F independently denote

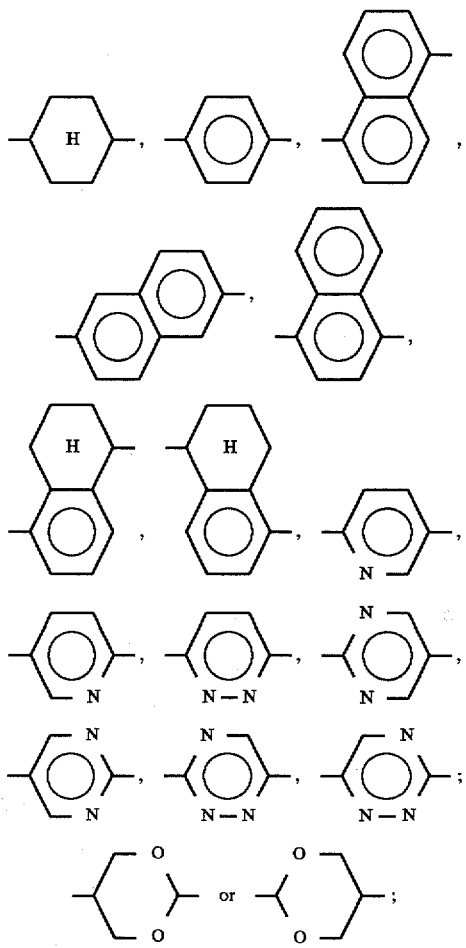

a, b and c independently denote an integer of 0–3 with the proviso that a+b+c is at least 2;

M and N independently denote —COO—, —OCO—, —COS—, —SCO—, —COSe—, —SeCO—, —COTe—, —TeCO—, $-(CH_2CH_2)_d-$ wherein d is an integer of 1–4, —CH=CH—, -C≡C—, —CH=N—, —N=CH—, —CH$_2$O—, —OCH$_2$—, —CO—, —O— or a single bond;

X, Y and Z independently denote —H, —Cl, —F, —Br, —I, —OH, —OCH$_3$, —CF$_3$, —OCF$_3$—, —CH$_3$, —CN or —NO$_2$ and l, m and n independently denote an integer of 0–4;

G is —COO—C$_e$H$_{2e}$—, —O—C$_e$H$_{2e}$—, —C$_e$H$_{2e}$—, —OSOO—, —OOSO—, —SOO—, —SOOC$_e$H$_{2e}$—, —O(C$_e$H$_{2e}$—O)$_q$C$_{e'}$H$_{2e'}$—, —C$_e$H$_{2e}$—N(C$_p$H$_{2p+1}$)—SO$_2$—, —C$_e$H$_{2e}$—N(C$_p$H$_{2p+1}$)—CO— wherein e and e' independently denote an integer of 1–20, q is an integer of 1–6 and p is an integer of 0–4;

A is a linear or branched group represented by —O—(C$_f$H$_{2f}$)$_w$O—C$_g$H$_{2g+1}$, $-(C_fH_{2f}-O)_w C_gH_{2g+1}$, —C$_f$H$_{2f}$—R', —O—C$_f$H$_{2f}$—R', —COO—C$_f$H$_{2f}$—R', —OCO—C$_f$H$_{2f}$—R' wherein R' is —Cl, —F, —CF$_3$, —NO$_2$, —CN, —H, —COO—C$_f$H$_{2f+1}$ or —OCO—C$_f$H$_{2f+1}$ in which f, f' and g independently denote an integer of 1–20 and w is an integer of 1–10; and R is $-(C_xF_{2x}O)_z-C_yF_{2y+1}$ wherein x is independently an integer of 1–10 for each C$_x$F$_{2x}$O group, y is an integer of 1–10, and z is an integer of 1–10.

In view of ease of more stably allowing a bookshelf structure or its closer structure, z in $-(C_xF_{2x}O)_z-$ for R may preferably be an integer of 1–6.

The mesomorphic compound (a) (preferably having the formula (I)) may be synthesized through processes similar to those descried in U.S. Pat. No. 5,262,082 and WO93/22936. Examples of the mesomorphic compound (a) of the formula (I) may include those (Example Compound Nos. I-1 to I-20) shown below.

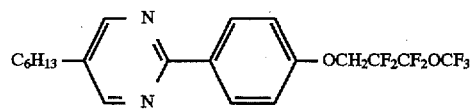

I-1

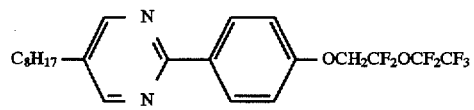

I-2

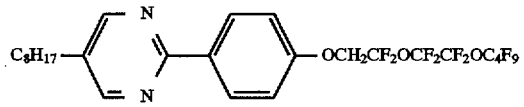

I-3

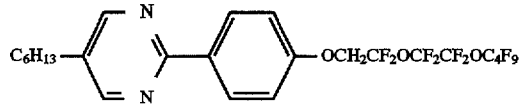

I-4

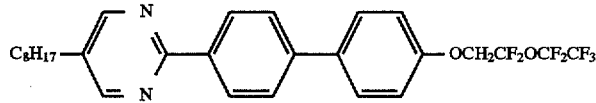

I-5

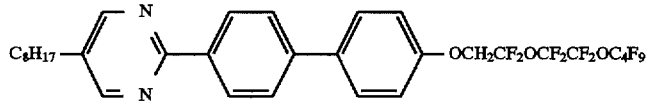

I-6

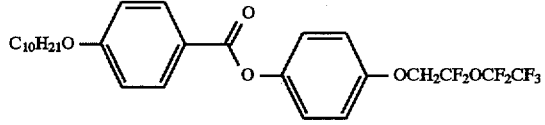

I-7

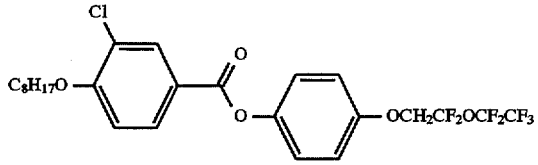

I-8

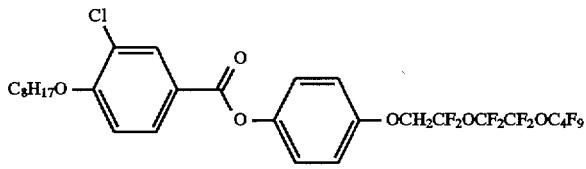

I-9

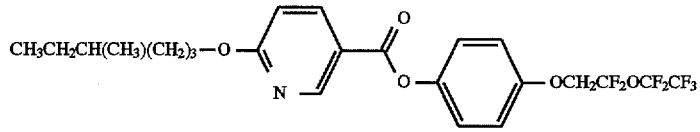 I-10
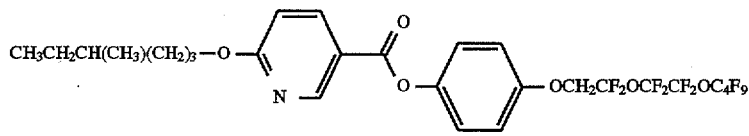 I-11
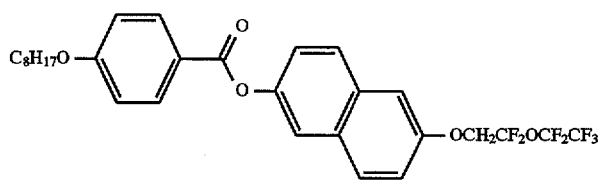 I-12
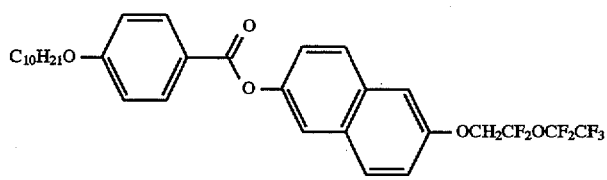 I-13
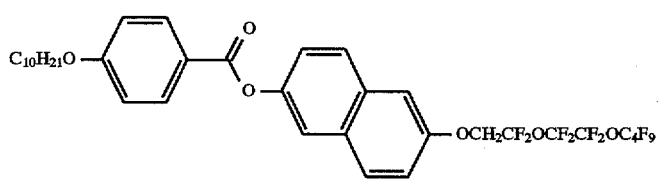 I-14
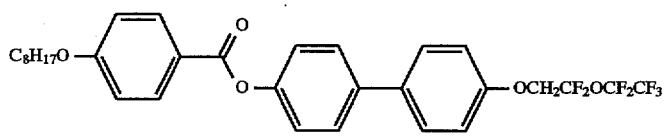 I-15
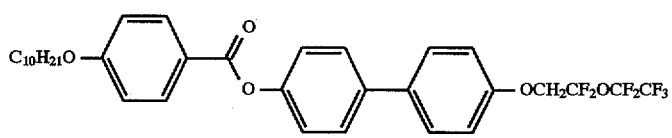 I-16
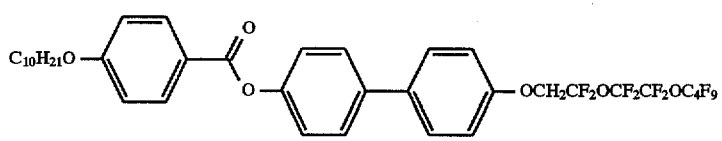 I-17
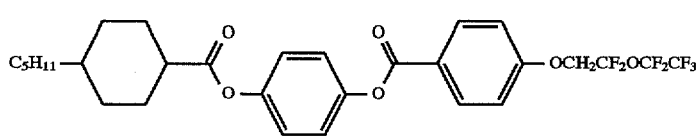 I-18
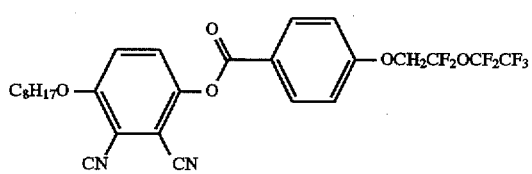 I-19

-continued

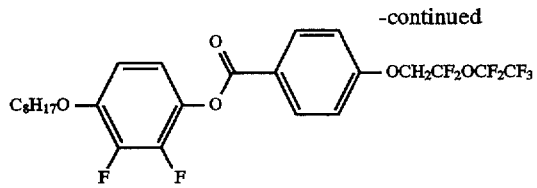

I-20

Among the mesomorphic compounds of the formula (I), a fluorine-containing mesomorphic compound having a phenyl-pyrimidine skeleton and represented by the formula shown below may preferably be used since the compound of the formula is effective in providing a resultant liquid crystal composition with a chiral smectic C phase in a wide temperature range including room temperature and with a low viscosity.

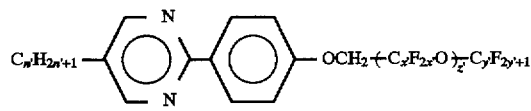

in which n' is an integer of 5–10, x' is independently an integer of 1–3 for each $C_{x'}F_{2x'}O$ group, y' is an integer of 1–4, and z' is an integer of 1–3.

Hereinbelow, the optically active compound (b) used together with the mesomorphic compound (a) will be explained in detail.

The achiral compound (b) may preferably be a mesomorphic compound, and the compound (b) is effective in improving an alignment characteristic and a temperature dependence of a layer structure or a layer spacing (i.e., a hysteresis phenomenon of a layer spacing with respect to a temperature range) when used together with the mesomorphic compound (a).

With respect to a temperature hysteresis phenomenon of a layer structure, i.e., a stability of a layer structure against a temperature change, of the above-mentioned compound (a), there has been known that such a phenomenon is observed at a temperature where a layer spacing exceeds that a phase transition temperature from smectic A (SmA) phase to smectic C (SmC) phase (The 16th Liquid Crystal Discussion, 2K113). By mixing the achiral compound (b) with such a mesomorphic compound (a) to constitute a liquid crystal composition, a layer inclination angle δ is approximated to that of a bookshelf structure to suppress an increase in a layer spacing and broaden a temperature range not causing the above-mentioned temperature hysteresis phenomenon of a layer structure.

The achiral compound (b) used in the present invention may preferably be a mesomorphic compound. The achiral compound (b) may preferably have one or two terminal alkyl groups having an unsubstituted linear alkyl group or an unsubstituted linear alkyl group since such a compound (b) is readily synthesized and has a particularly excellent stability in addition to the above effects of improving an alignment characteristic and a temperature hysteresis phenomenon (or temperature dependence) of a layer structure.

The compound (b) may preferably be represented by the following formula (II):

$$\alpha^1—\beta_1—(\gamma^1)_{a'}—\beta^2—(\gamma^2)_{b'}—\beta^3—(\gamma^3)_{c'}—\beta^4—\alpha^2 \quad (II),$$

in which $\alpha^1$ and $\alpha^2$ independently denote a linear or branched alkyl group having 1–20 carbon atoms, $\gamma^1$, $\gamma^2$ and $\gamma^3$ independently denote 1,4-phenylene capable of having one or two substituents comprising F, Cl, Br, $CH_3$, $CF_3$ and/or CN; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl, thiazole-2,5-diyl; thiadiazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$\beta^1$, $\beta^2$, $\beta^3$ and $\beta^4$ independently denote a single bond, —COO—, —OCO—, —COS—, —SCO—, —$CH_2O$—, —$OCH_2$—, —$CH_2CH_2$—, —CH=CH— or —C≡C—; and a', b' and c' are independently an integer of 0–3 with the proviso that a'+b'+c' is at least 2.

In view of the alignment-improving effect and the temperature dependence-improving effect with respect to a layer structure, the compound (b) may more preferably be a mesomorphic compound represented by any one of the following formulae (III) to (XVI):

Formula (III)

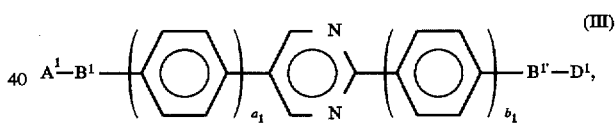

in which $A^1$ is a linear or branched alkyl group having 1–20 carbon atoms;

$B^1$ and $B^{1'}$ independently denote a single bond, —O—, —COO— or —OCO—;

$D^1$ is a linear or branched alkyl group having 1–20 carbon atoms or —$(C_2H_4O)_{n1}R^1$ wherein n1 is an integer of 1–5 and $R^1$ is a linear or branched alkyl group having 1–15 carbon atoms; and $a_1$ and $b_1$ are independently 0, 1 or 2 with the proviso that $a_1+b_1$ is at least 1.

The above mesomorphic compound of the formula (III) having a phenyl-pyrimidine skeleton as a central ring structure can be synthesized through a process as described in J. Prakt. Chem., vol. 317, P.617 (1975).

Specific examples of the mesomorphic compound of the formula (III) may include those shown below.

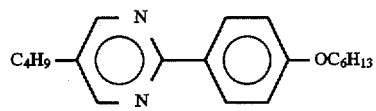

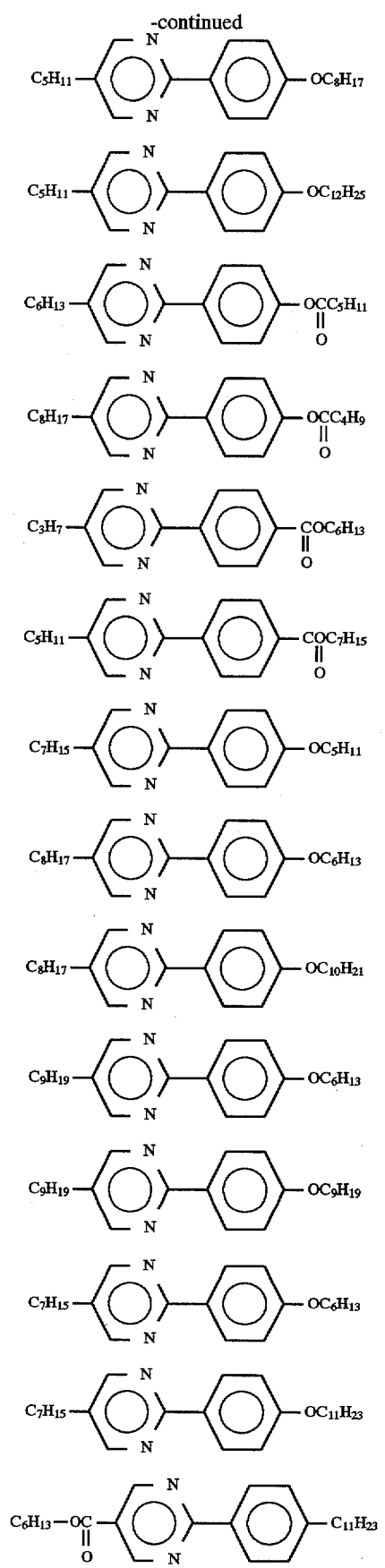
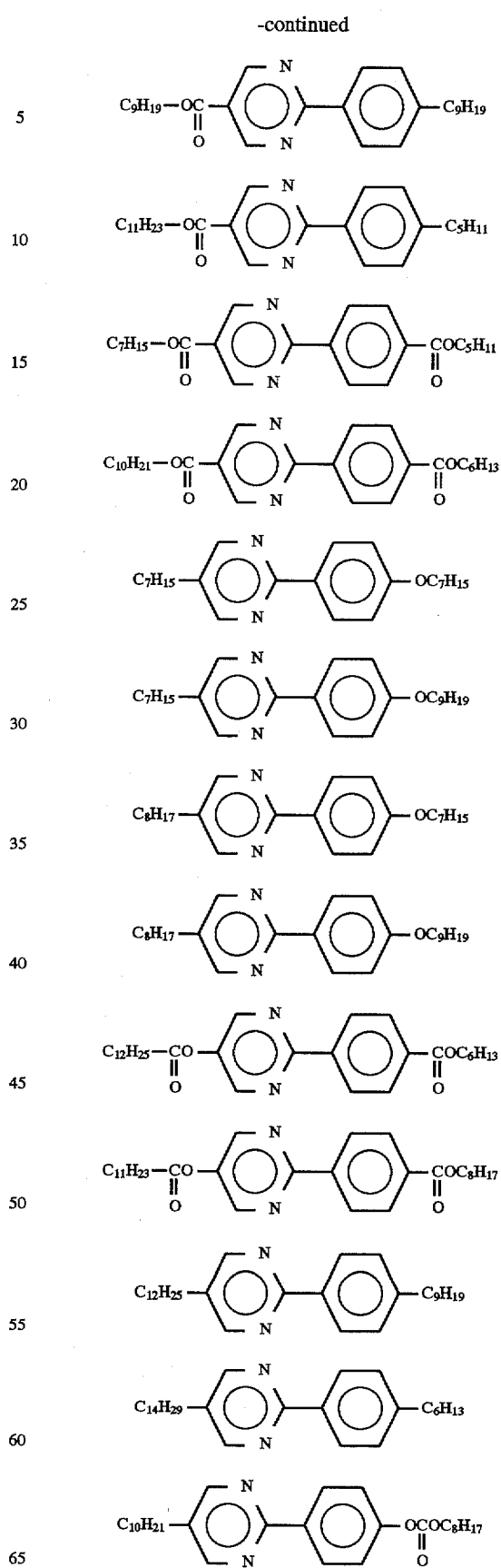

-continued
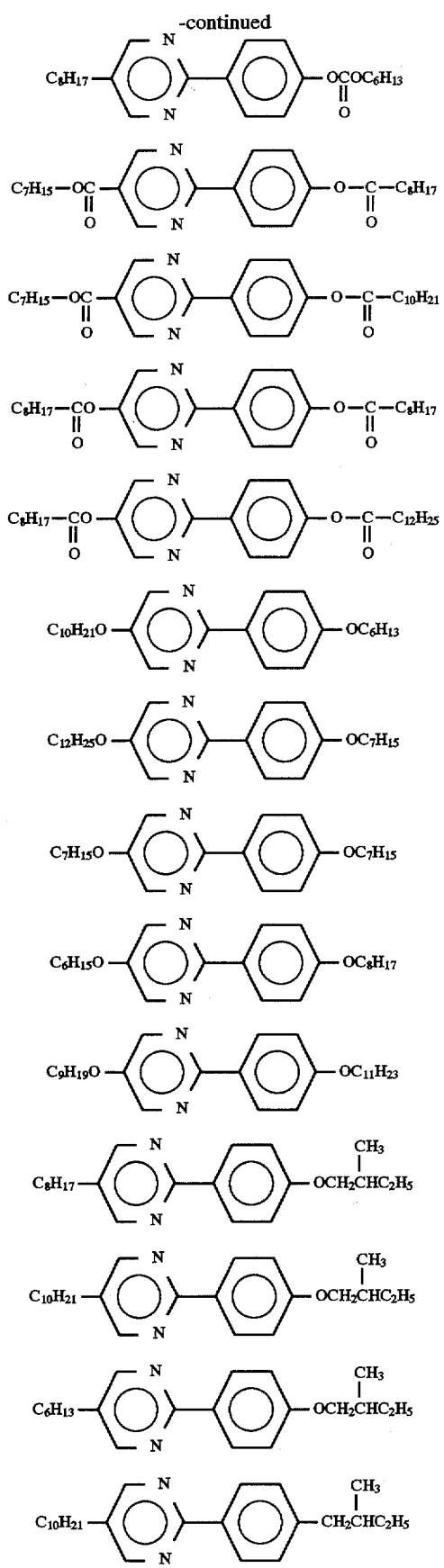
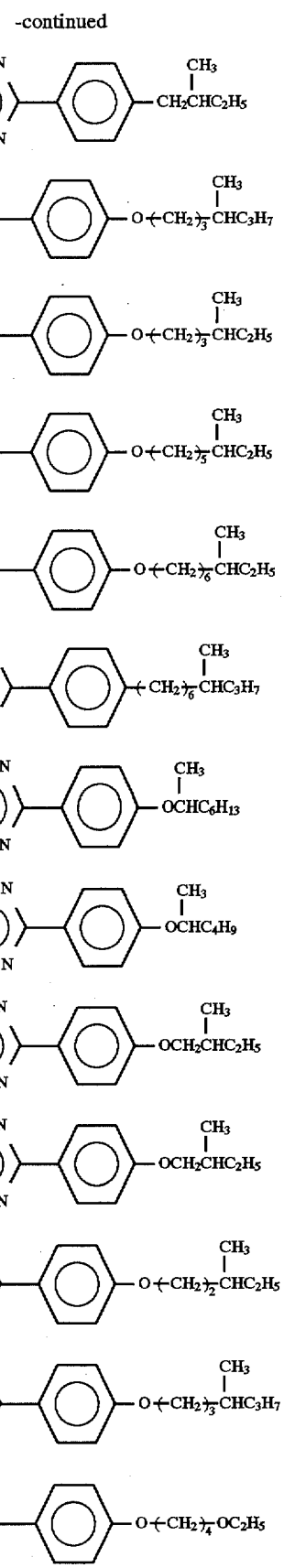

-continued

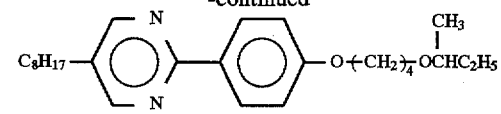
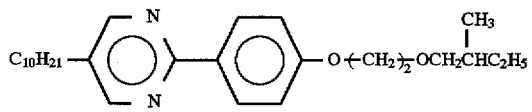
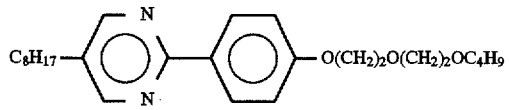
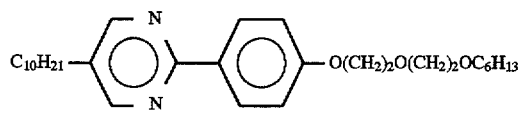

Formula (IV)

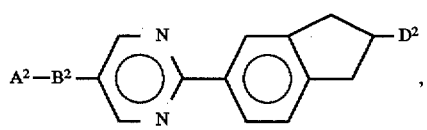

in which $A^2$ is a linear or branched alkyl group having 1–20 carbon atoms; $B^2$ is a single bond, —O—, —COO— or —OCO—; and $D^2$ is a linear or branched alkyl group having 1–20 carbon atoms.

The above mesomorphic compound of the formula (IV) having a pyrimidyl-indan skeleton as a central ring structure can be synthesized through a process as described in JP-A 5-262678.

Specific examples of the mesomorphic compound of the formula (IV) may include those shown below.

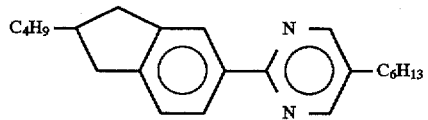
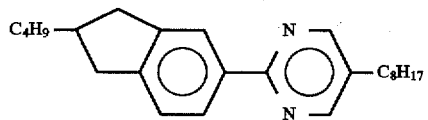
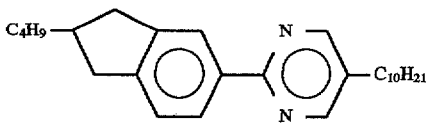
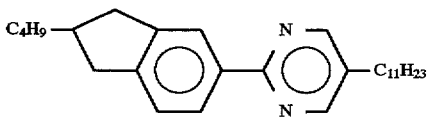
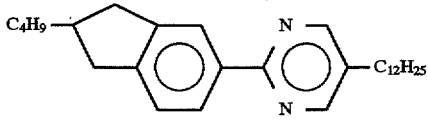

-continued

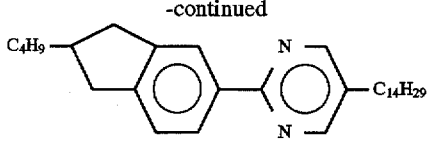
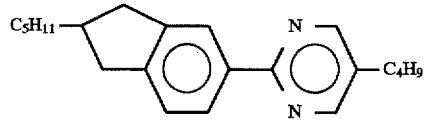
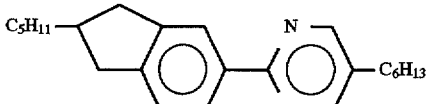
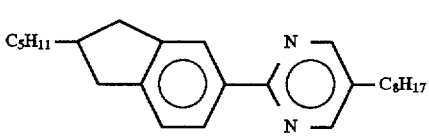
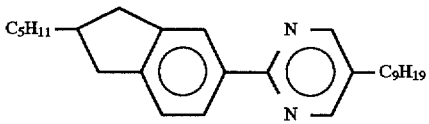
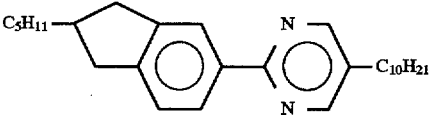
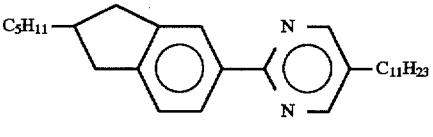
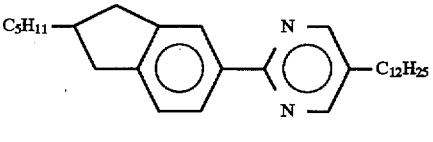
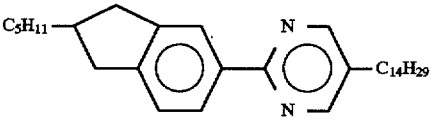
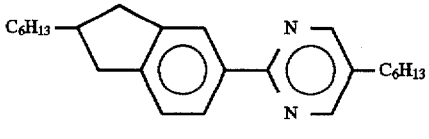
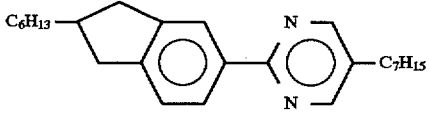
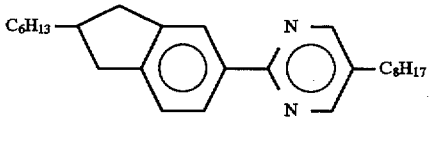

-continued
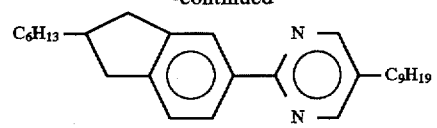
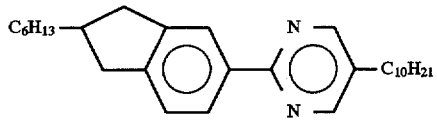
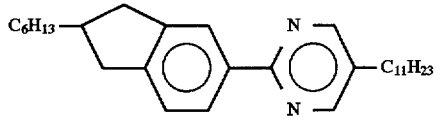
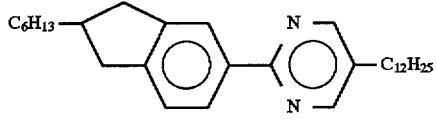
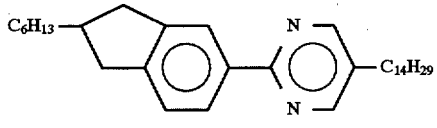
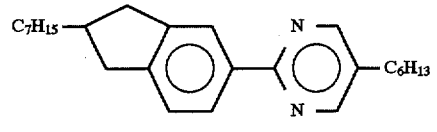
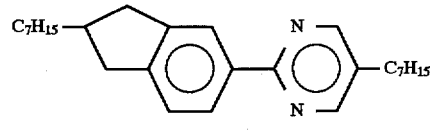
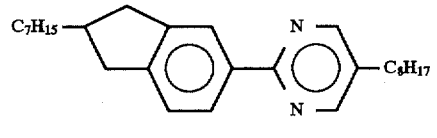
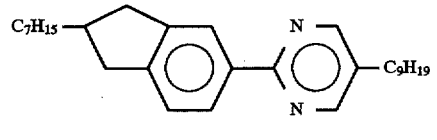
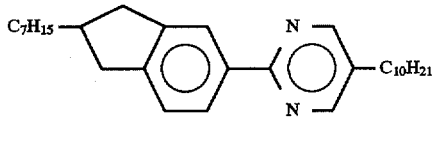
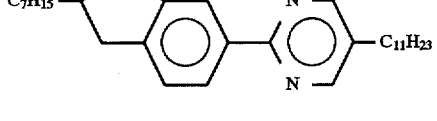
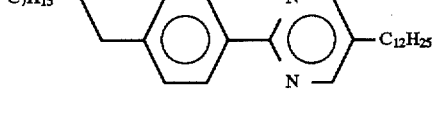
-continued
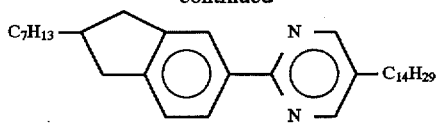
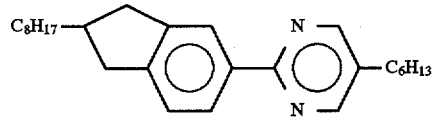
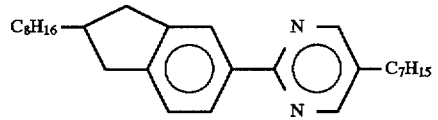
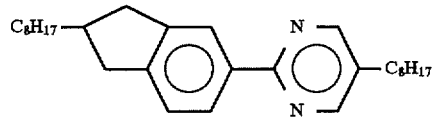
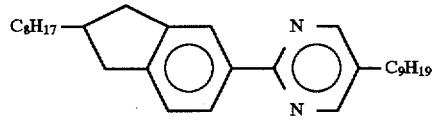
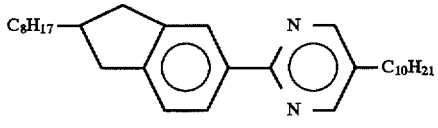
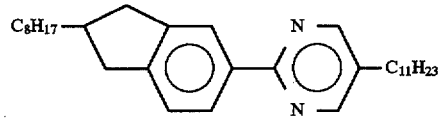
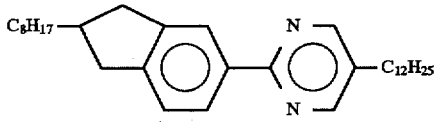
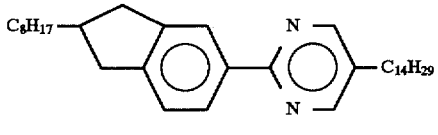
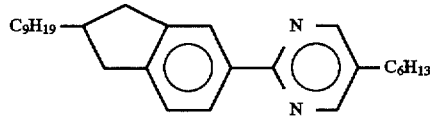
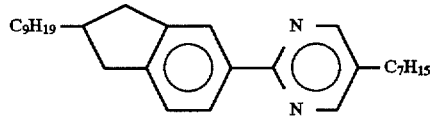
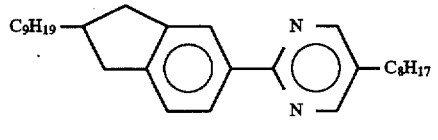

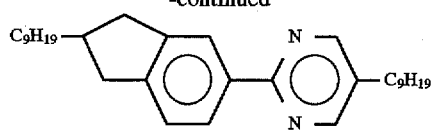
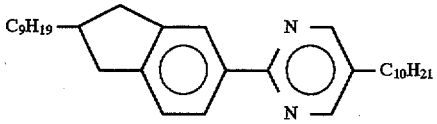
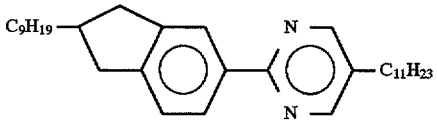
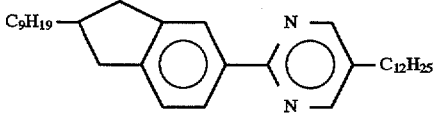
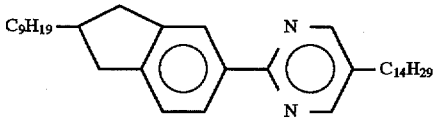
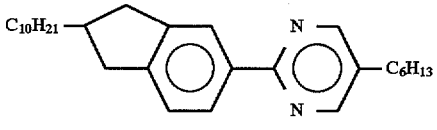
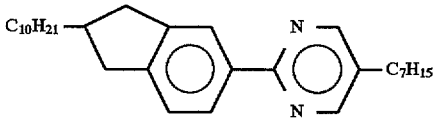
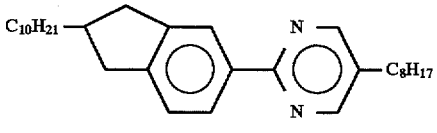
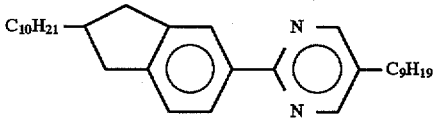
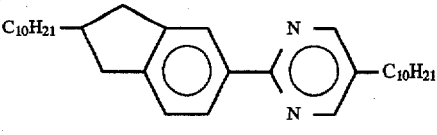
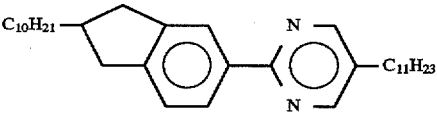
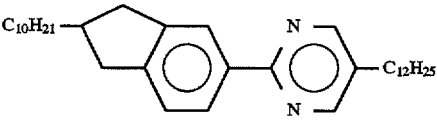
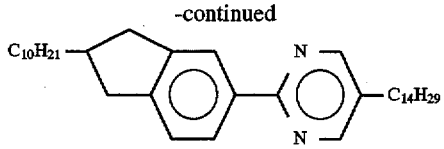
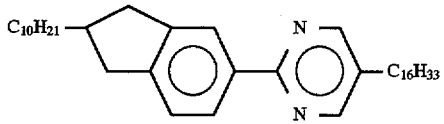
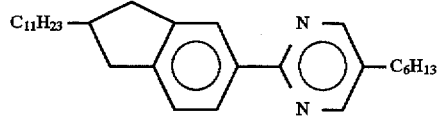
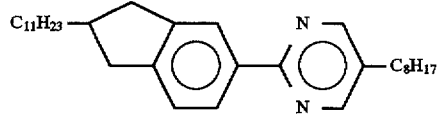
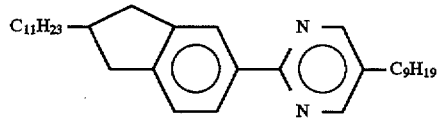
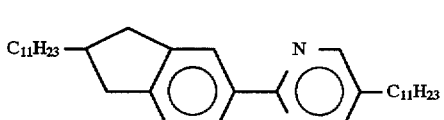
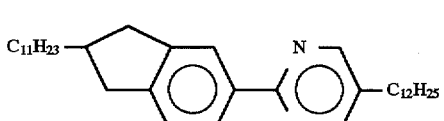
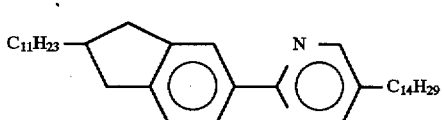
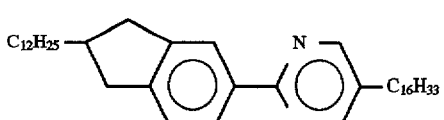
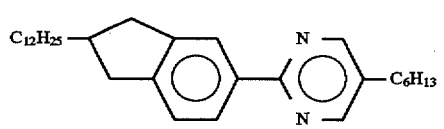
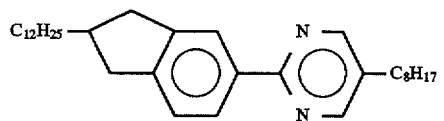
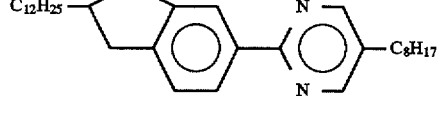

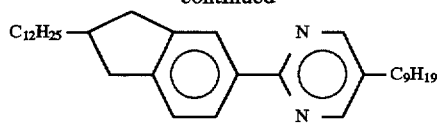
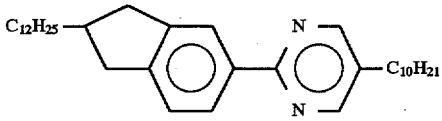
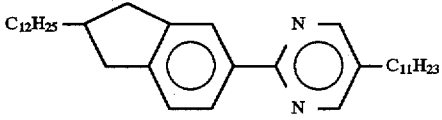
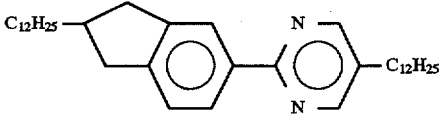
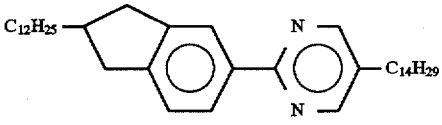
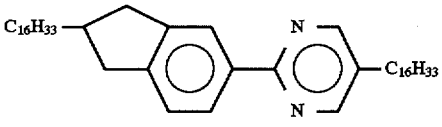
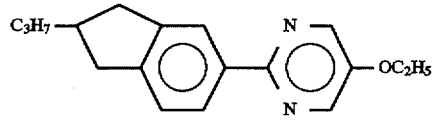
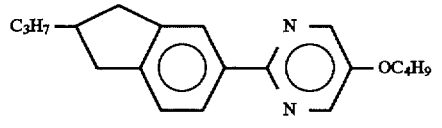
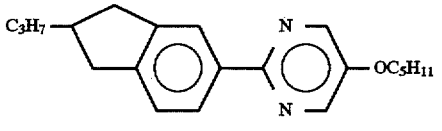
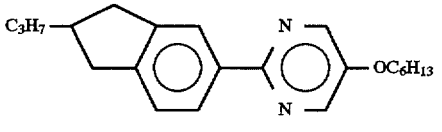
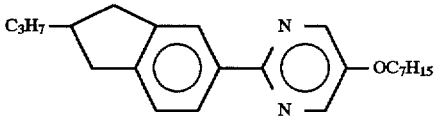
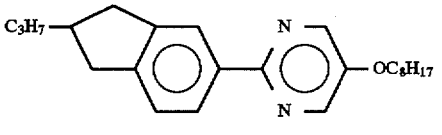
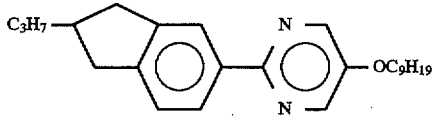
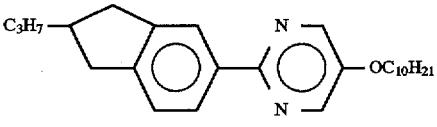
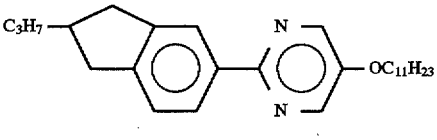
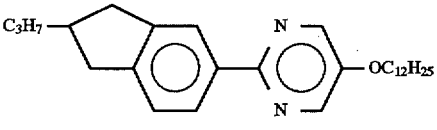
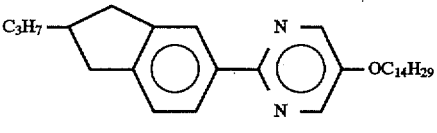
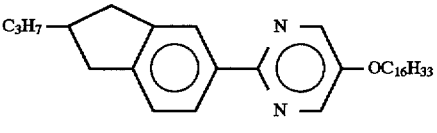
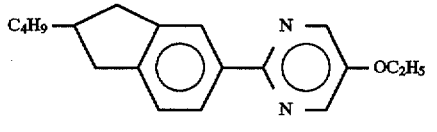
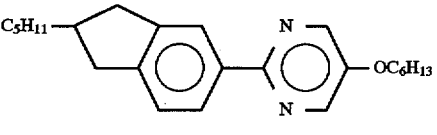
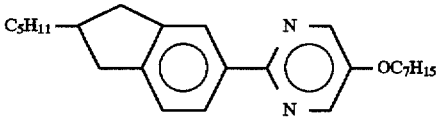
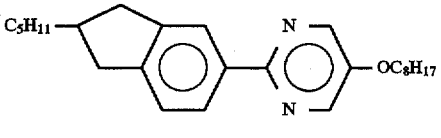
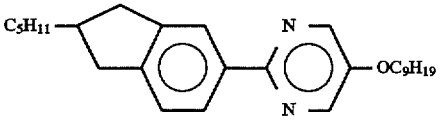
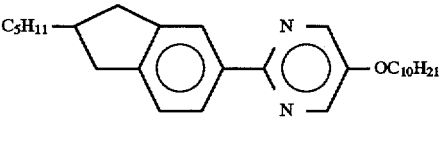

-continued

-continued
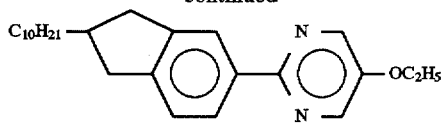
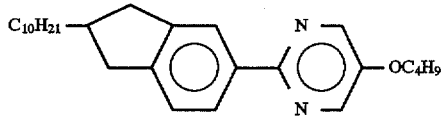
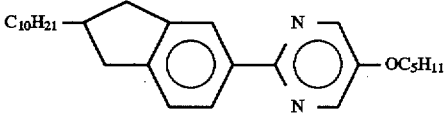
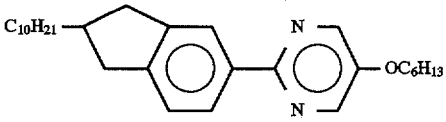
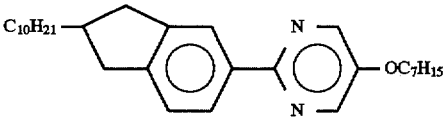
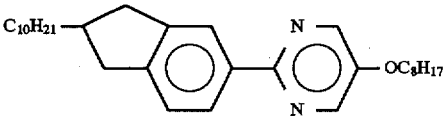
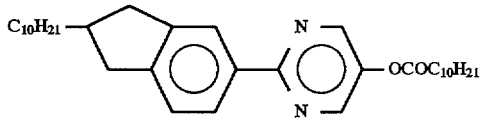
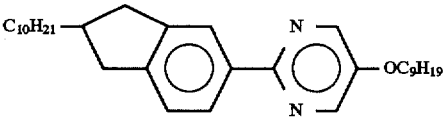
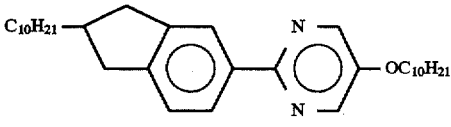
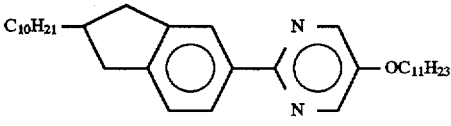
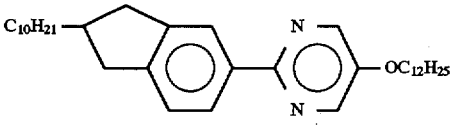
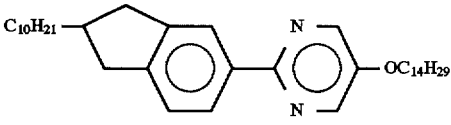
-continued
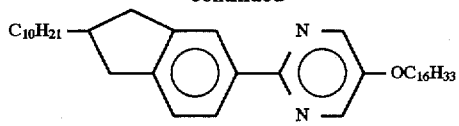
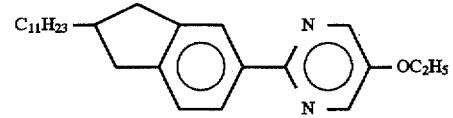
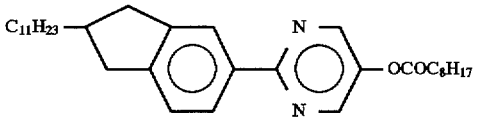
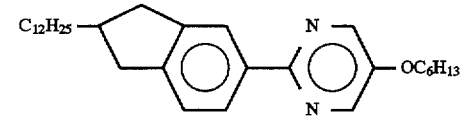
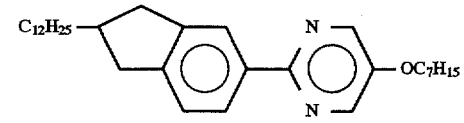
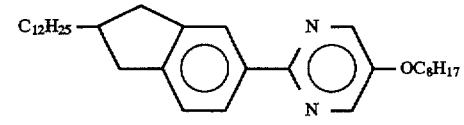
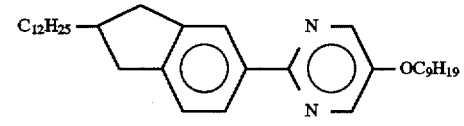
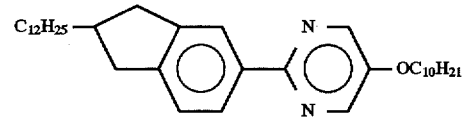
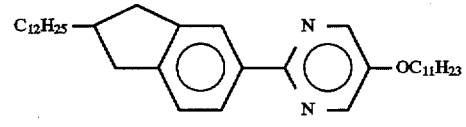
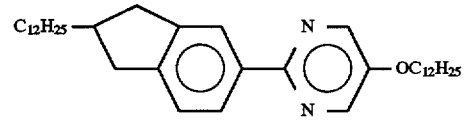
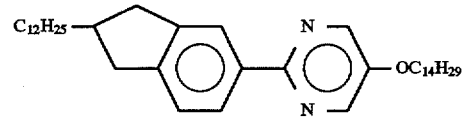
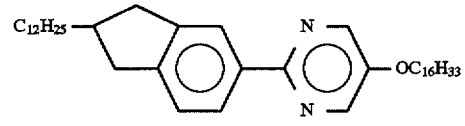

-continued

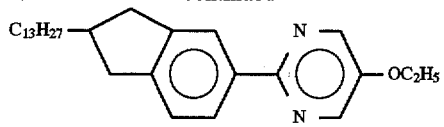
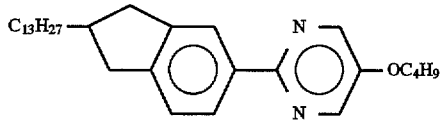
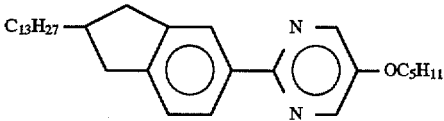
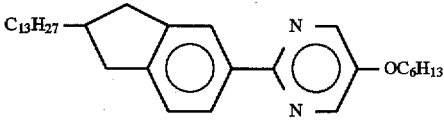
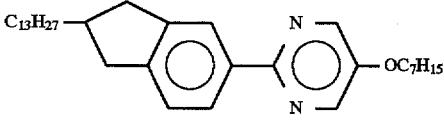
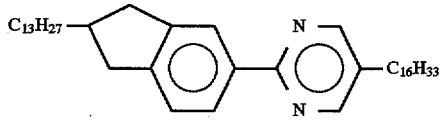
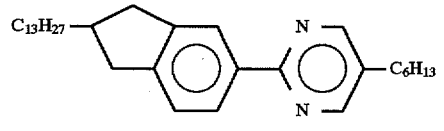
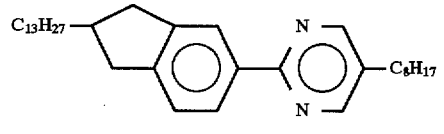
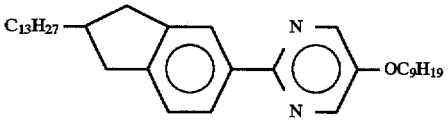
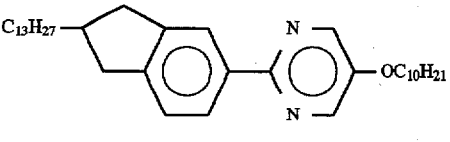
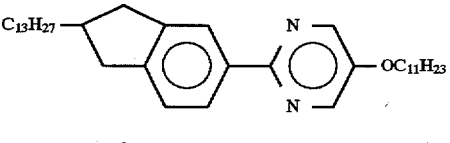
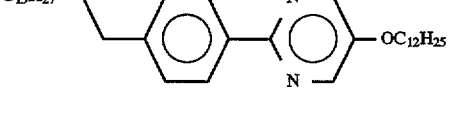

-continued

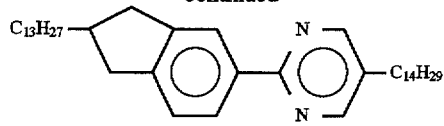
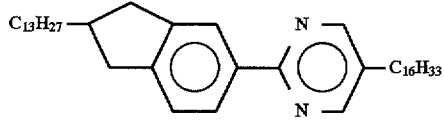
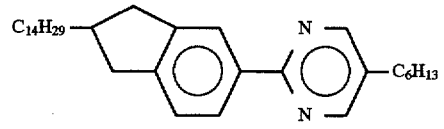
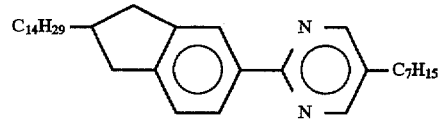
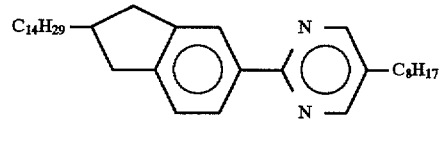
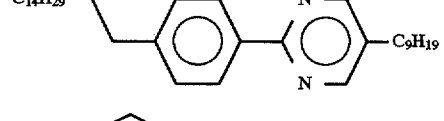
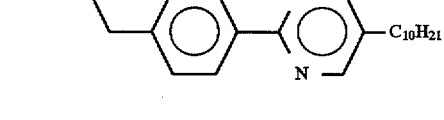

Formula (V)

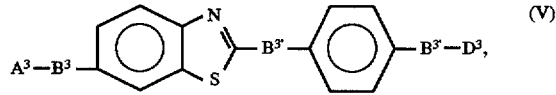

in which $A^3$ is a linear or branched alkyl group having 1–20 carbon atoms; $B^3$, $B^{3'}$ and $B^{3''}$ independently denote a single bond, —O—, —COO— or —OCO—; and $D^3$ is a linear or branched alkyl group having 1–20 carbon atoms.

The above mesomorphic compound of the formula (V) can be synthesized through a process as described in JP-A 4-29984.

Specific examples of the mesomorphic compound of the formula (V) may include those shown below.

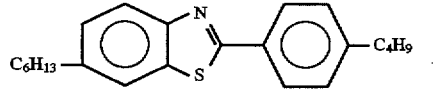
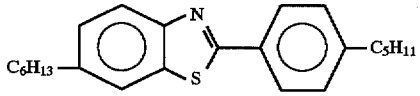

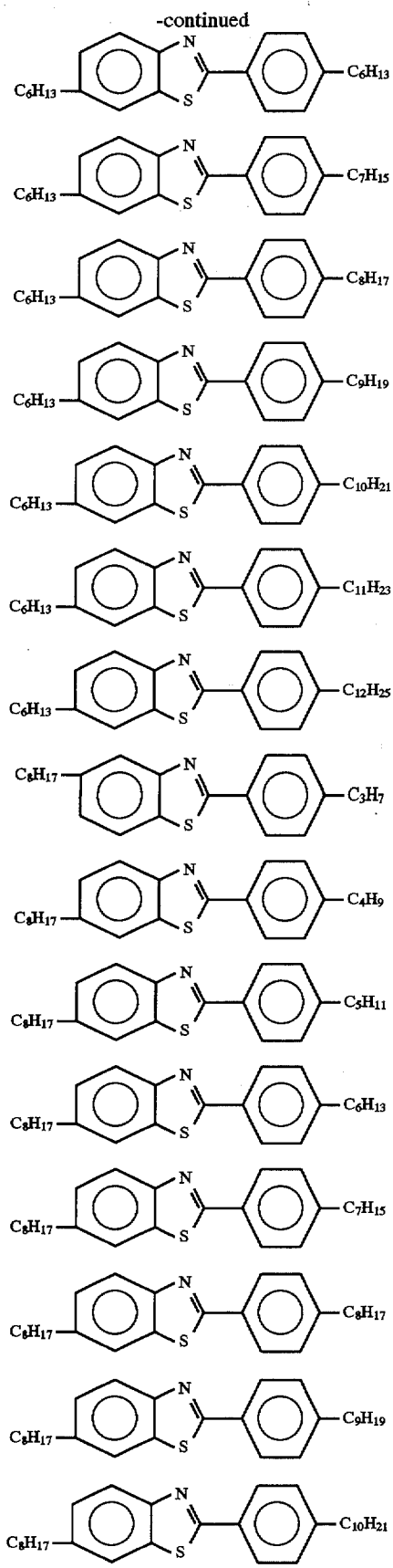
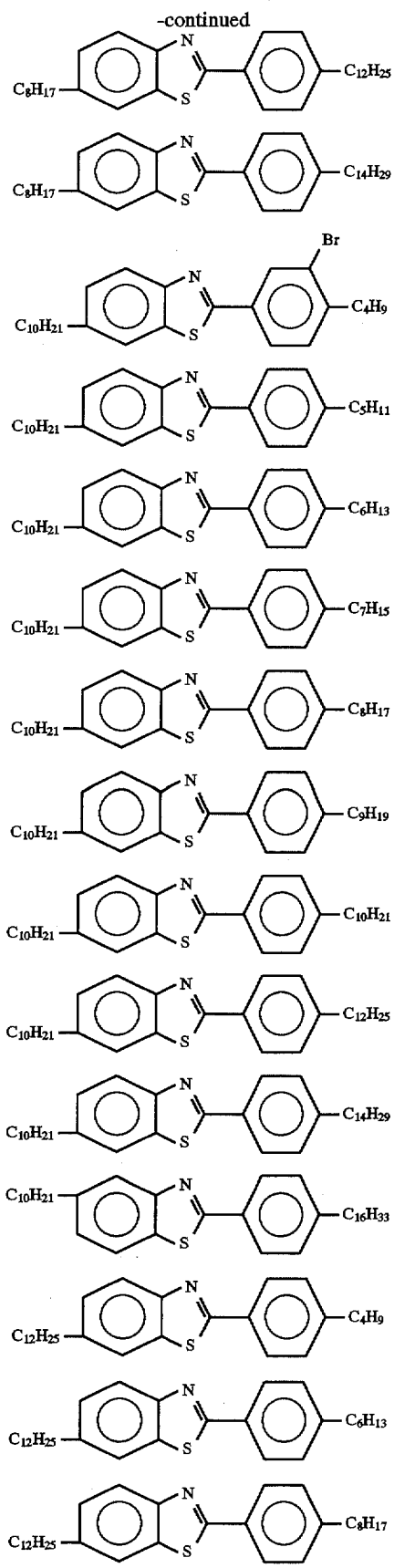

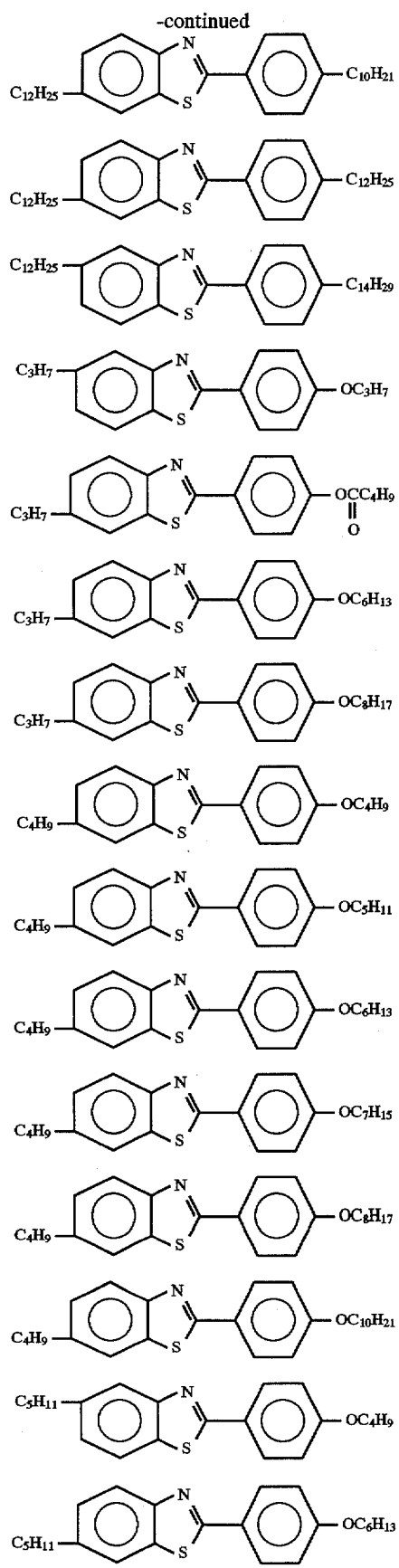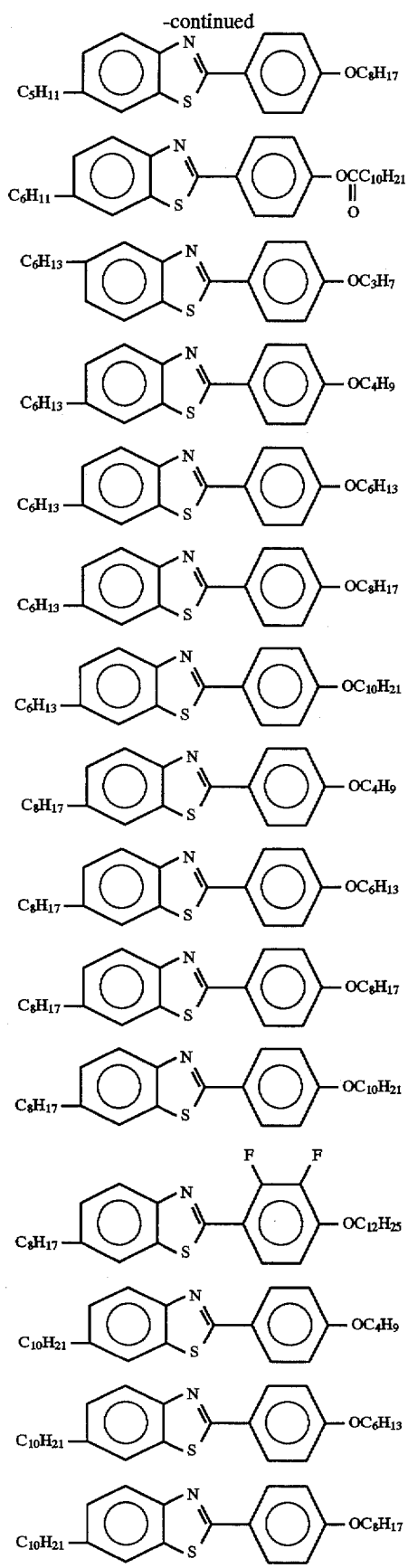

-continued
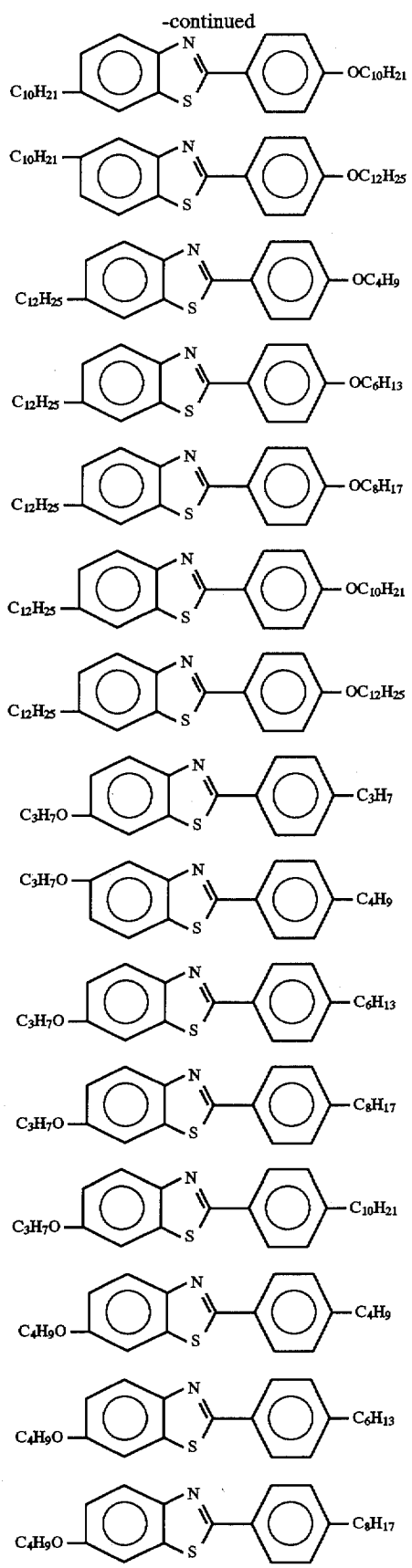
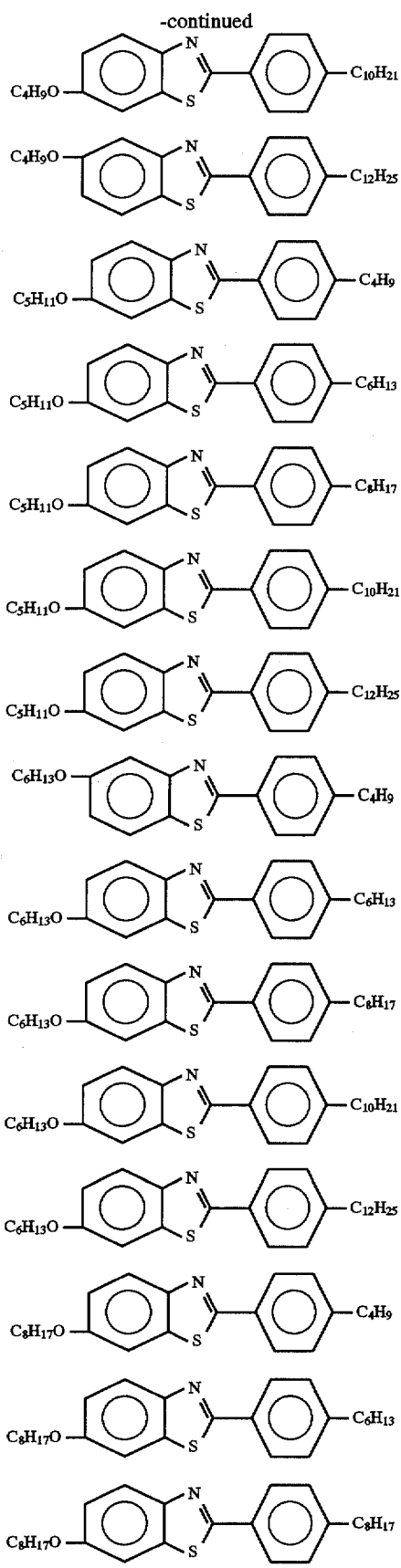

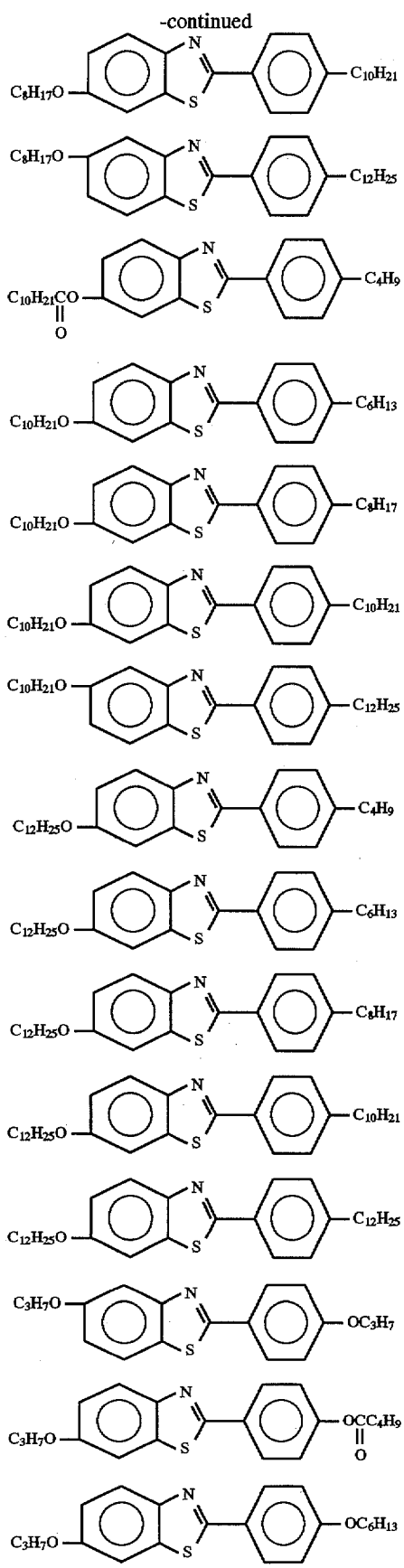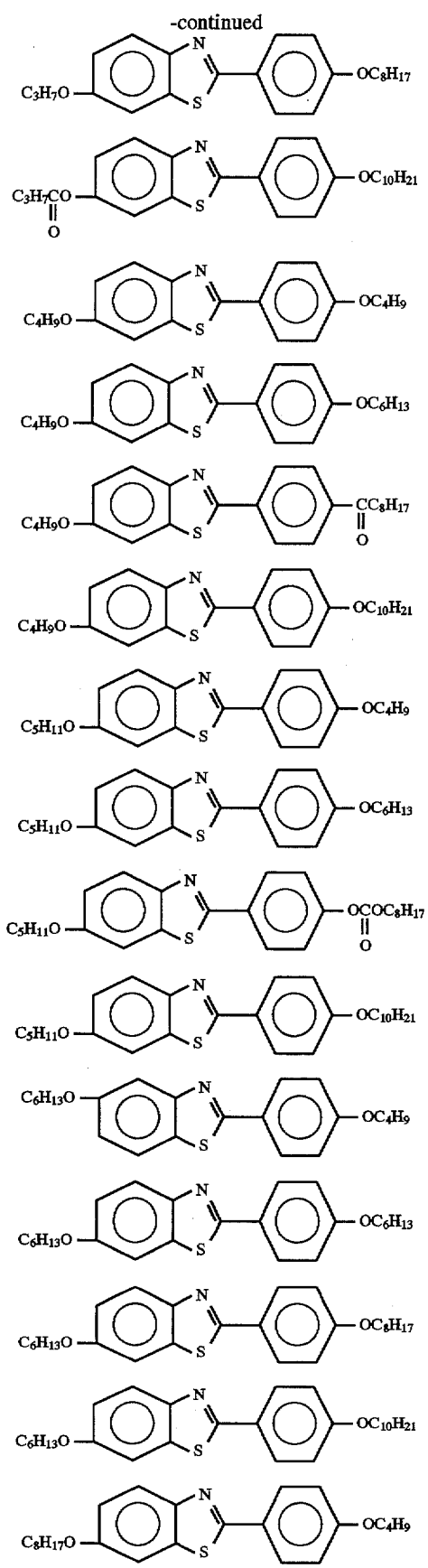

-continued

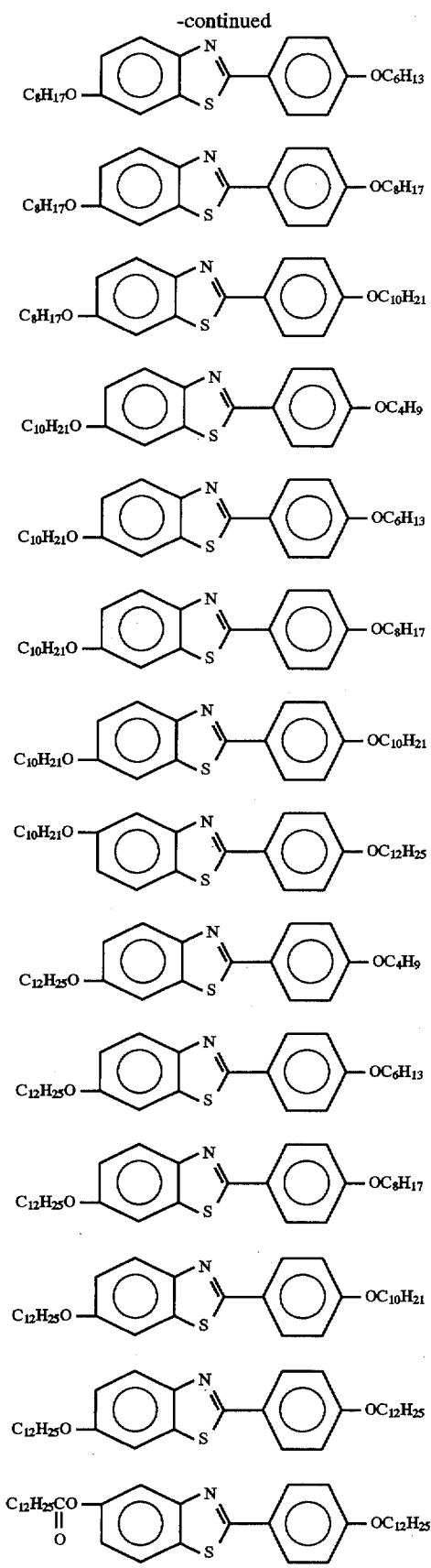

Formula (VI)

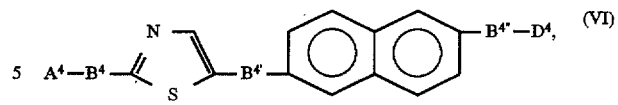

in which $A^4$ is a linear or branched alkyl group having 1–20 carbon atoms; $B^4$, $B^{4'}$ and $B^{4''}$ independently denote a single bond, —O—, —COO— or —OCO—; and $D^4$ is a linear or branched alkyl group having 1–20 carbon atoms.

The above mesomorphic compound of the formula (VI) can be synthesized through a process as described in JP-A 4-128274.

Specific examples of the mesomorphic compound of the formula (VI) may include those shown below.

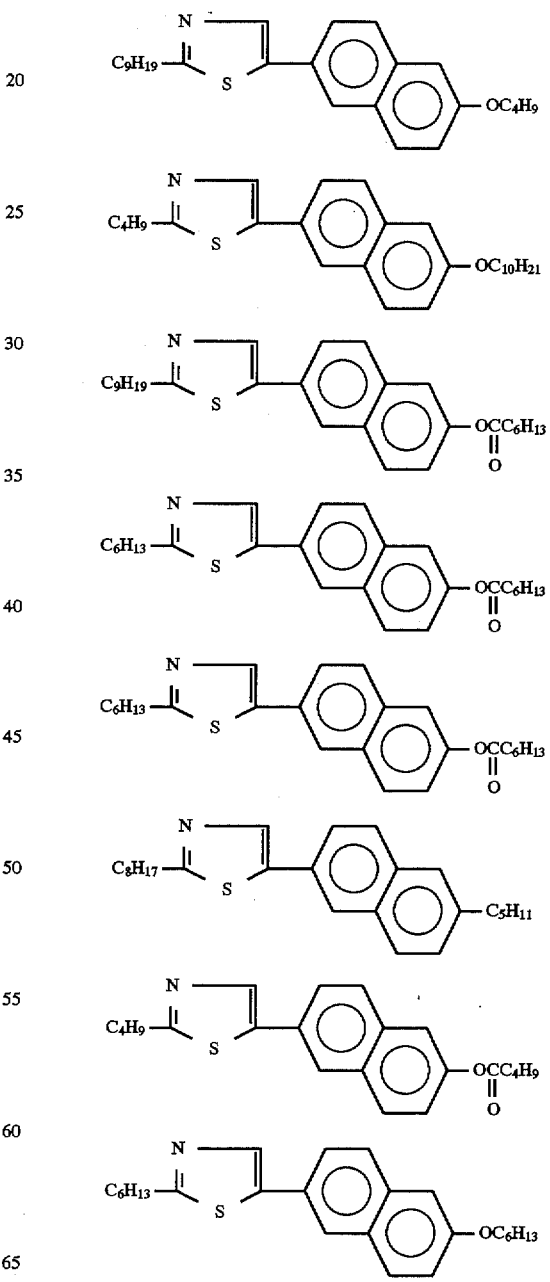

Formula (VII)

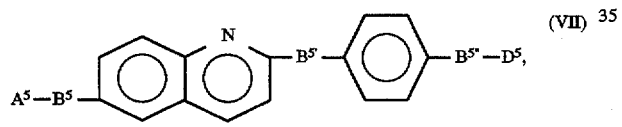

in which $A^5$ is a linear or branched alkyl group having 1–20 carbon atoms; $B^5$, $B^{5'}$ and $B^{5''}$ independently denote a single bond, —O—, —COO— or —OCO—; and $D^5$ is a linear or branched alkyl group having 1–20 carbon atoms.

The above mesomorphic compound of the formula (VII) can be synthesized through a process as described in Japanese Patent Application No. 6-77749 (filed Mar. 25, 1994).

Specific examples of the mesomorphic compound of the formula (VII) may include those shown below.

-continued

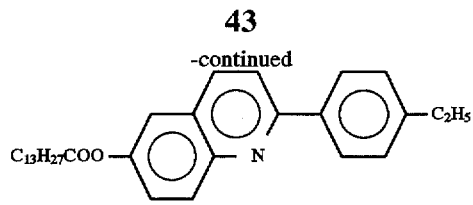
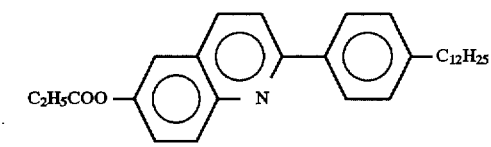

Formula (VIII)

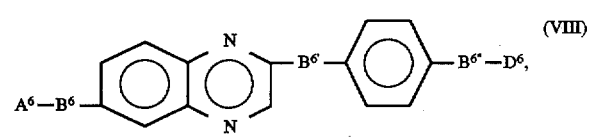

in which $A^6$ is a linear or branched alkyl group having 1–20 carbon atoms; $B^6$, $B^{6'}$ and $B^{6''}$ independently denote a single bond, —O—, —COO— or —OCO—; and $D^6$ is a linear or branched alkyl group having 1–20 carbon atoms.

The above mesomorphic compound of the formula (VIII) can be synthesized through a process as described in Japanese Patent Applications Nos. 6-64904 (filed Apr. 1, 1994) and 5-101039 (filed Apr. 27, 1993) or U.S. application Ser. No. 233,256.

Specific examples of the mesomorphic compound of the formula (VIII) may include those shown below.

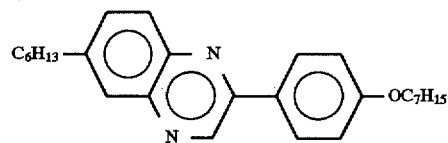
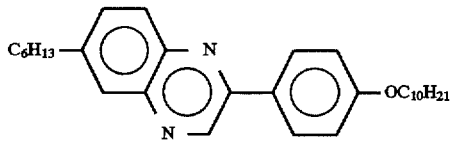
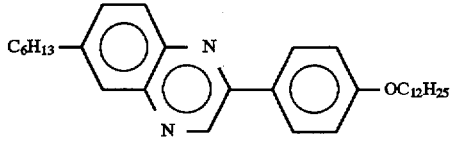
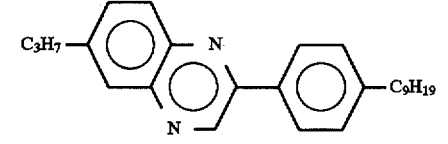
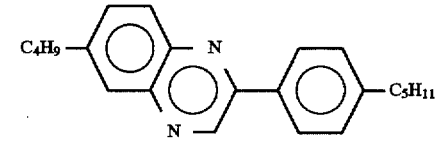

-continued

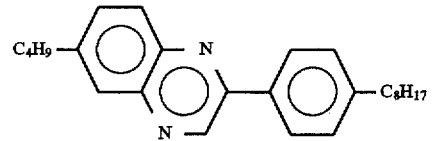
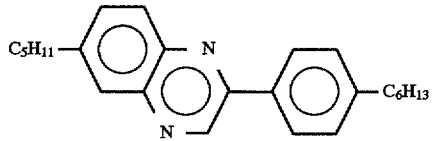
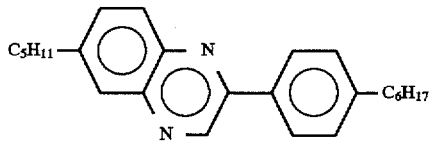
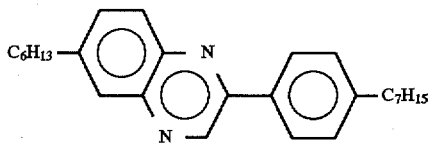
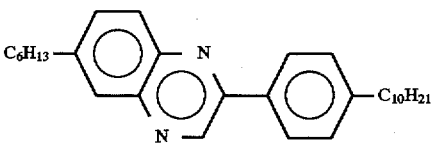
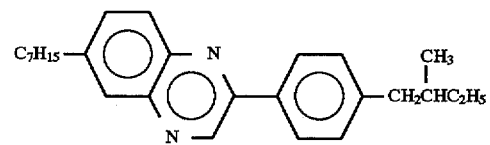
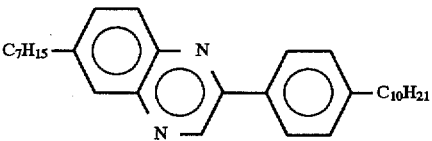
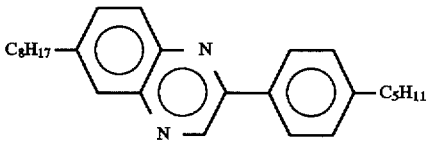
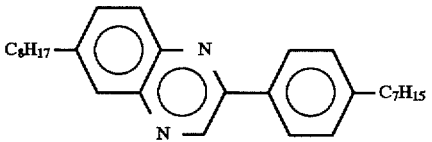
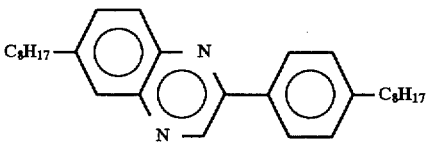

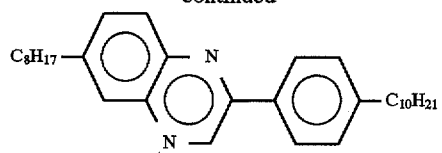
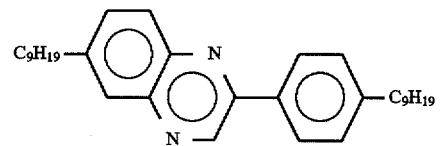
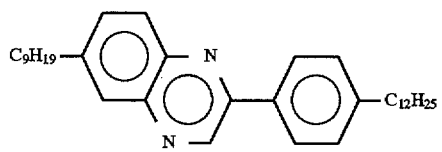
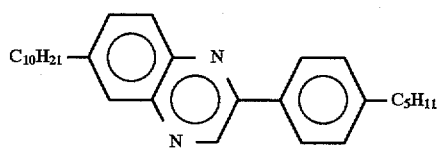
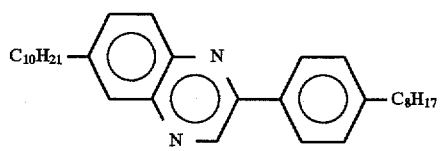
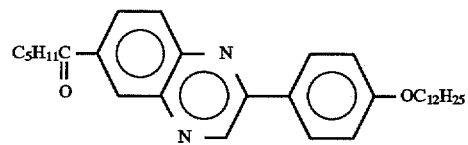
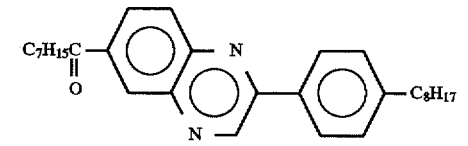
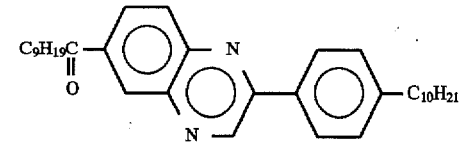
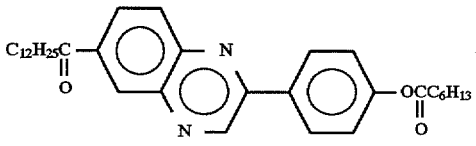
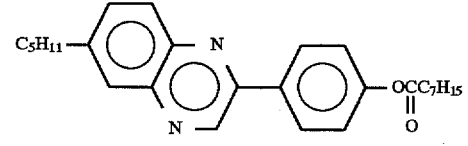
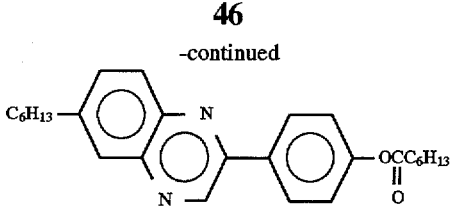
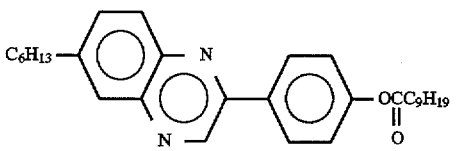
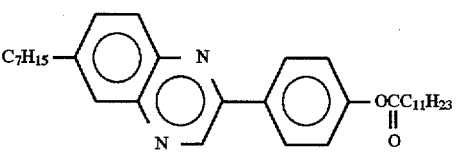
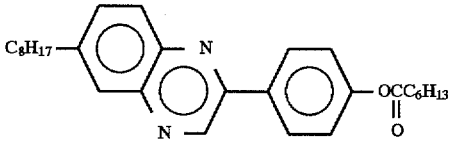
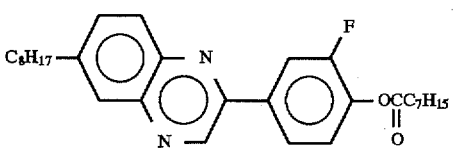
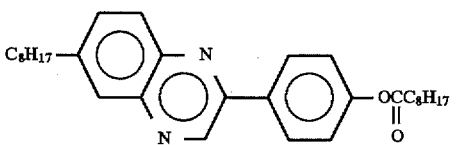
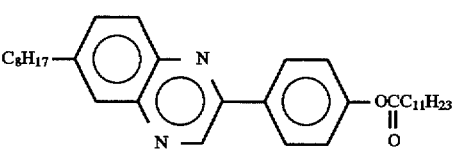
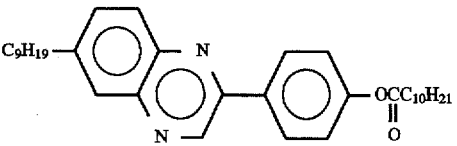
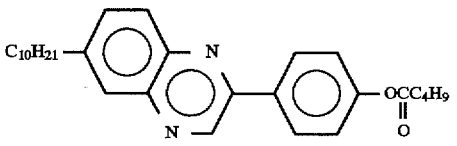
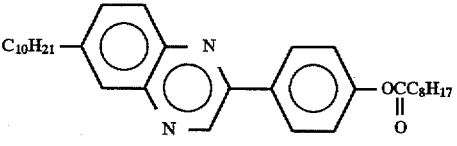

-continued

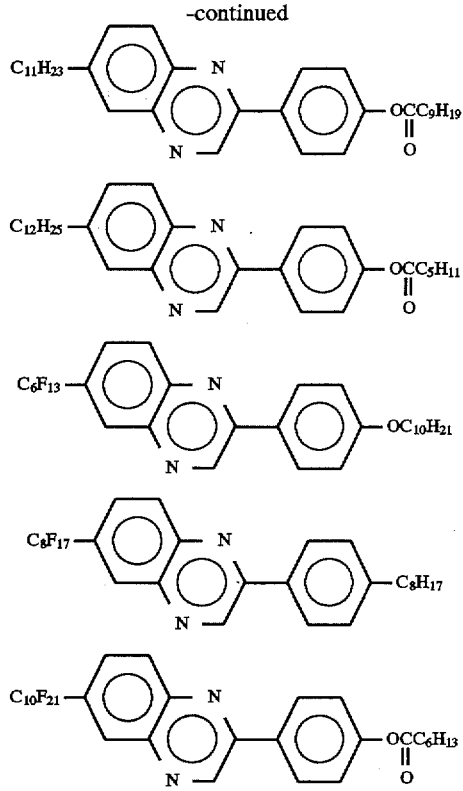

Formula (IX)

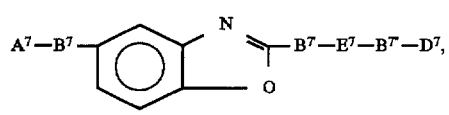

in which $A^7$ is a linear or branched alkyl group having 1–20 carbon atoms; $B^7$, $B^{7'}$ and $B^{7''}$ independently denote a single bond, —O—, —COO— or —OCO—; $D^7$ is a linear or branched alkyl group having 1–20 carbon atoms; and $E^7$ is 1,4-phenylene or 2,6-naphthylene.

The above mesomorphic compound of the formula (IX) can be synthesized through a process as described in JP-A 4-211674.

Specific examples of the mesomorphic compound of the formula (IX) may include those shown below.

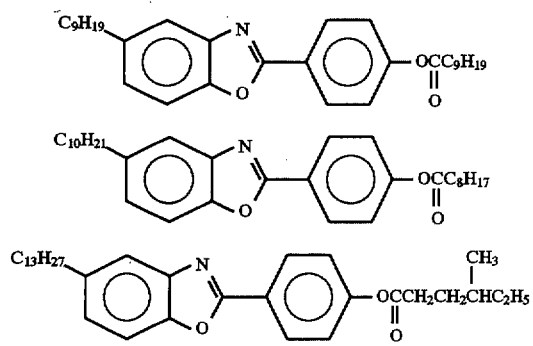

-continued

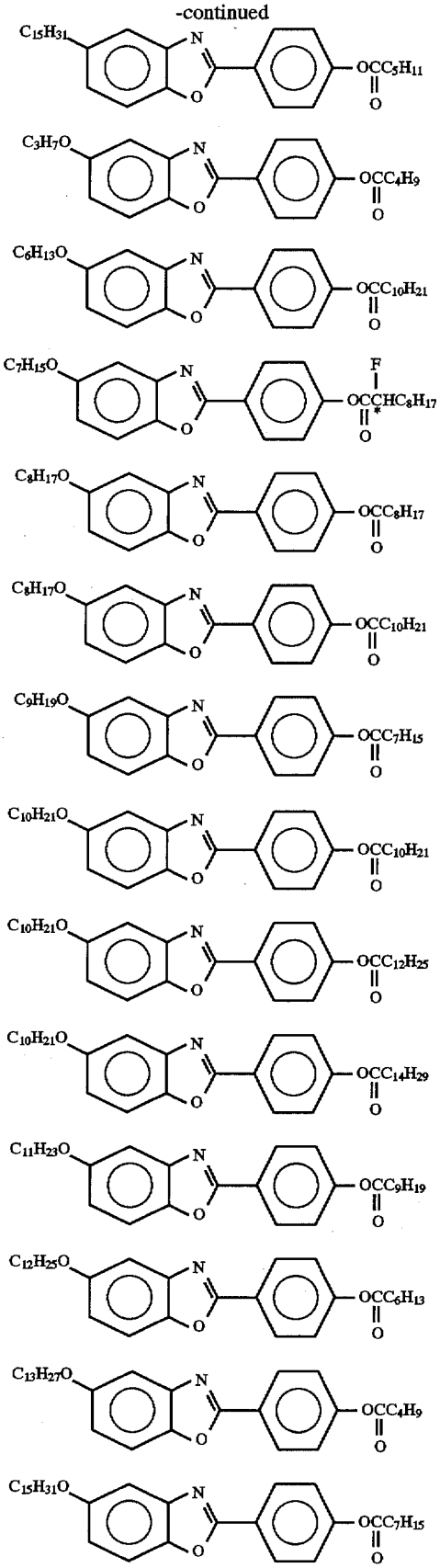

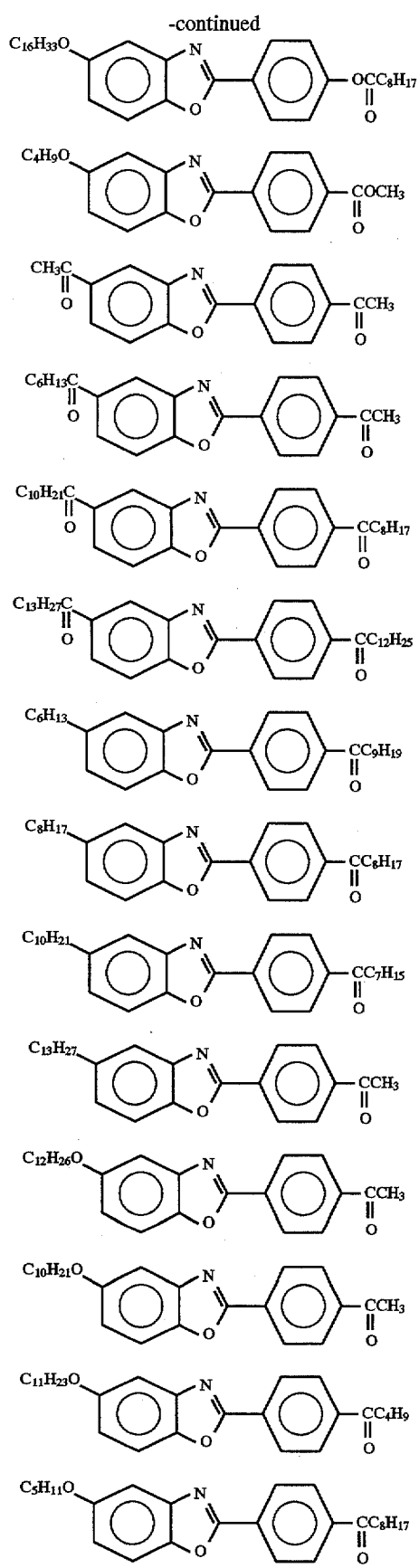
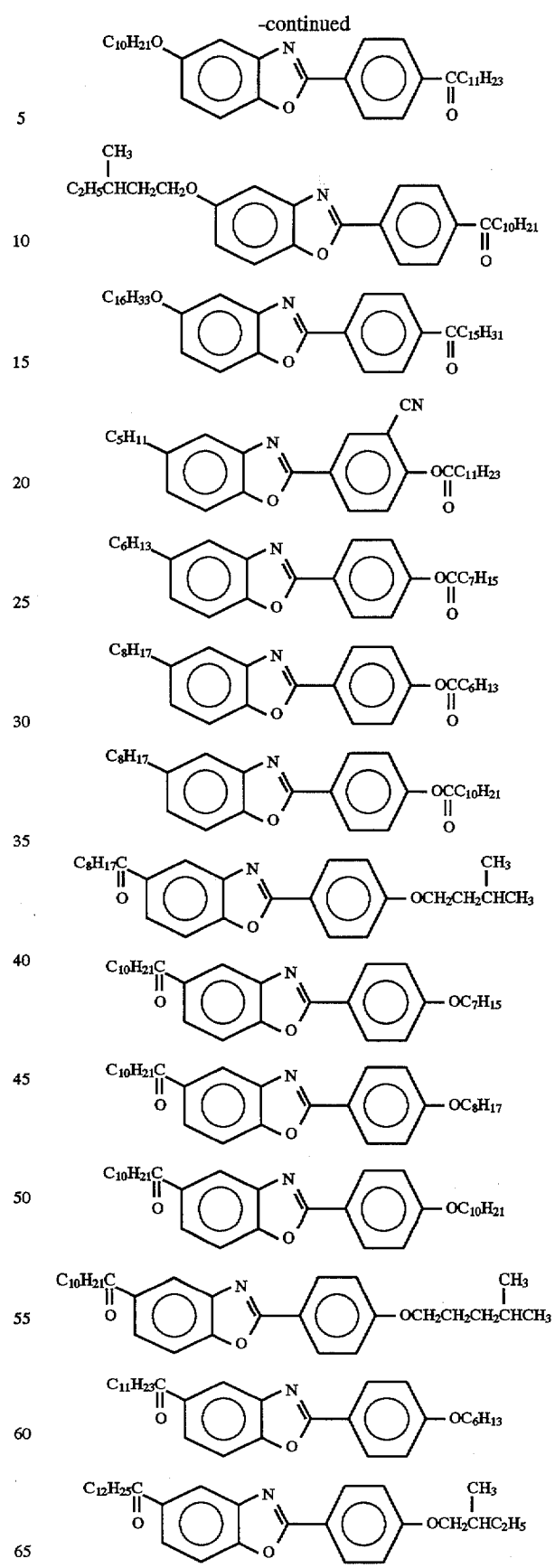

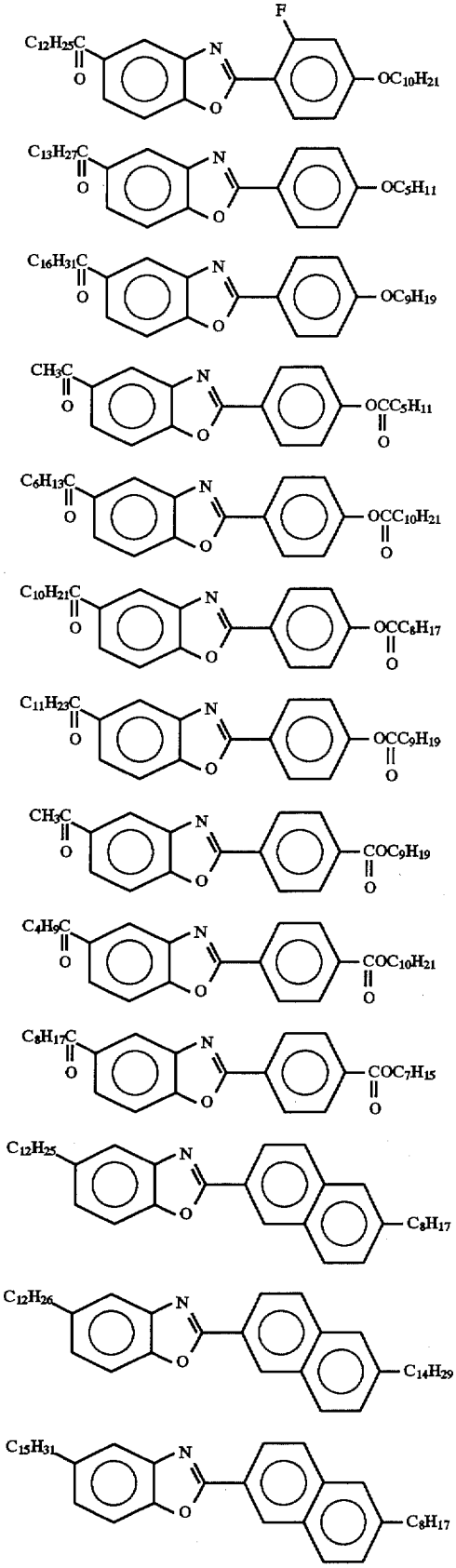
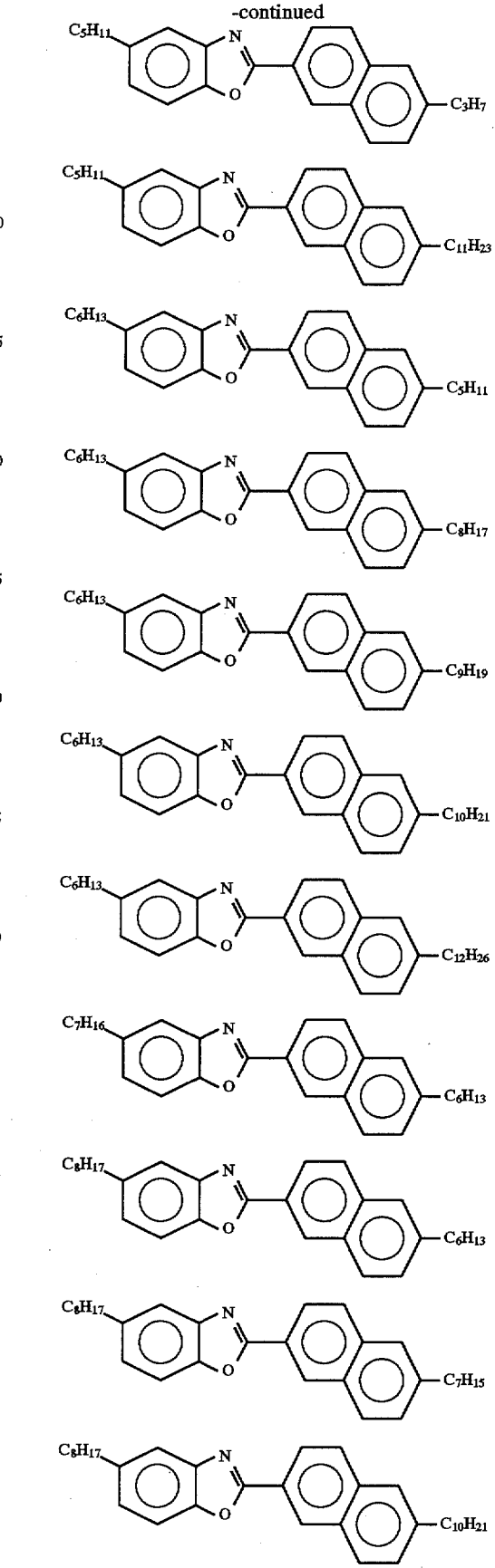

-continued

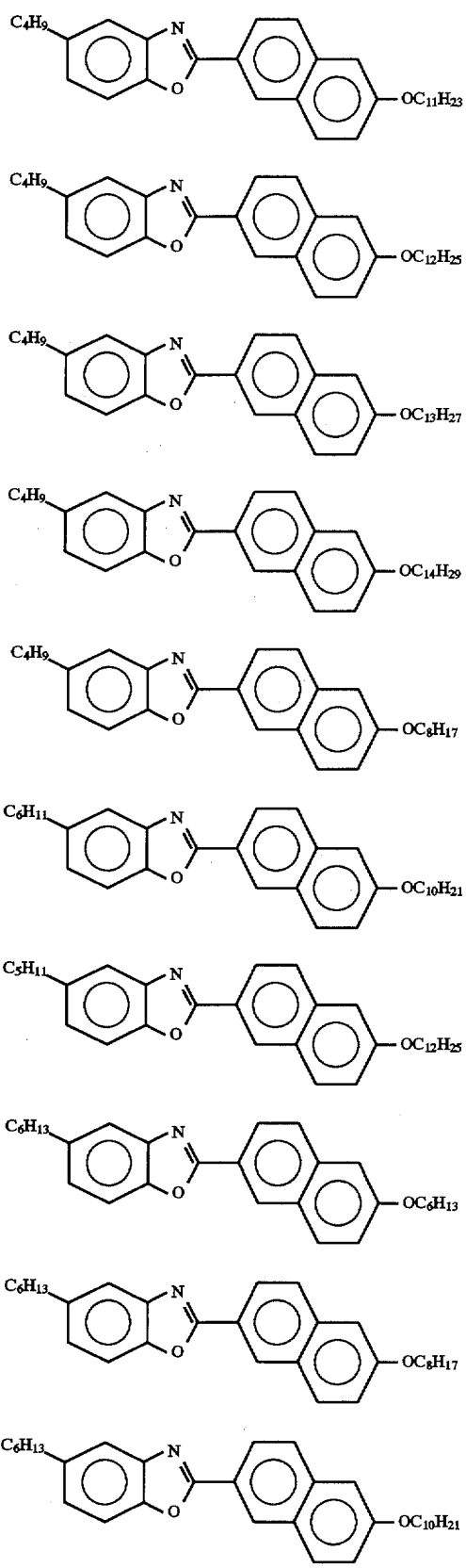

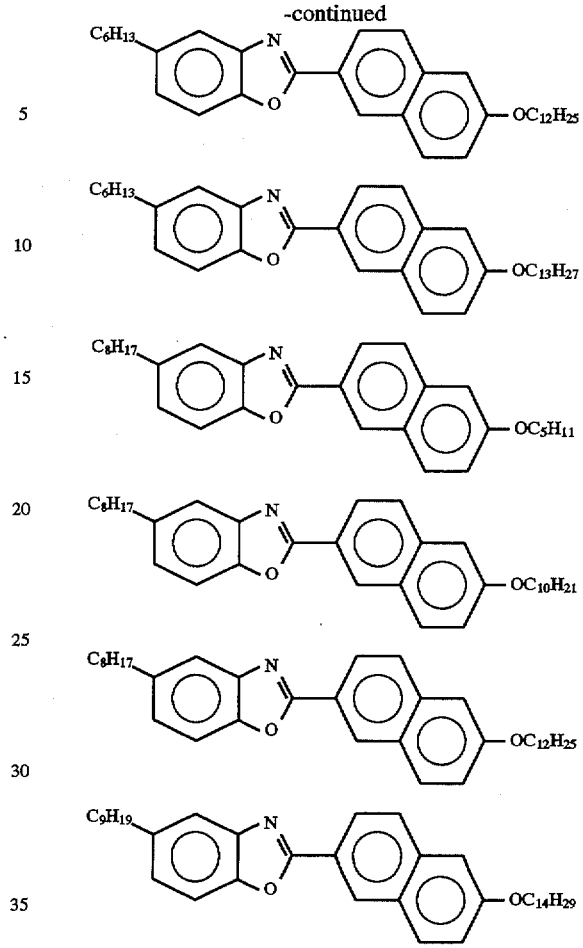

Formula (X)

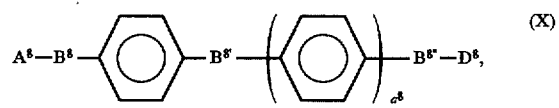

in which $A^8$ is a linear or branched alkyl group having 1–20 carbon atoms; $B^8$, $B^{8'}$ and $B^{8''}$ independently denote a single bond, —O—, —COO— or —OCO—; $D^8$ is a linear or branched alkyl group having 1–20 carbon atoms; and $a^8$ is 1 or 2.

The above mesomorphic compound of the formula (X) can be synthesized through a process as described in Mol. Cryst. Liq. Cryst., vol. 22, p. 271 (1973)).

Specific examples of the mesomorphic compound of the formula (X) may include those shown below.

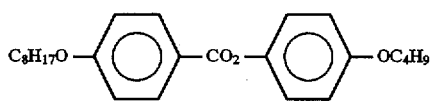

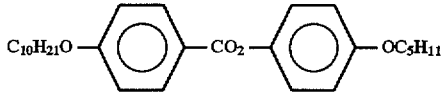

-continued

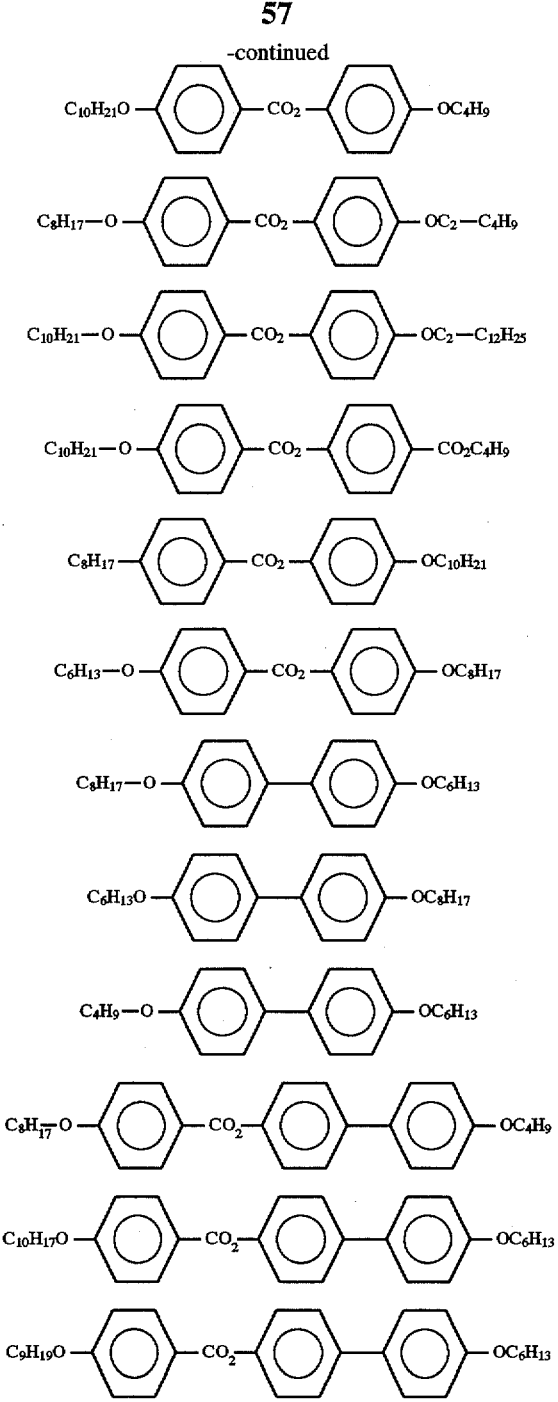

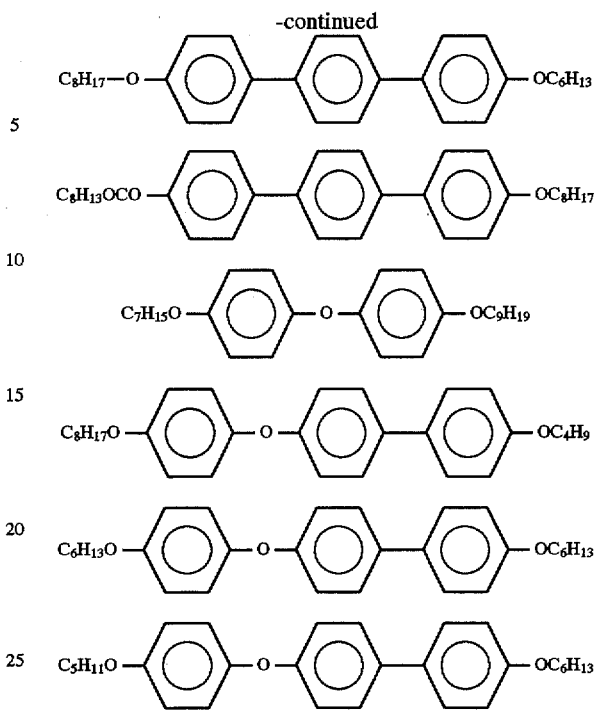

Formula(XI)

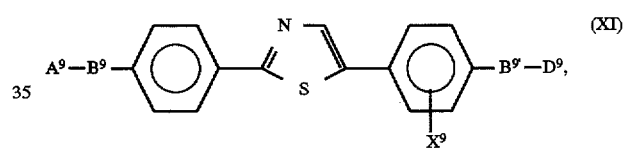

in which $A^9$ is a linear or branched alkyl group having 1–20 carbon atoms; $B^9$ and $B^{9'}$ independently denote a single bond, —O—, —COO— or —OCO—; $D^9$ is a linear or branched alkyl group having 1–20 carbon atoms; and $X^9$ is —H or —F.

The above mesomorphic compound of the formula (XI) can be synthesized through a process as described in JP-A 4-128274.

Specific examples of the mesomorphic compound of the formula (XI) may include those shown below.

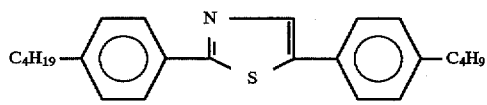

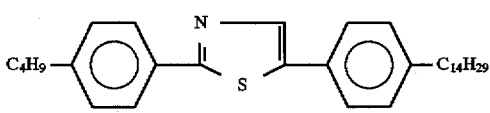

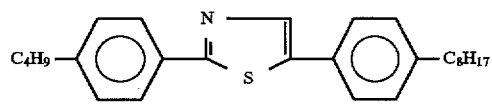

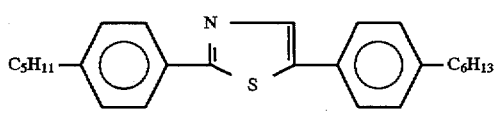

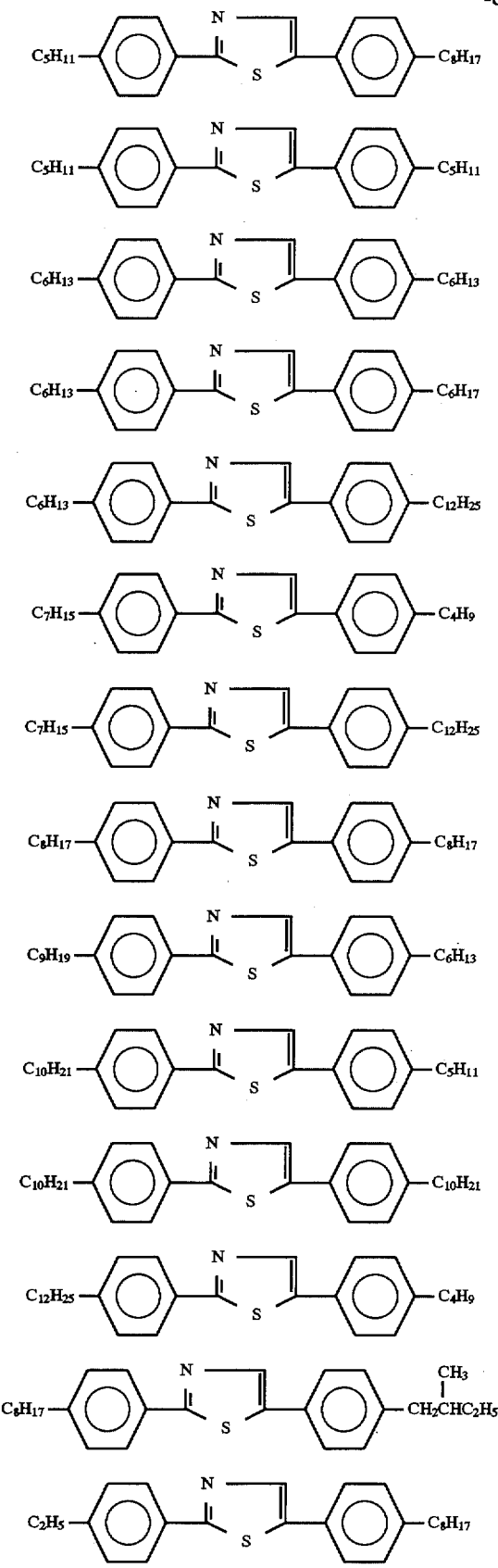
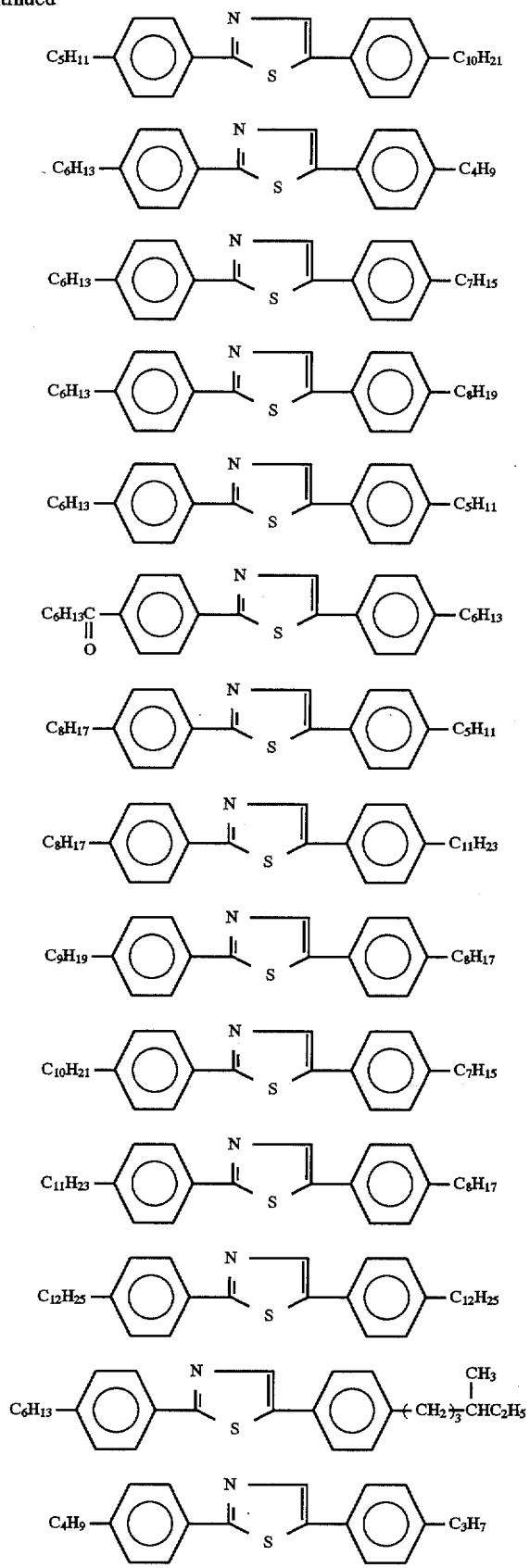

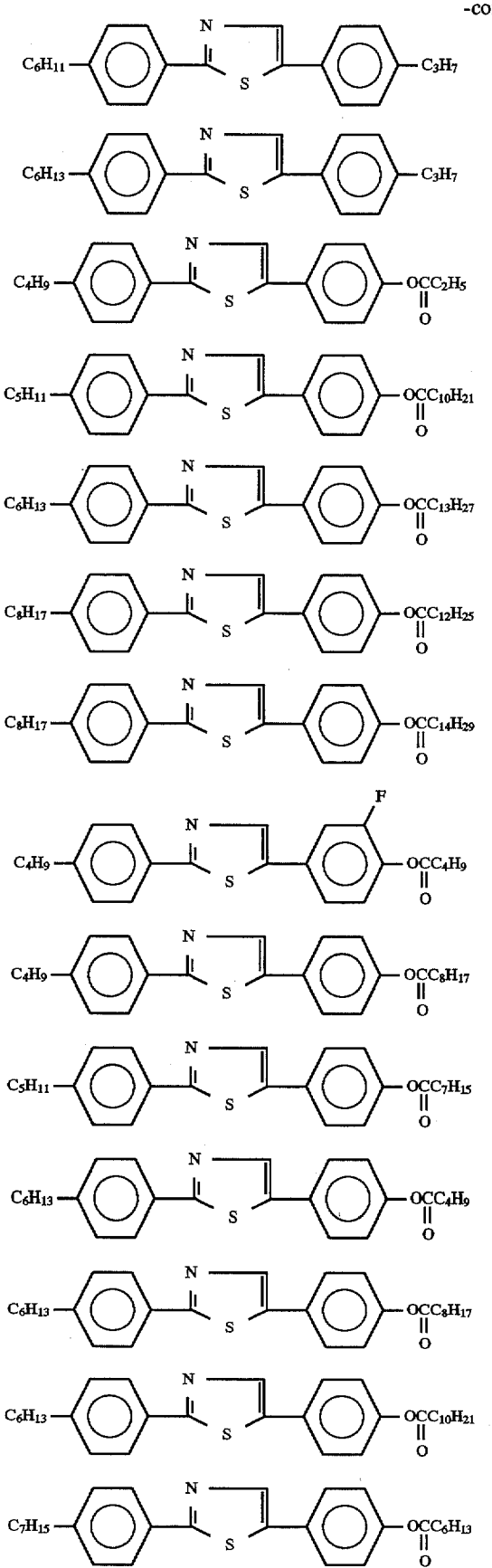
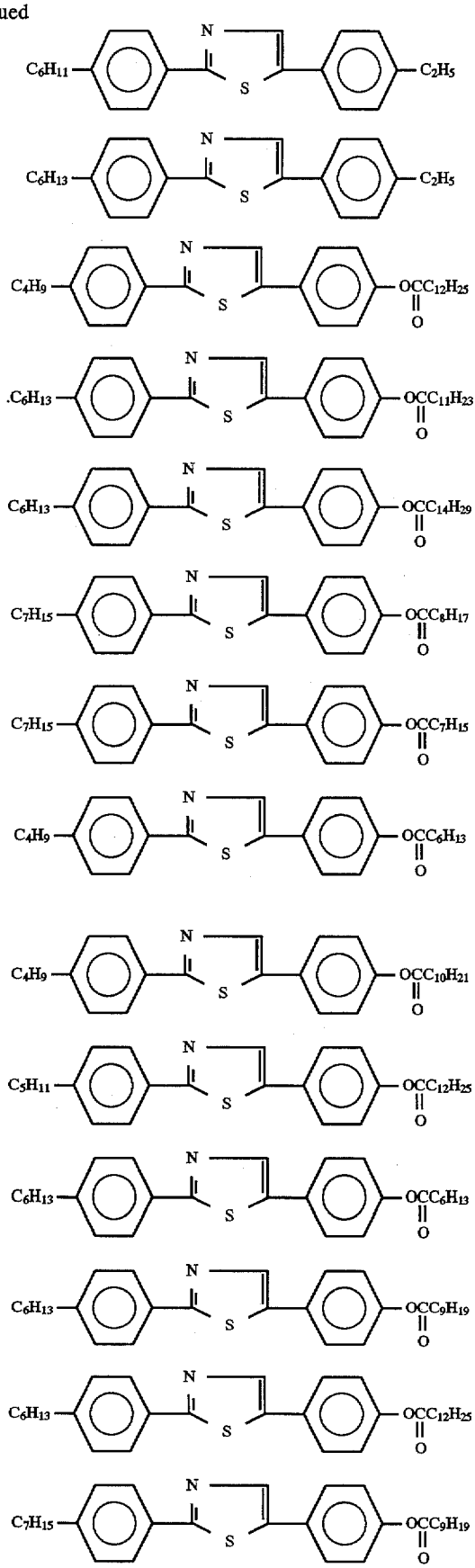

-continued
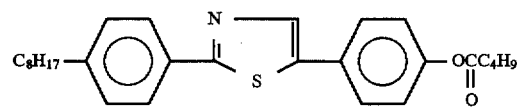
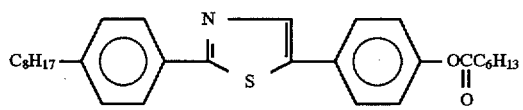
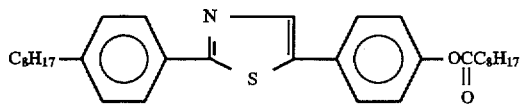
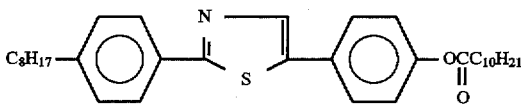
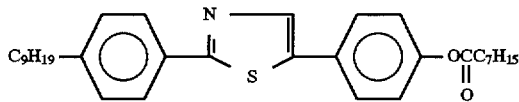
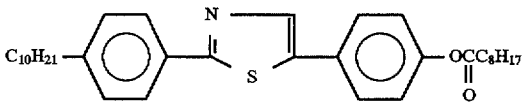
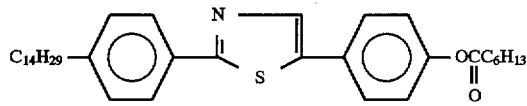
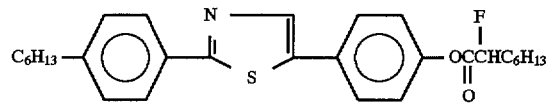
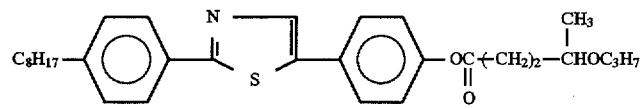
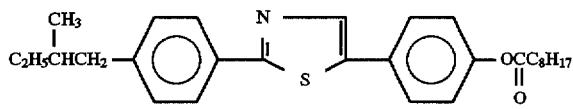
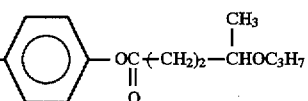
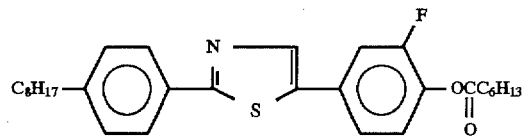
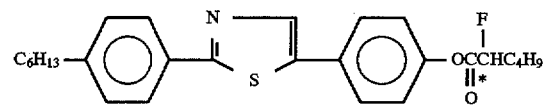
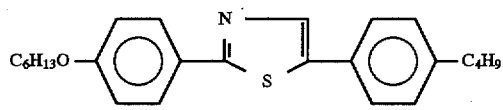
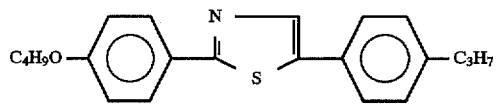
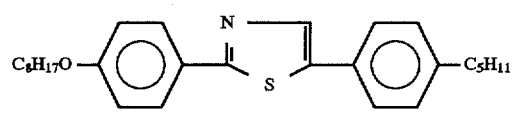
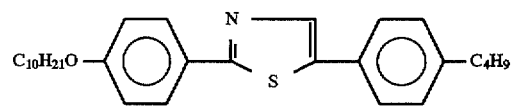
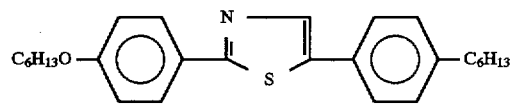
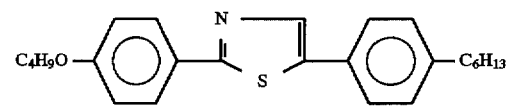
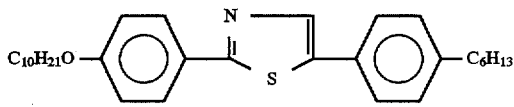
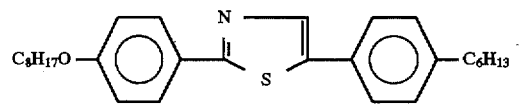
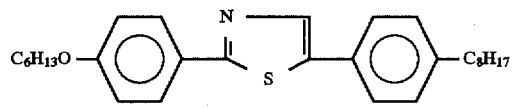
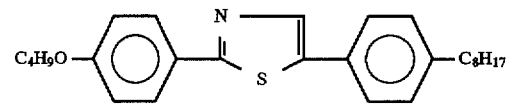
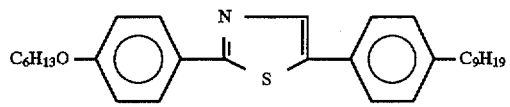
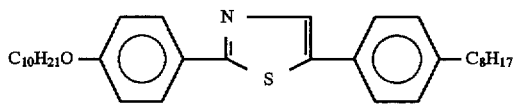
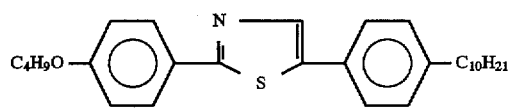
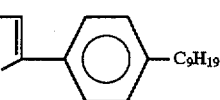
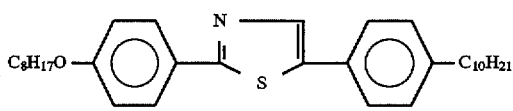

-continued
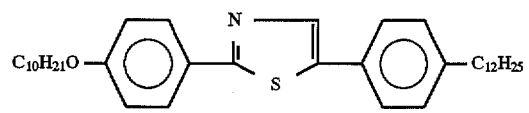
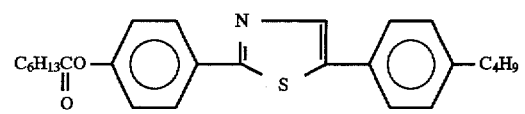
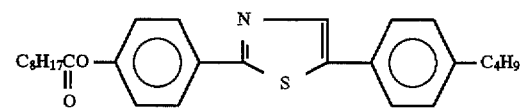
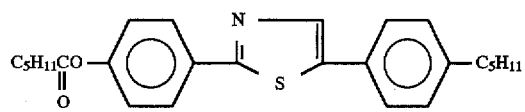
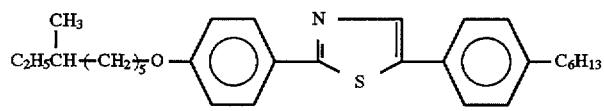
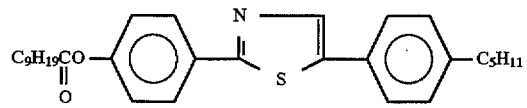
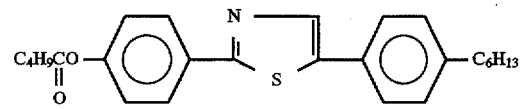
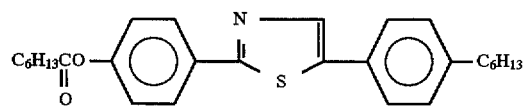
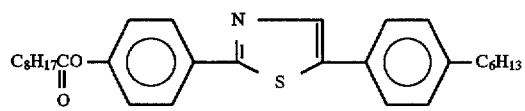
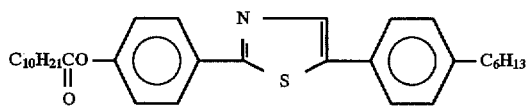
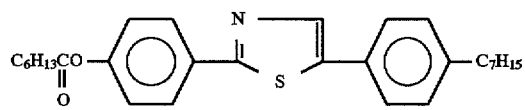
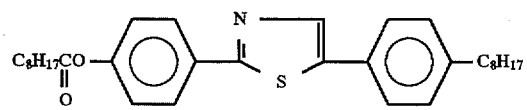
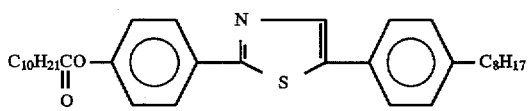
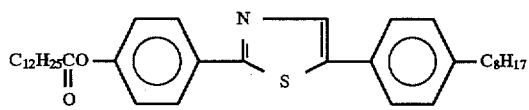
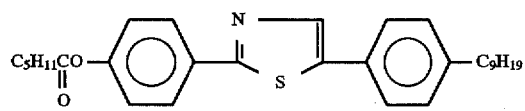
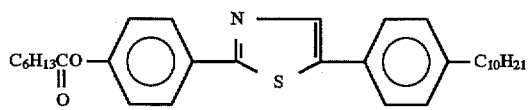
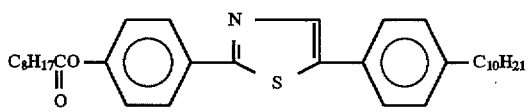
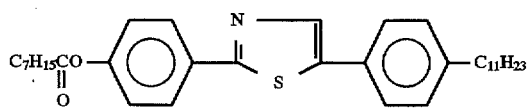
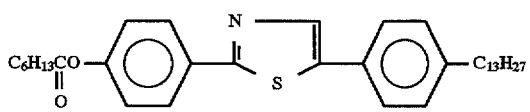
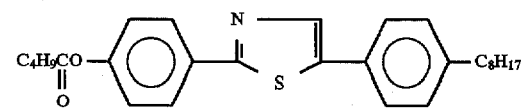
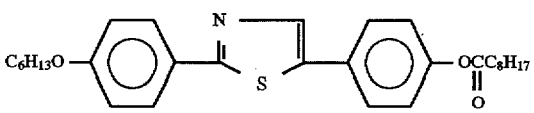
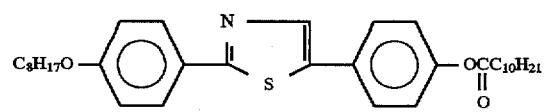
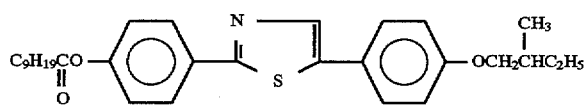
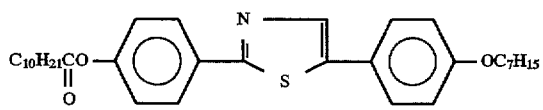
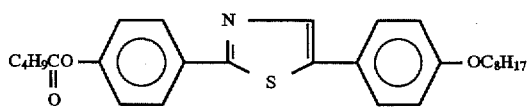

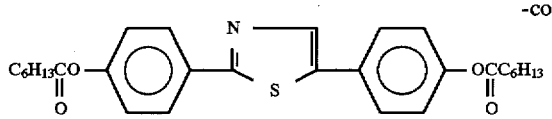
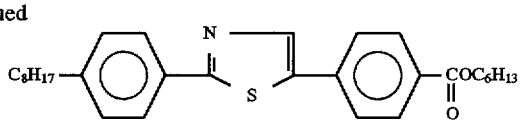
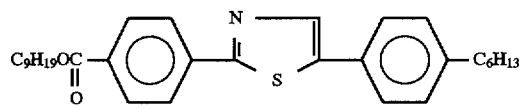
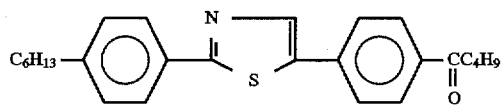
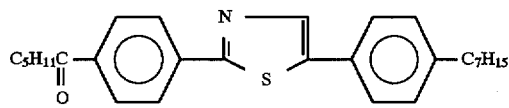

Formula (XII)

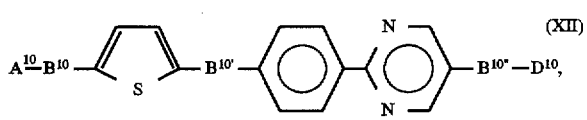    (XII)

in which $A^{10}$ is a linear or branched alkyl group having 1–20 carbon atoms; $B^{10}$, $B^{10'}$ and $B^{10''}$ independently denote a single bond, —O—, —COO— or —OCO—; and $D^{10}$ is a linear or branched alkyl group having 1–20 carbon atoms.

The above mesomorphic compound of the formula (XII) can be synthesized through a process as described in JP-A 2-196785.

Specific examples of the mesomorphic compound of the formula (XII) may include those shown below.

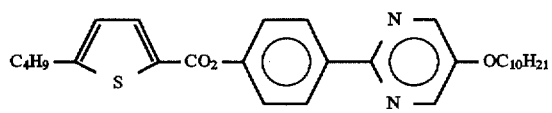
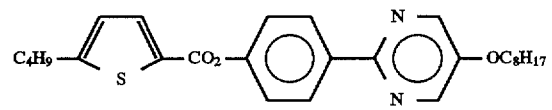
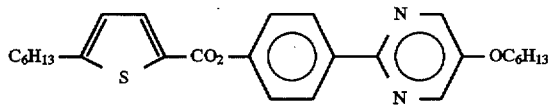
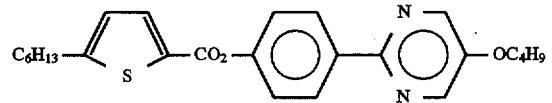
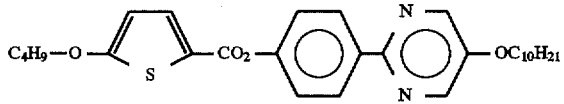
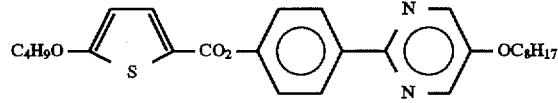
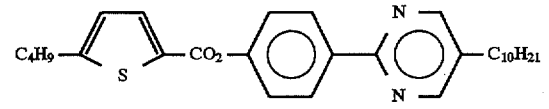

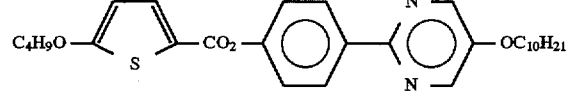
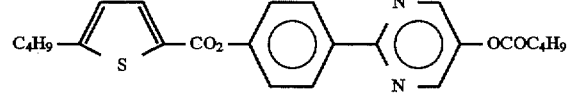
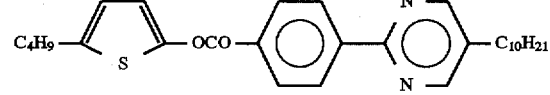
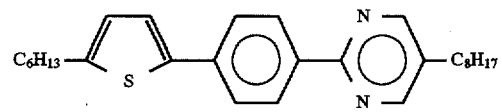
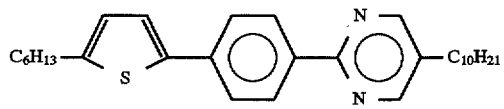
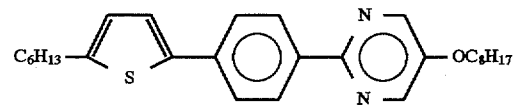

Formula (XIII)

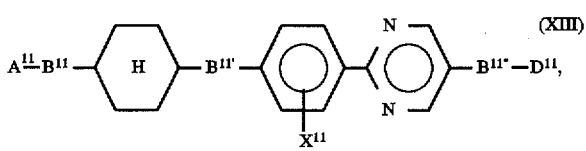    (XIII)

in which $A^{11}$ is a linear or branched alkyl group having 1–20 carbon atoms; $B^{11}$, $B^{11'}$ and $B^{11''}$ independently denote a single bond, —O—, —COO— or —OCO—; $D^{11}$ is a linear or branched alkyl group having 1–20 carbon atoms; and $X^{11}$ is —H or —F.

The above mesomorphic compound of the formula (XIII) can be synthesized through a process as described in JP-A 3-72466.

Specific examples of the mesomorphic compound of the formula (XIII) may include those shown below.

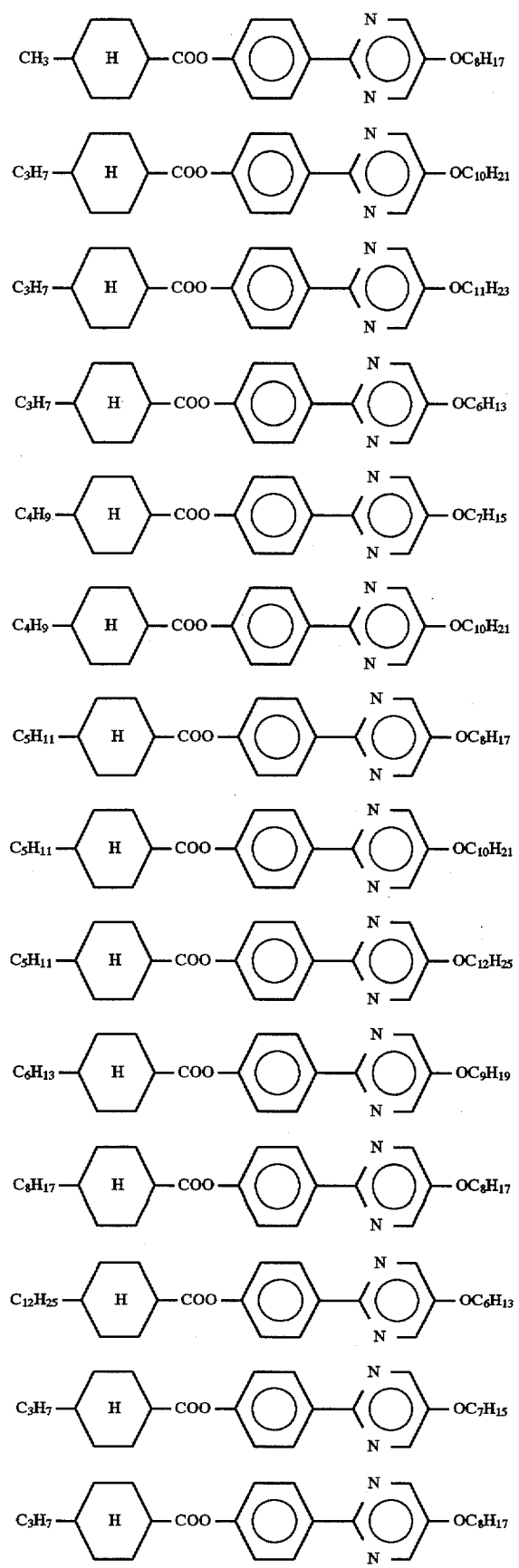
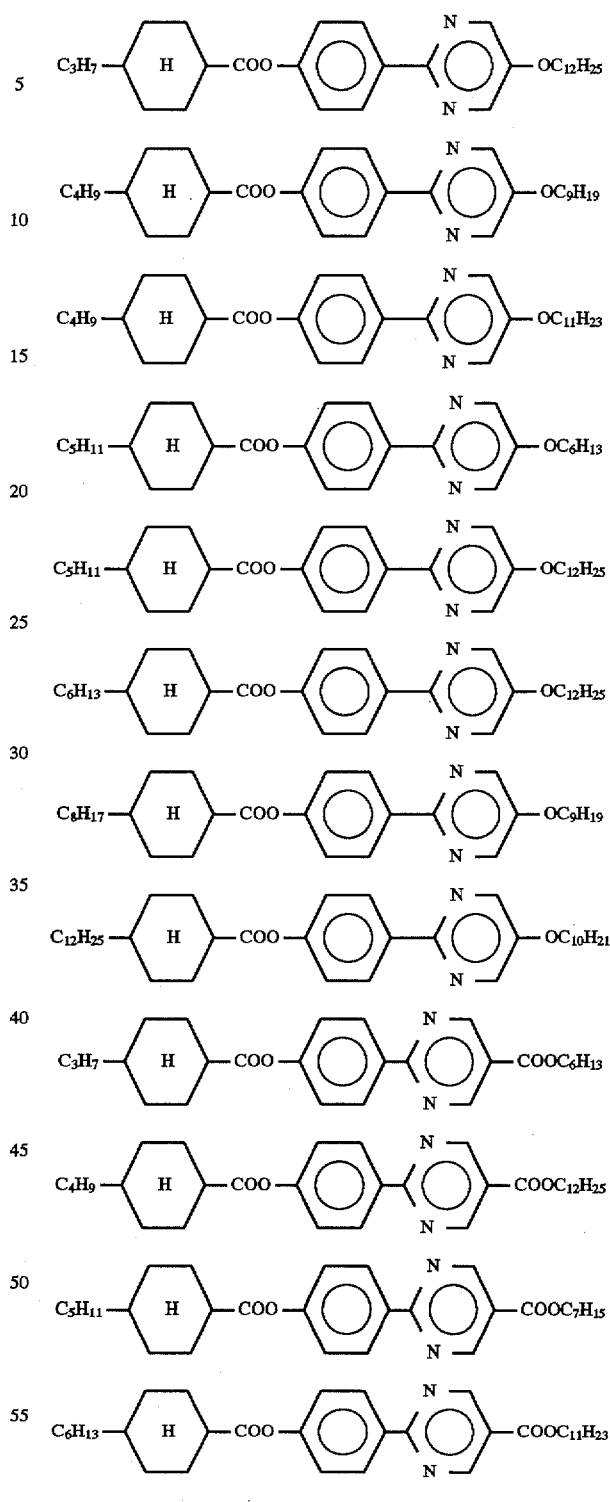
Formula (XIV)
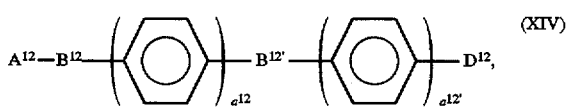
in which $A^{12}$ is a linear or branched alkyl group having 1–20 carbon atoms; $B^{12}$ and $B^{12'}$ independently denote a single bond, —O—, —COO— or —OCO—; $D^{12}$ is a cyano group; and $a^{12}$ and $a^{12'}$ are independently 1 or 2.

The above mesomorphic compound of the formula (XIV) can be synthesized through a process as described in Mol. Cryst. Liq. Cryst., vol. 37, p. 249 (1976)).

Specific examples of the mesomorphic compound of the formula (XIV) may include those shown below.

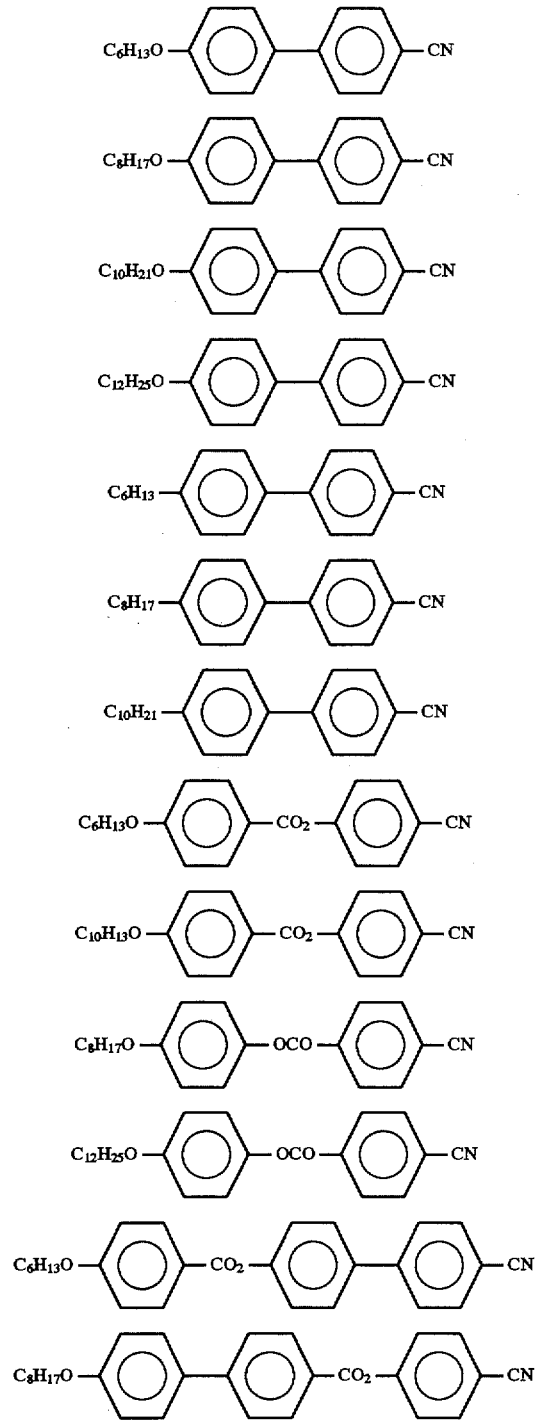

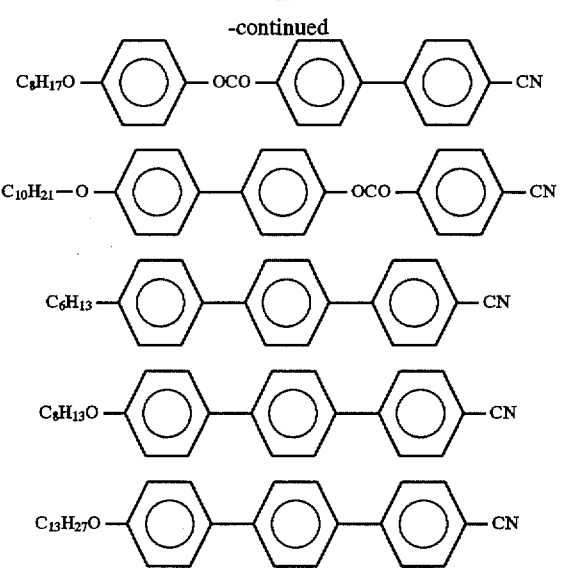

Formula (XV)

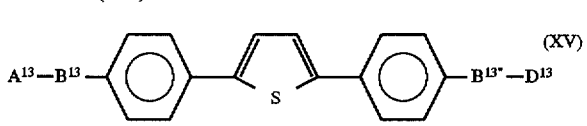

in which $A^{13}$ is a linear or branched alkyl group having 1–20 carbon atoms; $B^{13}$ and $B^{13'}$ independently denote a single bond, —O—, —COO— or —OCO—; and $D^{13}$ is a linear or branched alkyl group having 1–20 carbon atoms.

The above mesomorphic compound of the formula (XV) can be synthesized through a process as described in JP-A 4-46176.

Specific examples of the mesomorphic compound of the formula (XV) may include those shown below.

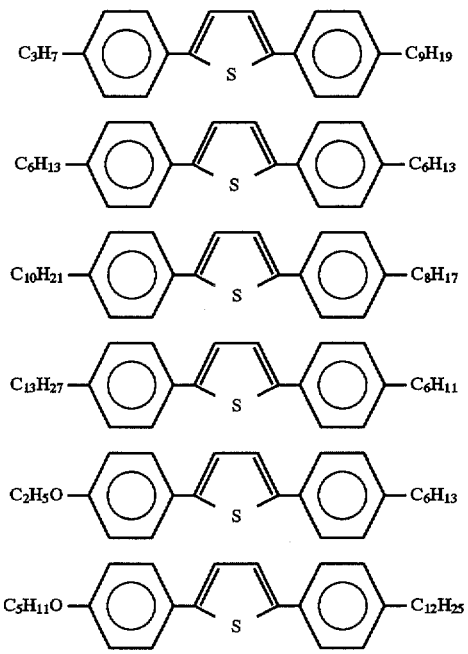

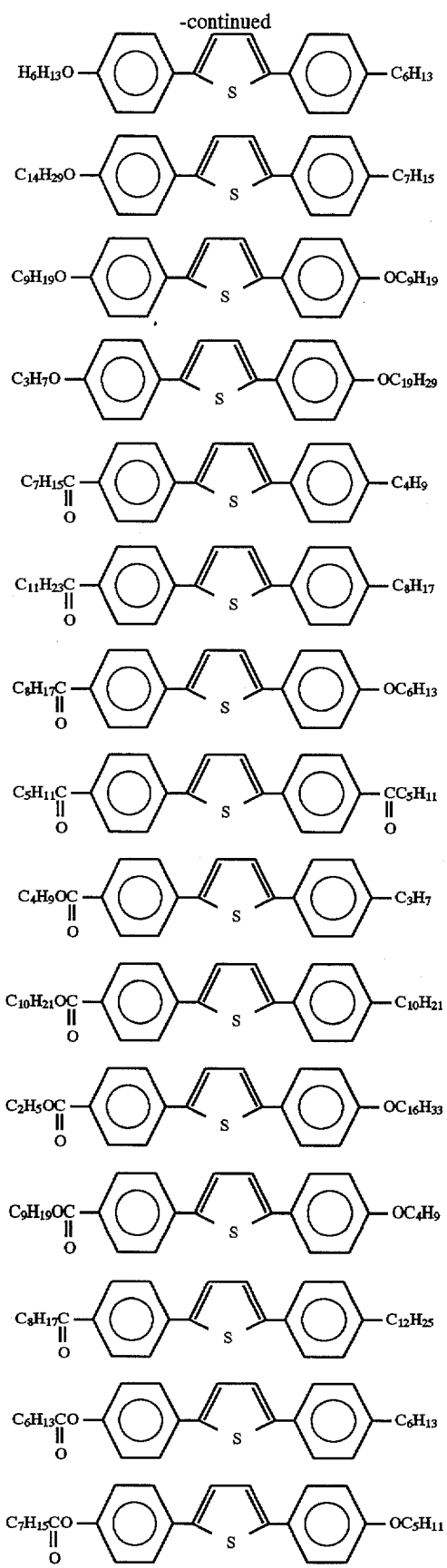

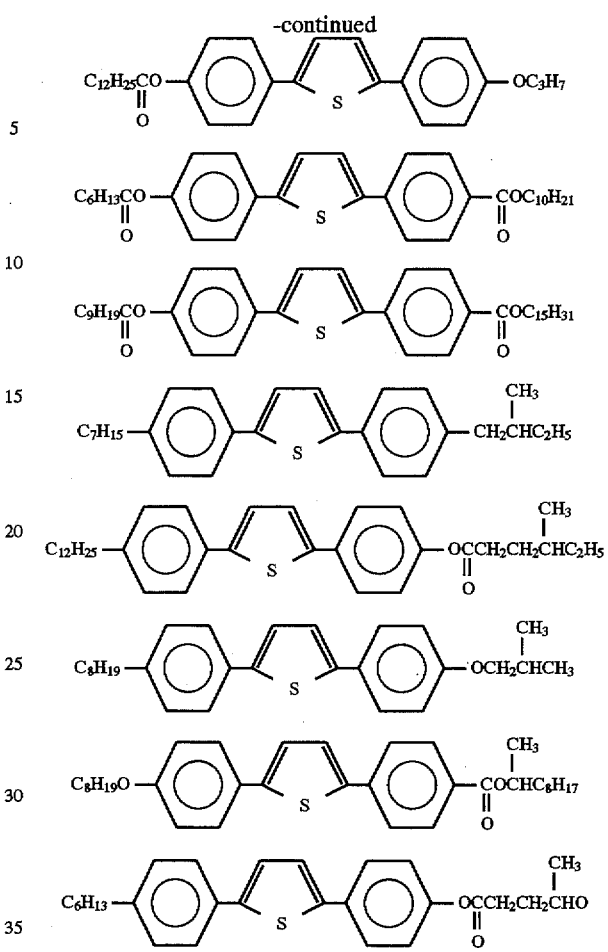

Formula (XVI)

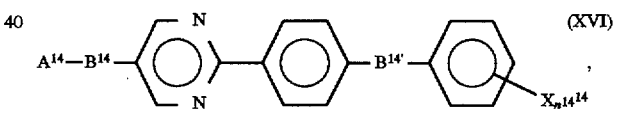

in which $A^{14}$ is a linear or branched alkyl group having 1–20 carbon atoms; $B^{14}$ and $B^{14'}$ independently denote a single bond, —O—, —COO— or —OCO—; $X^{14}$ is —F; and $n^{14}$ is an integer of 1–5.

The above mesomorphic compound of the formula (XVI) having a phenyl-pyrimidine skeleton as a central ring structure can be synthesized through a process as described in JP-A 6-128235 (corn to Japanese Patent Application No. 4-299100).

Specific examples of the mesomorphic compound of the formula (XVI) may include those shown below.

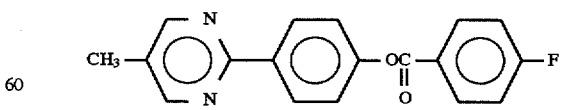

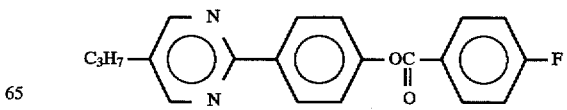

-continued
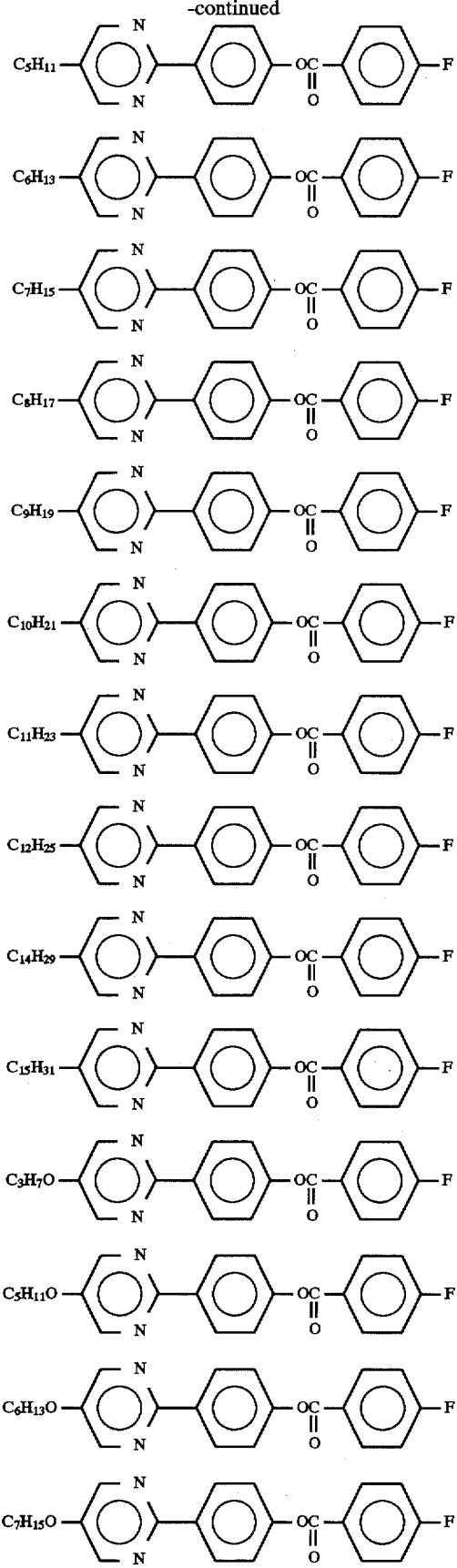
-continued
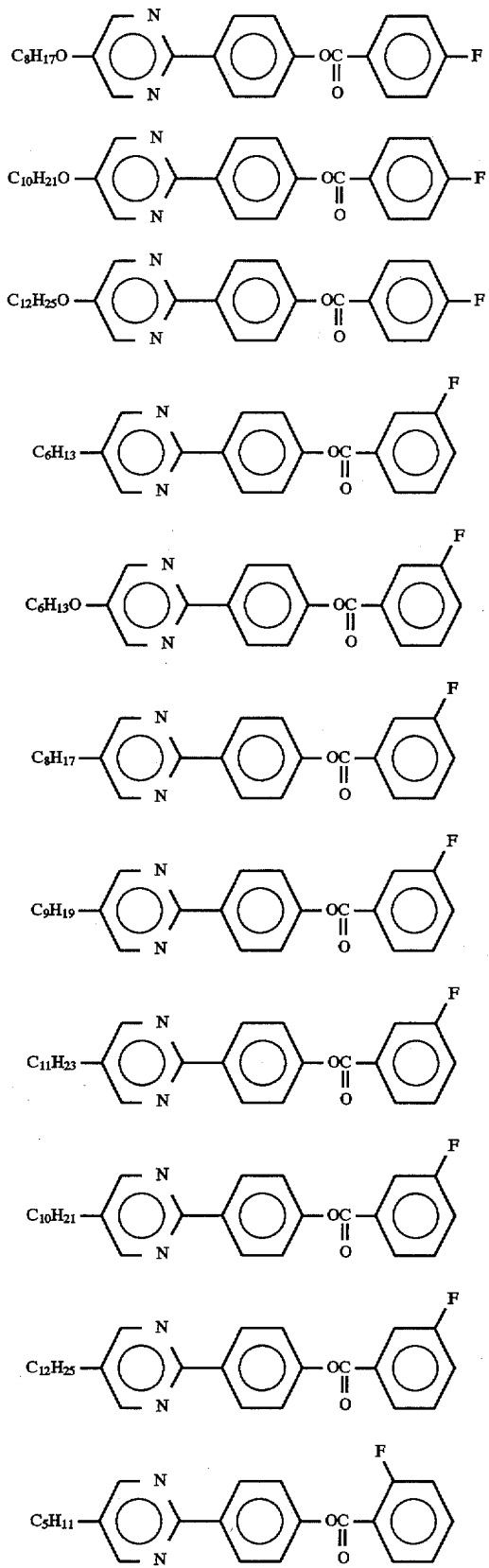

-continued

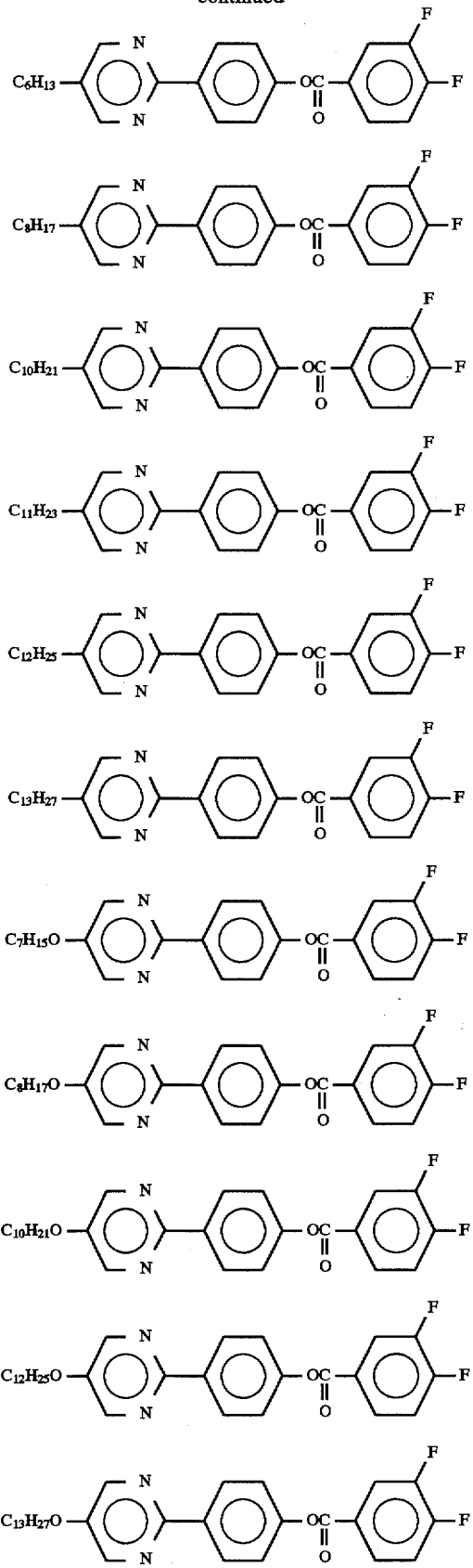
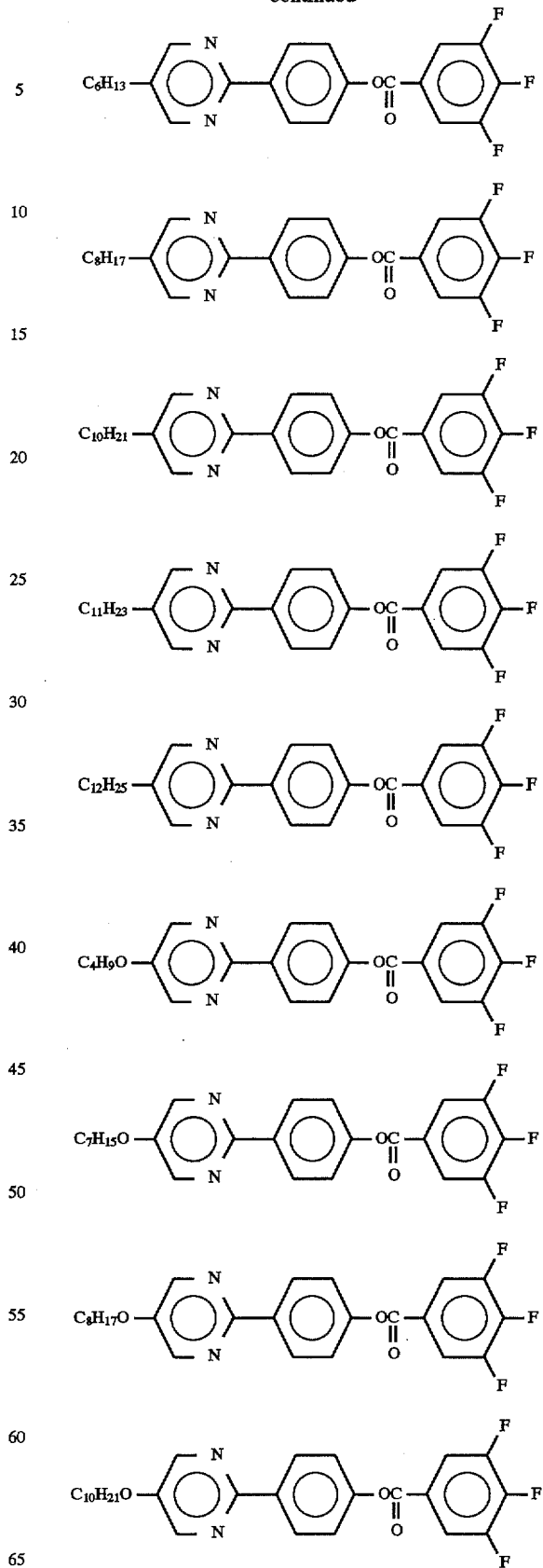

-continued

In order to constitute a chiral smectic liquid crystal composition preferably exhibiting a ferroelectricity, the liquid crystal composition according to the present invention may preferably contain a chiral dopant (chiral doping substance) effective in imparting a spontaneous polarization giving a torque for switching. Such a chiral dopant may include those which have been known as a chiral compound for a chiral smectic liquid crystal composition showing stability and being suitable for a liquid crystal device.

By incorporating a mesomorphic compound used as the mesomorphic compound (b) and represented by any one of the above-mentioned formulae (III) to (XVI) into a liquid crystal composition containing a mesomorphic compound (a) having a terminal perfluoroether group or containing such a mesomorphic compound (a) and a chiral dopant, it is possible to obtain a good alignment state of liquid crystal molecules thereby to stably form a bookshelf structure or a structure closer thereto having a small layer inclination angle against a temperature change and to control a memory angle described hereinafter so as to provide an appropriate value. Such effects can be accomplished without impairing a bookshelf structure, i.e., while keeping a layer inclination angle substantially identical to that in the bookshelf structure, or rather decreasing such a layer inclination angle.

The liquid crystal composition according to the present invention may preferably contain at least 20 wt. %, more preferably at least 30 wt. %, particularly at least 50 wt. %, of at least one species of a fluorine-containing mesomorphic compound (a) preferably represented by the formula (I). If the mesomorphic compound (a) is contained in the liquid crystal composition in proportion of below 20 wt. %, the liquid crystal composition fails to stably provide a liquid crystal layer with a bookshelf structure or its closer structure in some cases.

The liquid crystal composition of the invention may preferably contain at most 50 wt. %, more preferably 0.1–50 wt. %, of at least one species of a chiral compound (b) preferably represented by the formula (II), particularly represented by the formulae (III)–(XVI). Above 50 wt. %, the solubility of the compound (b) in the mesomorphic compound (a) and/or other components of the liquid crystal composition is lowered in some cases.

The liquid crystal composition of the invention may further contain at least one mesomorphic compound represented by the following formula (I'):

$$P'—Q'—A'—W'—B'—(T'—D')_{n'}—U'—V' \qquad (I'),$$

in which

A', B' and D' independently denote a substituted or unsubstituted ring structure selected from an aromatic ring, a heteroaromatic ring, a cycloaliphatic ring and a fused ring of these rings;

Q', W' and T' independently denote a single bond, —O—, —COO—, —OCO—, —C≡C—, —CONR"—, —NR"CO—, —NR"—, —CH$_2$—, —CH=N—, —N=CH—, —CH=CH—, —COS—, —SCO—, —CH$_2$CH$_2$—, —CH$_2$O— or —OCH$_2$— wherein R' is an alkyl group;

n' is 0, 1 or 2;

P' is substituted or unsubstituted alkyl group;

U' is —CO—C$_{m'}$H$_{2m'}$—, —O—C$_{m'}$H$_{2m'}$—, —C$_{m'}$H$_{2m'}$—, —C$_{m'}$H$_{2m'}$—CO—, —C$_{m'}$H$_{2m'}$—O—, —OSO$_2$—, —SO$_2$O—, —C$_{m'}$H$_{2m'}$—SO$_2$—, —SO$_2$— or —SO$_2$—C$_{m'}$H$_{2m'}$— where m' is an integer of 1–20; and V' is —C$_{p'}$F$_{2p'+1}$ where p' is an integer of 1–15.

The mesomorphic compound of the formula (I') has a terminal perfluoroalkyl group (—C$_{p'}$F$_{2p'+1}$), examples of which may include those as descried in JP-A Nos. 2-69443, 2-142753, 4-13649, 4-26679. The mesomorphic compound of the formula (I') and the above-mentioned mesomorphic compound of the formula (I) having a terminal perfluoroether group (—(C$_x$F$_{2x}$O)$_z$C$_y$F$_{2y+1}$) have a mutual solubility in each other, thus suitably being used for controlling various properties such as a phase transition temperature.

Specific examples of the mesomorphic compound of the formula (I') may include those (Ex. Comp. Nos. I'-1 to I'-83) shown below.

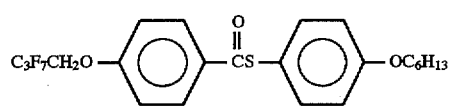

I'-1

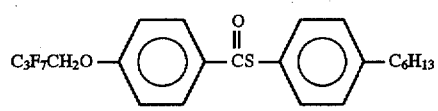

I'-2

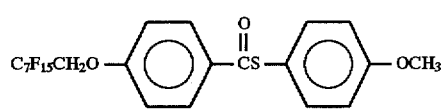

I'-3

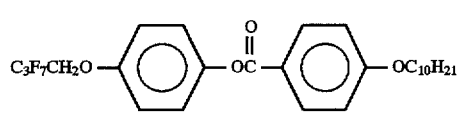

I'-4

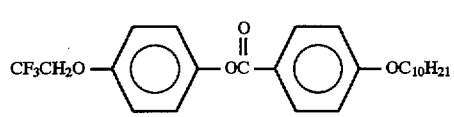

I'-5

-continued
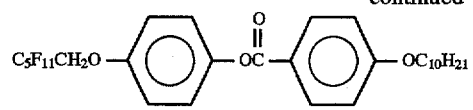 I-6
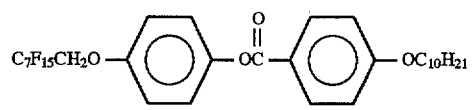 I-7
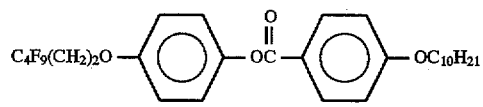 I-8
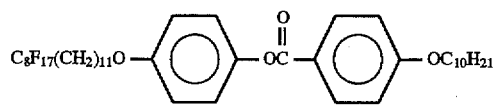 I-9
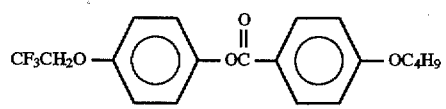 I-10
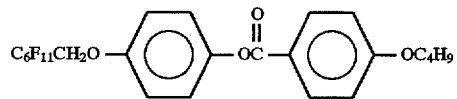 I-11
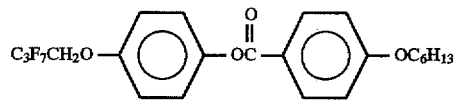 I-12
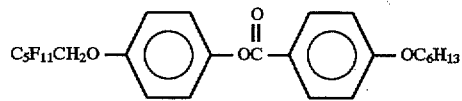 I-13
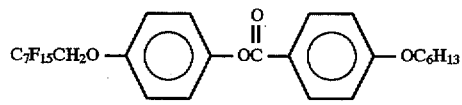 I-14
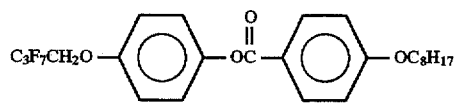 I-15
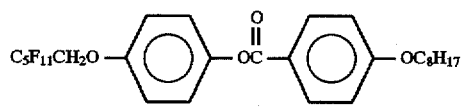 I-16
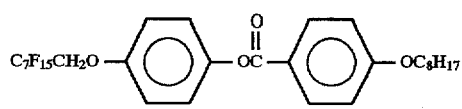 I-17
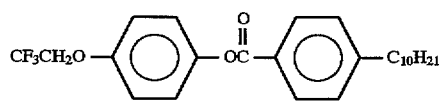 I-18
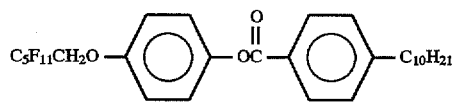 I-19

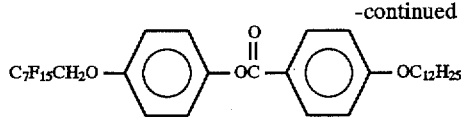 I-20
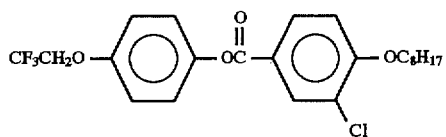 I-21
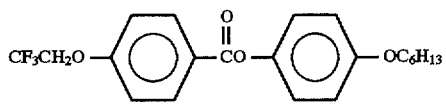 I-22
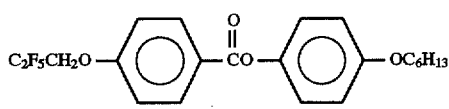 I-23
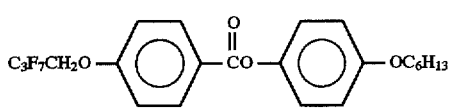 I-24
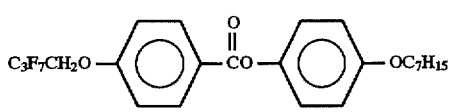 I-25
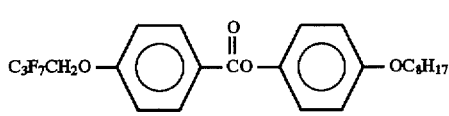 I-26
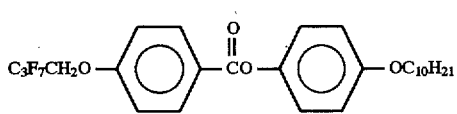 I-27
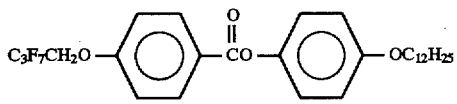 I-28
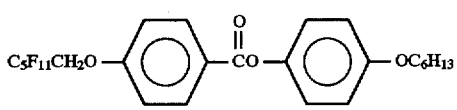 I-29
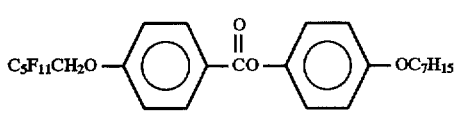 I-30
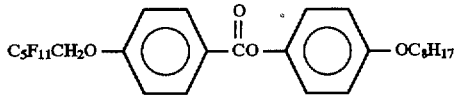 I-31
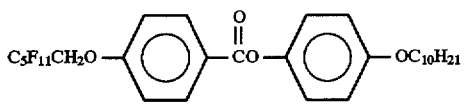 I-32
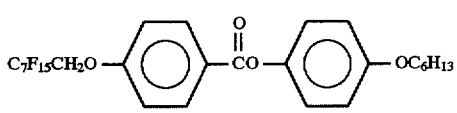 I-33

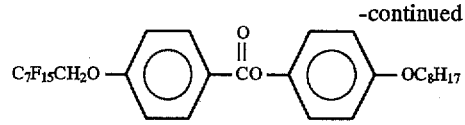 I-34
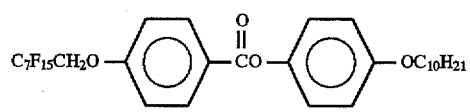 I-35
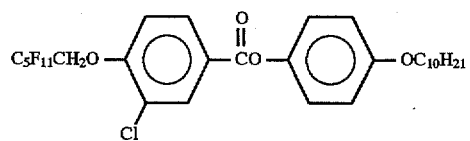 I-36
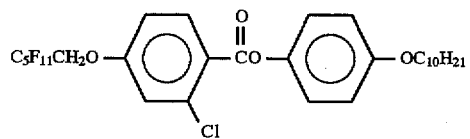 I-37
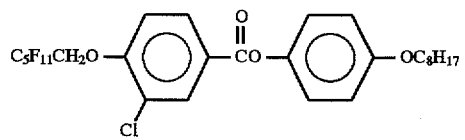 I-38
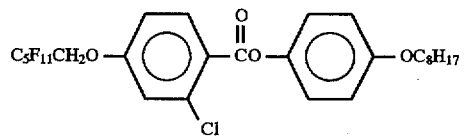 I-39
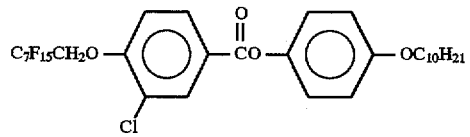 I-40
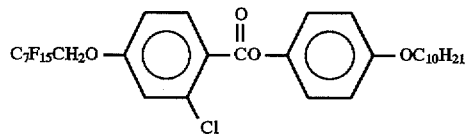 I-41
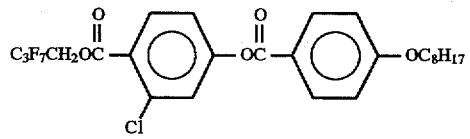 I-42
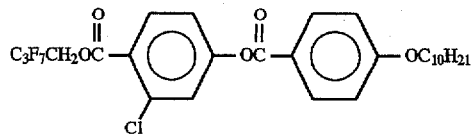 I-43
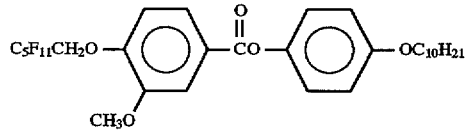 I-44
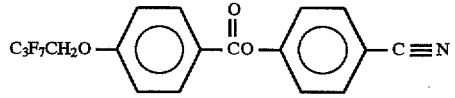 I-45

-continued
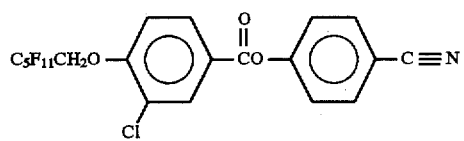
I-46
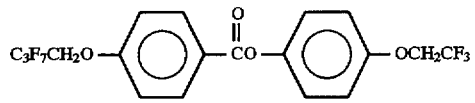
I-47
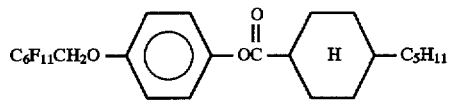
I-48
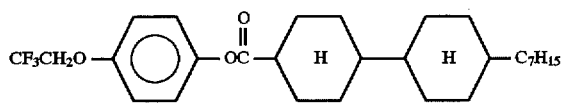
I-49
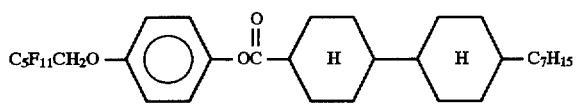
I-50
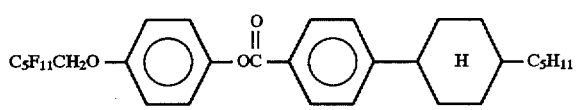
I-51
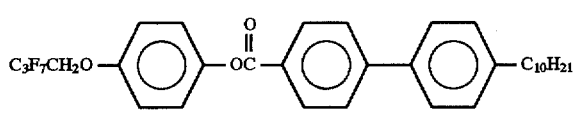
I-52
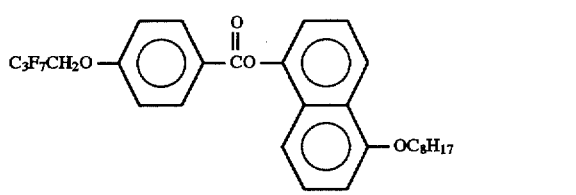
I-53
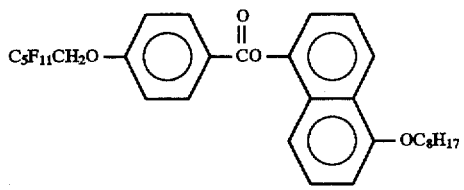
I-54
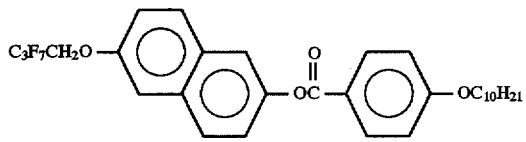
I-55
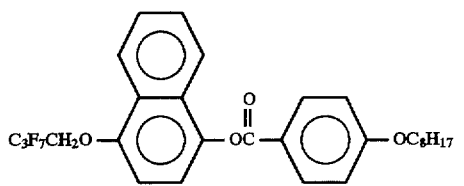
I-56

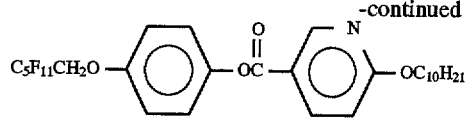 I-57
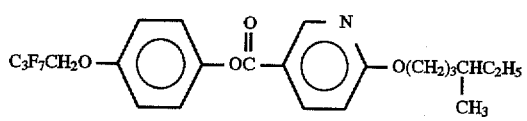 I-58
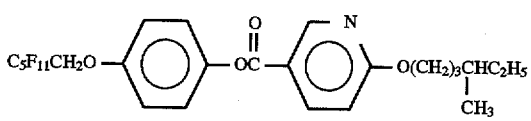 I-59
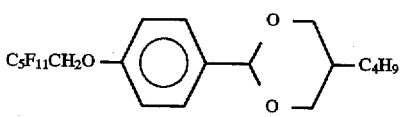 I-60
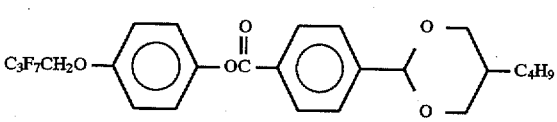 I-61
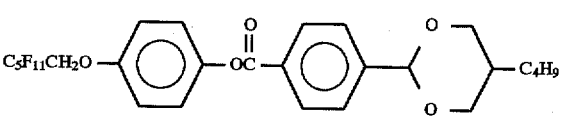 I-62
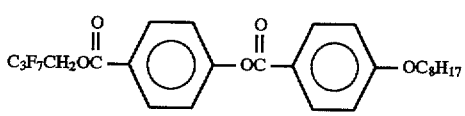 I-63
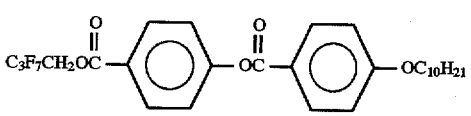 I-64
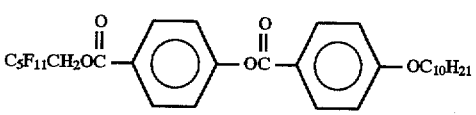 I-65
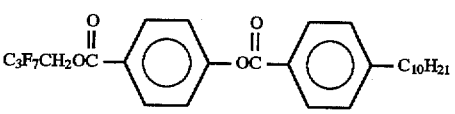 I-66
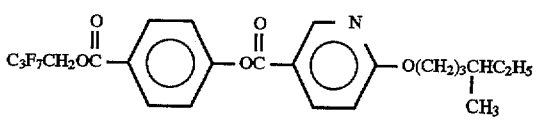 I-67
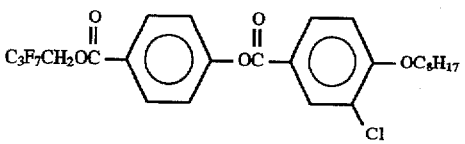 I-68
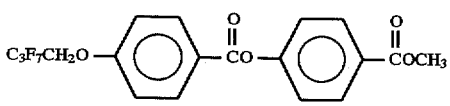 I-69
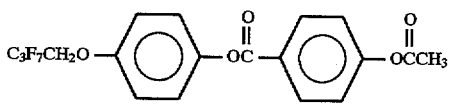 I-70

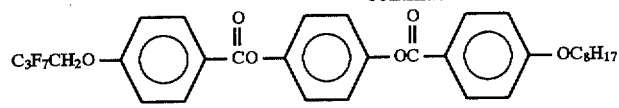 I-71
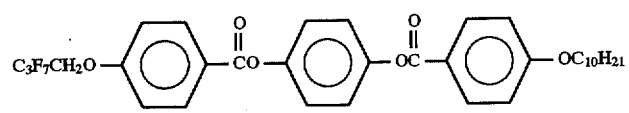 I-72
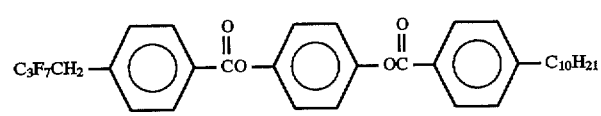 I-73
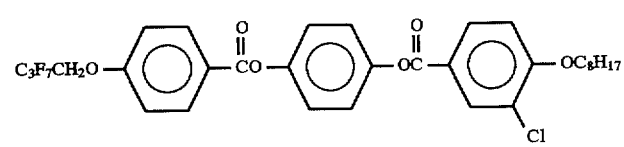 I-74
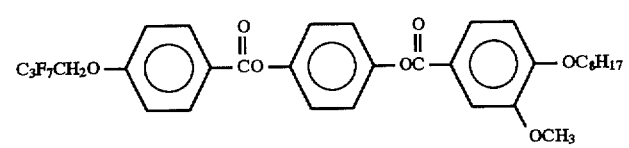 I-75
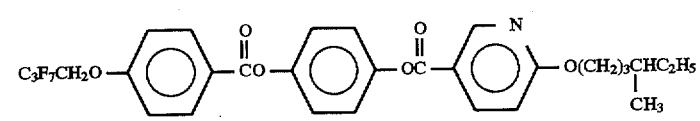 I-76
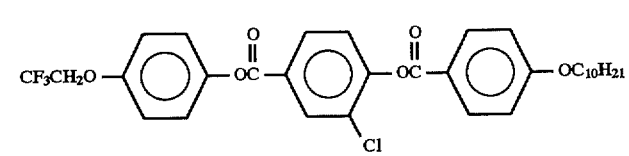 I-77
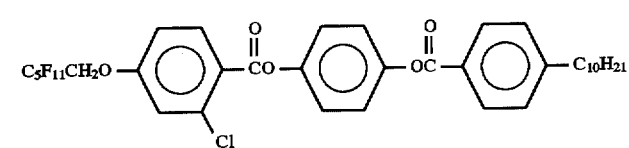 I-78
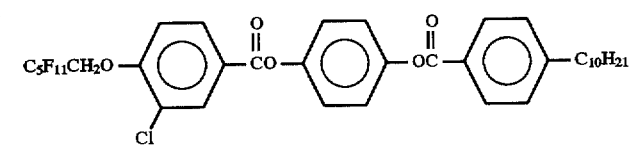 I-79
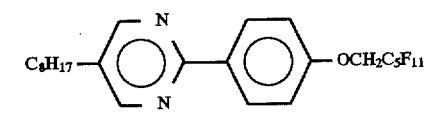 I-80
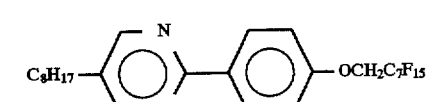 I-81
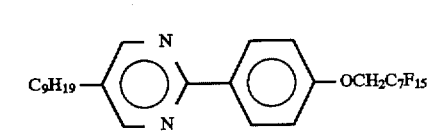 I-82

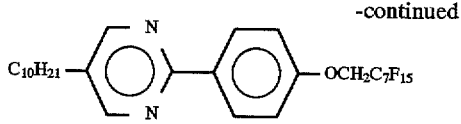

I-83

The liquid crystal composition according to a second aspect of the present invention comprises a liquid crystal (c) containing one or two or more mesomorphic compounds, at least one of which is a fluorine-containing mesomorphic compound having a perfluorocarbon terminal portion and comprises at least one compound (d) having a limit of solubility in the liquid crystal (c). The liquid crystal composition can exhibit a bookshelf structure or a structure closer thereto having a small layer inclination angle similarly as in the liquid crystal composition according to the first aspect of the invention descried above by appropriately selecting a liquid crystal (c) and a compound (d) in combination. The liquid crystal (c) may preferably comprise a fluorine-containing mesomorphic compound having a perfluoroalkyl group or a perfluoroether group as a perfluorocarbon terminal portion. In order to obtain a good alignment state, the compound (d) is contained in the liquid crystal composition in a proportion ranging from 20% (by weight) of a limit of solubility (or compatibility) in the liquid crystal (c) to below the limit of solubility.

Herein, "a compound having a limit of solubility" may preferably include a compound (e.g., compound (d)) having a solubility limit (or compatibility limit) thereof in a base (or host) liquid crystal of at most 20 wt. %, particularly at most 10 wt. % based on a resultant liquid crystal composition (i.e., a total of the compound and the base liquid crystal) at a lowermost temperature where the base liquid crystal is usable or operatable (e.g., at −20° C.). The solubility limit (limit of solubility) can be confirmed by determining the content of the compound within a resultant mixture which starts to cause precipitation or phase separation. For instance, a case where 20 g of a compound (d) mixed with 80 g of a base liquid crystal starts to cause precipitation, the compound (d) is used together with the base liquid crystal in an amount of 4 g to below 20 g in ia resultant liquid crystal composition (100 g).

The fluorine-containing compound in the liquid crystal (c) may include compounds, preferably compounds of the formula (I), used as the compound (a) contained in the liquid crystal composition according to the first aspect of the present invention and those represented by the above-mentioned formula (I'). More specifically, examples of such a fluorine-containing compound may include those of Ex. Comp. Nos. I-1 to I-20 and I'-1 to I'-81 as described above.

In the liquid crystal composition according to the second aspect of the invention, the compound (d) may include compounds of the formula (II) used as the compound (b) and may preferably include compounds of any one of the formula (III)–(XVI) described above in view of mutual solubility with the liquid crystal (c).

According to a third aspect of the invention, there is provided a liquid crystal composition, comprising: a liquid crystal comprising at least one mesomorphic compound having a mesomorphic phase free from cholesteric phase: and at least one compound (e) having a limit of solubility in the liquid crystal, said liquid crystal composition containing said compound (e) in a proportion ranging from 20% of the limit of solubility to below the limit of solubility.

Hereinbelow, a mechanism of a improvement in an alignment state of the liquid crystal composition (particularly a chiral smectic or ferroelectric liquid crystal composition) according to the third aspect of the invention will be explained more specifically.

A ferroelectric liquid crystal exhibits bistability in a chiral smectic C (SmC*) phase. Such an alignment state is formed by gradually cooling the ferroelectric liquid crystal from an isotropic liquid (Iso) phase. Accordingly, a phase transition series between Iso phase and SmC* phase largely affects formation of such an alignment. In view of a thermodynamic stability, the following four phase transition series are considered.

(1) Iso—Ch—SmA—SmC*
(2) Iso— — —SmA—SmC*
(3) Iso—Ch— — — —SmC*
(4) Iso— — — — — —SmC*

Iso: isotropic phase, Ch: cholesteric phase, SmA: smectic A phase, SmC*: chiral smectic C phase.

Figure 1:
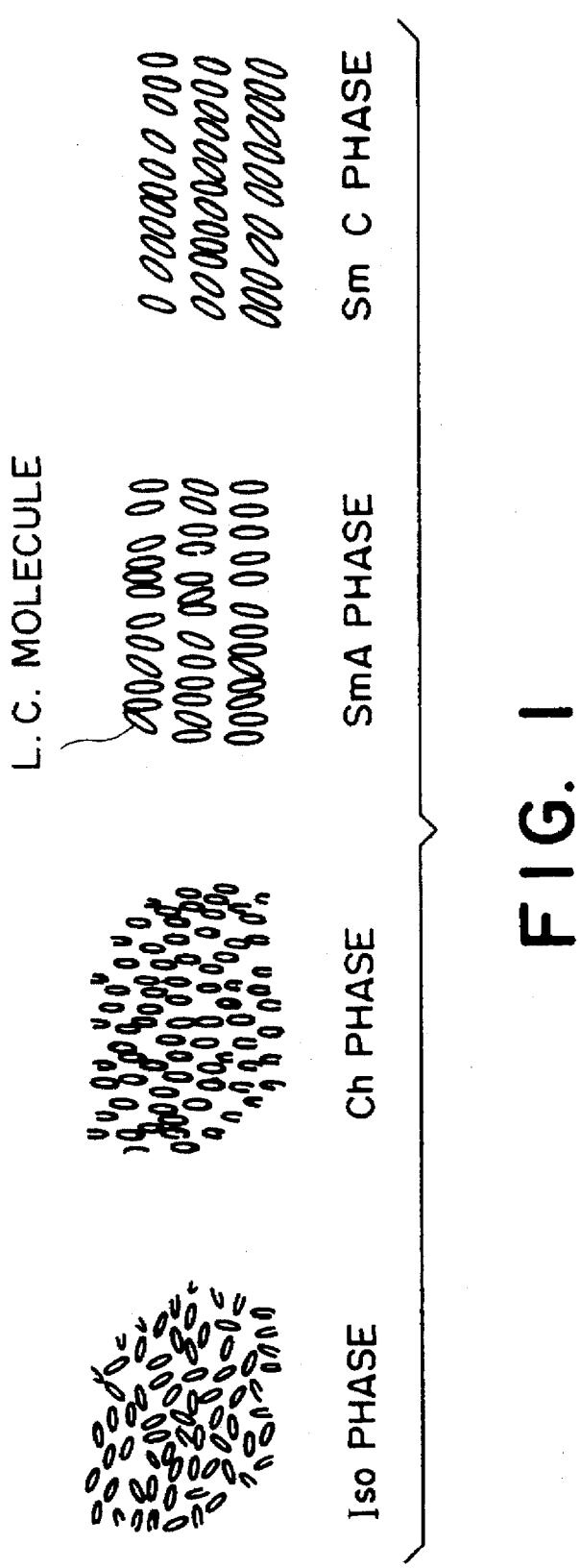
FIG. 1 is a set of schematic views showing a state of liquid crystal molecules placed in various mesomorphic phases.

FIG. 1 illustrates alignment states of liquid crystal molecules in various (mesomorphic) phases.

A liquid crystal composition showing the phase transition series (1) is liable to exhibit a uniform (or homogeneous) alignment since liquid crystal molecules forms an alignment state through the steps of: forming an order of alignment in the longer axis direction of the liquid crystal molecules in Iso —Ch phase transition, forming an order of their position (or layer structure) in Ch—S'mA phase transition, and exhibiting a tilt of the liquid crystal molecules in SmA—SmC* phase transition. However, in cases of liquid crystal compositions showing the phase transition series (2), (3) and (4), it is difficult to obtain a uniform alignment in many cases since plural order formations are caused simultaneously. More specifically, an order of alignment in the longer axis direction and layer formation of liquid crystal molecules in the phase transition series (2), layer formation and a tilt of liquid crystal molecules in the phase transition series (3), and an order of alignment in the longer axis direction, layer formation and a tilt of liquid crystal molecules in the phase transition series (4) are caused at the same time, respectively.

The liquid crystal composition of the invention is principally directed to realize a uniform alignment state of a liquid crystal composition showing the above phase transition series (2).

According to our study, a liquid crystal composition showing the phase transition series (2) exhibits a course of Iso—SmA phase transition as schematically illustrated in FIG. 2. Referring to FIG. 2, we have found that batonnets (almost elliptical or elongated shape regards of SmA phase) are generated during Iso—SmA phase transition and grow into a complete SmA phase by connection of these batonnets. We also found that alignment defects are caused by a random growing direction of batonnets or connection failure between batonnets and are decreased by increasing a density of batonnets. The reason has not been clarified yet but may attributable to the fact that, e.g., in the case of a high batonnet density, a difference in size between batonnets becomes small to allow connection between batonnets having substantially equal spacings of a smectic layer, so that connection between batonnets are readily performed to realize a uniform alignment state free from alignment defects.

Accordingly, in the present invention, a compound (e) having a limit of solubility in a liquid crystal (as a matrix or base material) showing no cholesteric phase is contained in a resultant liquid crystal composition in a proportion of at least 20% of the solubility limit to below the solubility limit in order to actively increase a batonnet density. The compound (e) may preferably be added to a matrix material (or base (host) liquid crystal) within a range improving alignment uniformity (or homogeneity) and not adversely affecting properties of the matrix material. The above lower limit of an addition amount, i.e., at least 20% of the solubility limit, is fixed in view of improvement in alignment uniformity. In order to decrease the addition amount of the compound (e), the compound (e) may preferably have a high crystallinity (or crystallization), i.e., a large enthalpy of fusion, and/or a higher phase transition temperature to a crystal phase than that of the matrix material. In view of a further improvement in alignment uniformity, the compound (e) may preferably be contained in a resultant liquid crystal composition in a proportion of 40% of the solubility limit to below the solubility limit.

In the present invention, most of the compound (a) preferably represented by the formula (I) and the compound (c) preferably represented by the formula (I) or (I') described above include mesomorphic compounds substantially not showing a cholesteric phase. Accordingly, the compound (a) and the compound (c) may preferably be used as a base liquid crystal. By using the compound (a) and/or (b) as the base liquid crystal, it is possible to realize a liquid crystal composition capable of stably exhibiting a bookshelf structure and alignment uniformity. In other words, it is possible to provide a liquid crystal composition according to the first aspect or the second aspect of the present invention with a further improved uniform alignment state.

Specific examples of the liquid crystal (as a matrix material) not showing a cholesteric phase may include those having a perfluoroether group (e.g. I-1 to I-20) or a perfluoroalkyl group (e.g., I'-1 to I'-81) as described above. These compounds may be selected in view of their phase transition series.

Other specific examples of the liquid crystal showing no cholesteric phase are as follows.

On the other hand, the compound (e) having a limit of solubility in the matrix material (base liquid crystal) may preferably include the compound (b) (or (d)) preferably having the formula (II), more preferably having the formulae (III) to (XVI) while taking a solubility thereof in the matrix material into consideration.

The compound (e) is used as a nucleating additive (nucleator) to be added to the matrix material and may preferably include compounds having a high crystallinity, i.e., a large enthalpy of fusion as described above. More specifically, the compound(e) may preferably include compounds having an enthalpy of fusion ($\Delta H$) of 25 J/g or above.

In order to further enhance the effect of an improvement in alignment uniformity, the compound (e) may preferably have a phase transition temperature (herein, sometimes referred to as "$T_{PT}$") from isotropic phase to mesomorphic phase or from isotropic phase to crystal phase higher than a phase transition temperature of the liquid crystal (having no cholesteric phase) from isotropic phase to smectic A phase.

Specific and preferred examples of the compound (e) may include those enumerated below.

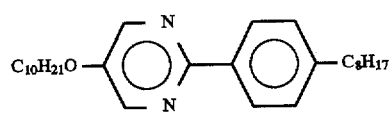

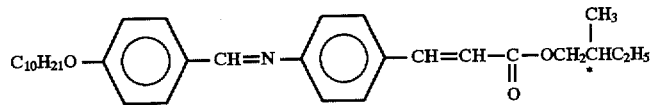

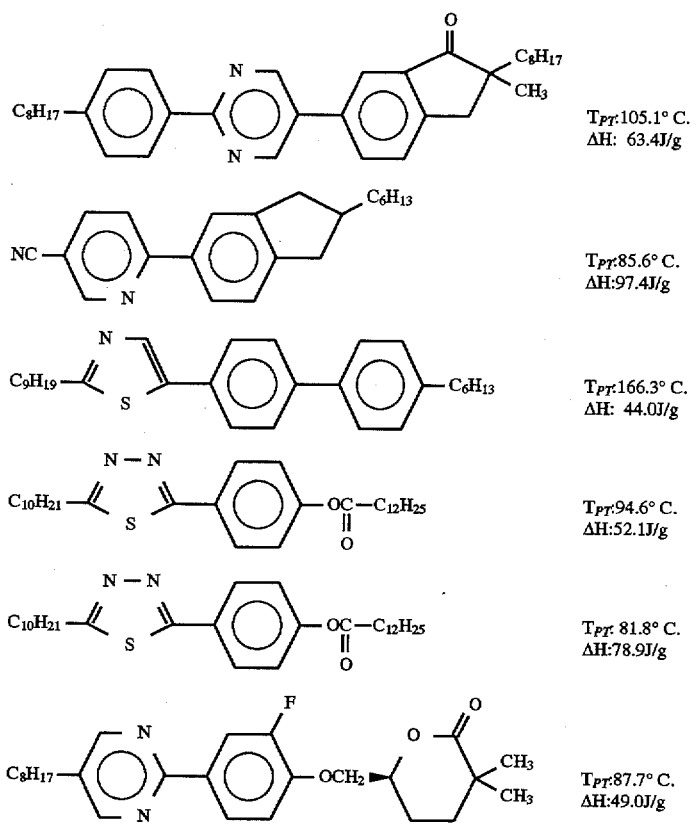

The liquid crystal composition of the invention may further contain at least one mesomorphic compound different from those described above and additives such as an antioxidant, an ultraviolet ray-absorbing agent, a colorant and a pigment as desired.

The liquid crystal device according to the present invention may preferably be a chiral smectic liquid crystal device using the above-mentioned liquid crystal composition.

Hereinbelow, an embodiment of the liquid crystal device of the present invention will be explained with reference to FIG. 3.

Figure 3:
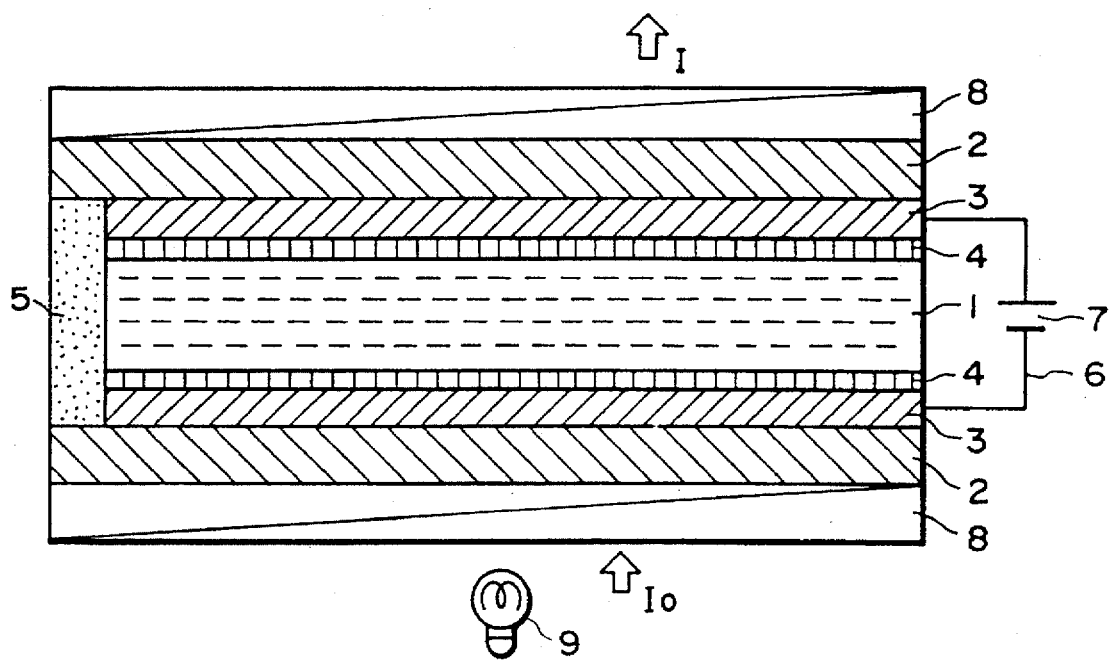
FIG. 3 is a schematic sectional view of a liquid crystal device using a liquid crystal composition according to the present invention.

FIG. 3 is a schematic sectional view of an embodiment of the chiral smectic liquid crystal device for explanation of the structure thereof.

Referring to FIG. 3, the liquid crystal device includes a liquid crystal layer 1 comprising a chiral smectic liquid crystal composition disposed between a pair of substrates 2 each having thereon a transparent electrode 3 and an alignment control layer 4. In the present invention, the transparent electrode 3 may be formed on one of the substrates 2. The substrates 2 are placed or arranged opposite each other. The periphery of the substrates 2 is sealed up with a sealing agent 5. Lead wires 6 are connected to the electrodes so as to apply a driving voltage to the liquid crystal layer 1 from a signal power supply 7. Outside the substrates 2, a pair of polarizers 8 are disposed so as to modulate incident light $I_0$ from a light source 9 in cooperation with the liquid crystal 1 to provide modulated light I.

The liquid crystal layer 1 may preferably have a thickness of at most 5 μm in order to exhibit bistability. Each of two substrates 2 comprise glass or plastic and is coated with a transparent electrode 3 comprising a film of $SnO_2$, $In_2O_3$, $SnO_2$ or ITO (indium-tin-oxide) to form an electrode plate.

Further thereon, the alignment control layer 4 is formed by applying a solution containing a material for the alignment control layer or by vapor deposition or sputtering of a material for the alignment control layer. Examples of the material for the alignment control layer 4 may include: an inorganic material, such as silicon monoxide, silicon dioxide, aluminum oxide, zirconium oxide, magnesium fluoride, cerium oxide, cerium fluoride, silicon nitride, silicon carbide, or boron nitride; and an organic material, such as polyvinyl alcohol, polyimide, polyamide-imide, polyester, polyamide, polyester-imide, polyparaxylylene, polycarbonate, polyvinyl acetal, polyvinyl chloride, polyvinyl acetate, polystyrene, cellulose resin, melamine resin, urea resin or acrylic resin. The surface of thus prepared alignment control layer 4 is subjected to uniaxial alignment treatment by rubbing the surface with a fibrous material such as velvet, cloth or paper. The uniaxial alignment treatment (rubbing treatment) may preferably be performed to one of the alignment control films 4. The alignment control layer 4 may be formed by an oblique vapor deposition method wherein a film of an oxide such as $SiO_2$ or an nitride is vapor-deposited on the electrode plate(s) from the oblique direction to the electrode plate.

In view of ease of formation and a high alignment control ability, the alignment control layer 4 may preferably comprise a polyimide film or a polyamide film formed by applying, e.g., a polyimide precursor solution or a polyamic acid solution and curing the solution, followed by uniaxial alignment treatment, particularly rubbing treatment of the resultant film. Examples of a polyimide and a polyamide used for forming the alignment control layer 4 may preferably include those having a molecular structure with a high rigidity, a high linear property and a high crystallinity in order to uniformly align the chiral smectic liquid crystal composition. Such a polyimide and polyamide may preferably be represented by the following formula (XVII) and formula (XVIII), respectively.

Formula (XVII)

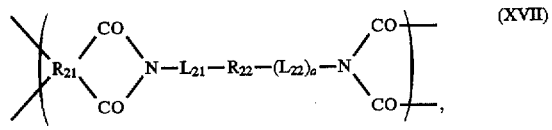  (XVII)

in which $R_{21}$ is

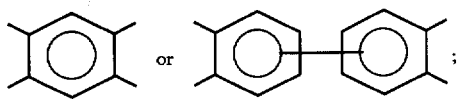

$L_{21}$ and $L_{22}$ independently denote 1,4-phenylene;

$R_{22}$ is a single bond or —O—; and a is 0, 1 or 2.

Formula (XVIII)

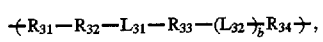  (XVIII)

in which $R_{31}$ is 1,4-phenylene or an alkylene group having 1–20 carbon atoms;

$L_{31}$ and $L_{32}$ are independently

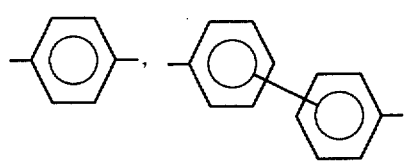

or an alkylene group having 1–20 carbon atoms:

$R_{32}$ and $R_{34}$ are independently —CONH— or —NHCO—;

$R_{33}$ is a single bond or —O—; and b is 0, 1 or 2.

Specific examples of the polyimide of the formula (XVII) and the polyamide of the formula (XVIII) may include those having the following recurring units shown below.

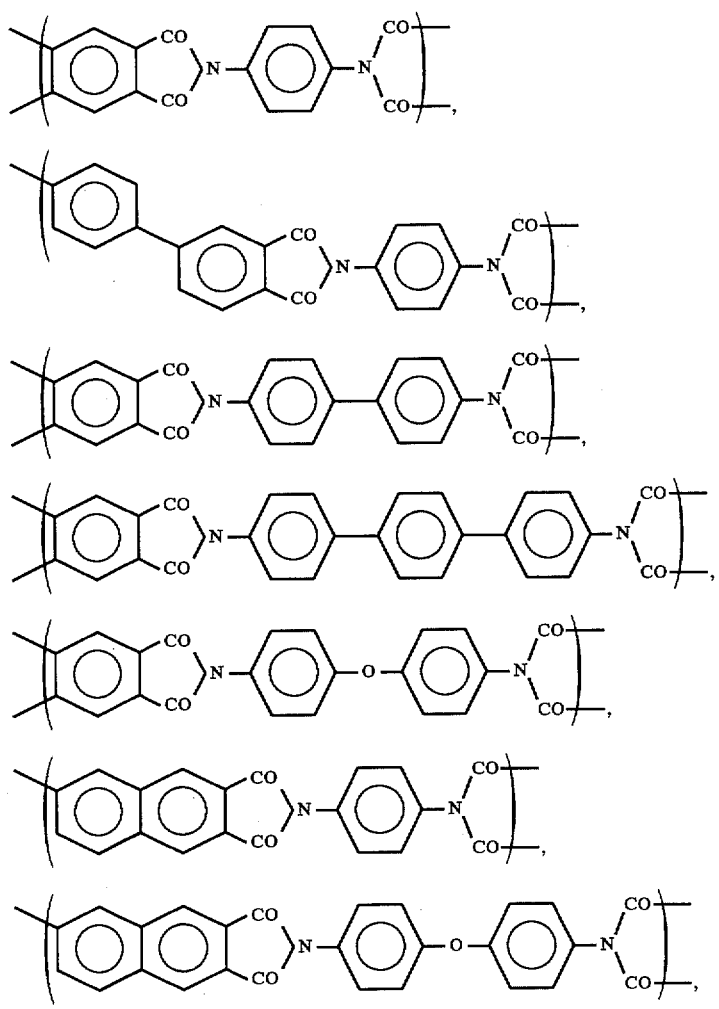

-continued

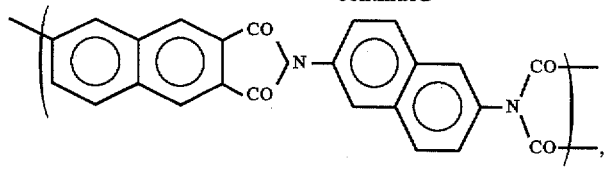

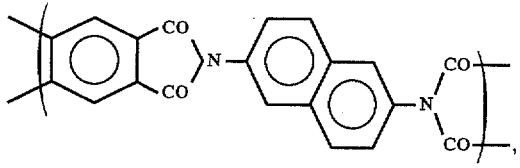

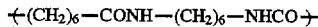

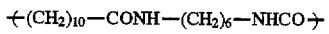

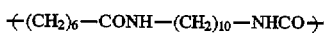

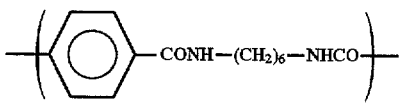

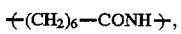

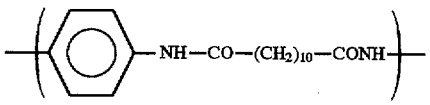

One of the alignment control layers formed on one substrate may comprise a material therefor which is different from that for the other alignment control layer in order to improve an alignment characteristic in the case of providing a bookshelf structure.

The liquid crystal device of the invention may further comprise a short circuit-preventing layer for the pair of substrates such as an insulating layer, an inorganic material layer and an organic material layer other than those for the above-mentioned alignment control layer. The pair of substrates 2 are held to have a prescribed (but arbitrary) gap with a gap-controlling spacer (not shown) of, e.g., silica beads or alumina beads. A voltage is applied to the liquid crystal layer 1 through the transparent electrode 3 in accordance with a switching signal from the signal power supply 7, thus effecting switching. As a result, the liquid crystal device functions as a light valve such a a display device. Further, in case where two electrodes are arranged in matrix on the pair of substrates, it is possible to perform pattern display and pattern exposure, so that the liquid crystal device is used as a display device for a personal computer, a word processor, etc., or a light valve for a printer. The liquid crystal device may be arranged in various modes or forms as long as it uses a liquid crystal containing mesomorphic compounds as described above as essential components thereby to impart required functions.

The liquid crystal device according to the present invention is used as an active element, particularly an active display element, for various liquid crystal apparatus, one embodiment of which is described below.

Figure 4:
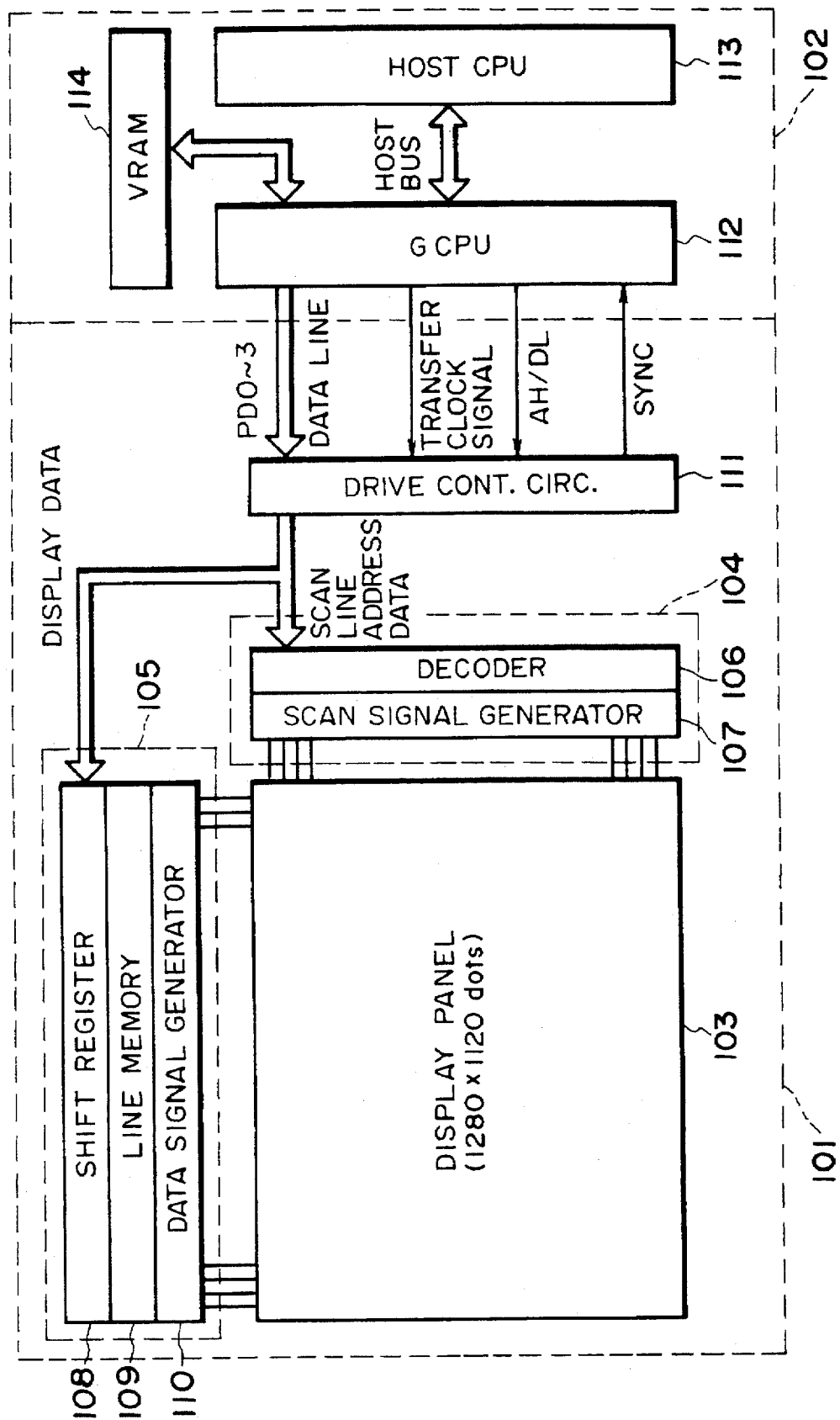
FIG. 4 is a block diagram showing a display apparatus comprising a liquid crystal device utilizing a liquid crystal composition and a graphic controller.
Figure 5:
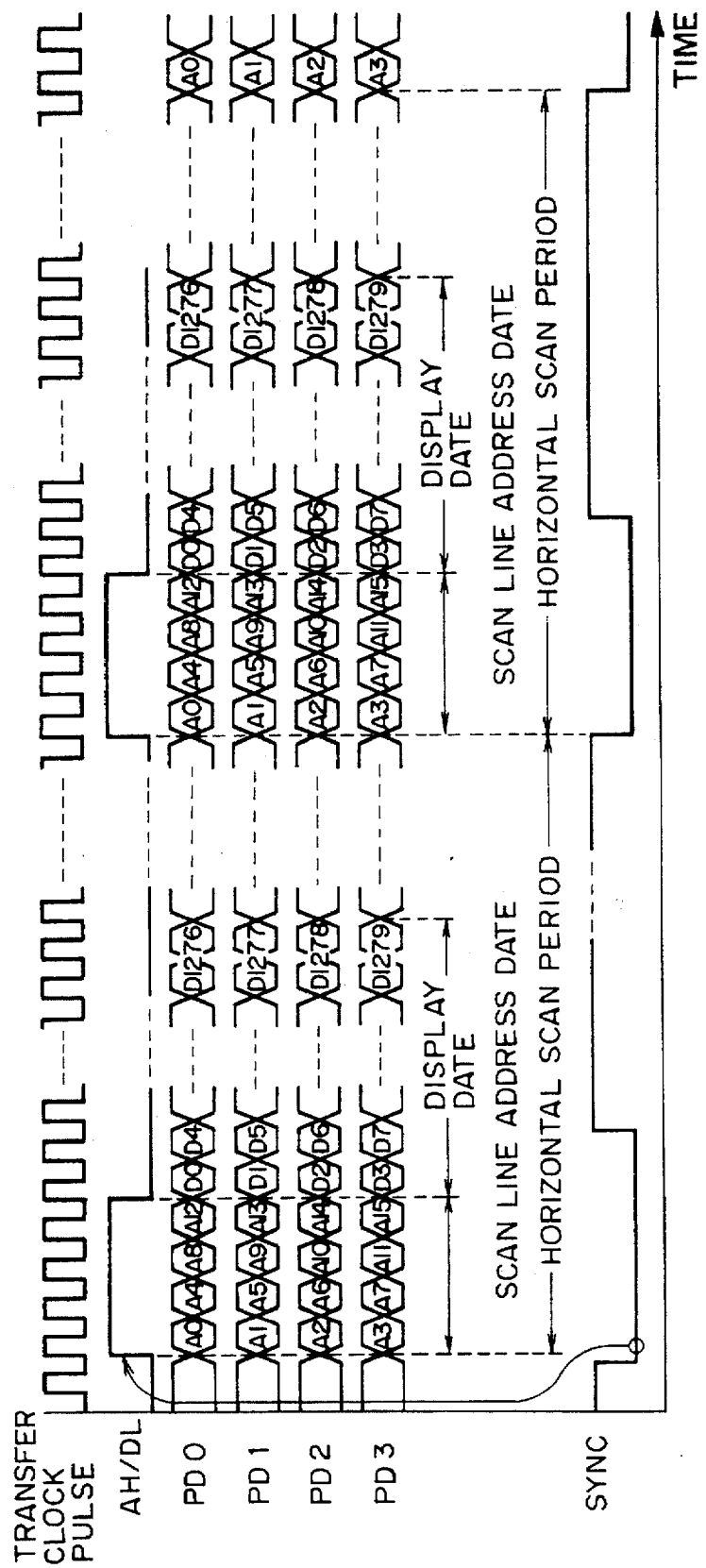
FIG. 5 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 4 and 5, there is provided a liquid crystal display apparatus of the present invention which uses the liquid crystal device according to the present invention as a display panel portion.

Referring to FIG. 4, a liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally performed by the graphic controller 102. A light source (not shown) is disposed at the back of the display panel 103.

Hereinbelow, the present invention will be explained more specifically with reference to examples. It is however to be understood that the present invention is not restricted to these examples.

In Examples 1–14 and Reference Example 1 appearing hereinafter, liquid crystal devices (cells) used were prepared as follows.

Each of liquid crystal compositions was prepared by mixing the following compounds (having the indicated structural formulae and phase transition temperatures (°C.))) and compounds appearing hereinafter in the proportions indicated hereinafter.

A: C₈H₁₇—[pyrimidine]—[phenyl]—OCH₂—CF₂—OCF₂CF₂—OC₄F₉

Phase transition (°C.)

$$S_X \underset{\longleftarrow}{\overset{-8}{\longrightarrow}} S_C \underset{\longleftarrow}{\overset{50}{\longrightarrow}} S_A \underset{\longleftarrow}{\overset{75}{\longrightarrow}} Iso$$

B₁: C₈H₁₇—[pyrimidine]—[phenyl]—OCH₂—C₇F₁₅

Phase transition (°C.)

$$S_X \underset{\longleftarrow}{\overset{71}{\longrightarrow}} S_C \underset{\longleftarrow}{\overset{80}{\longrightarrow}} S_A \underset{\longleftarrow}{\overset{117}{\longrightarrow}} Iso$$

B₂: C₉H₁₉—[pyrimidine]—[phenyl]—OCH₂C₇F₁₅

Phase transition (°C.)

$$S_X \underset{\longleftarrow}{\overset{71}{\longrightarrow}} S_C \underset{\longleftarrow}{\overset{85}{\longrightarrow}} S_A \underset{\longleftarrow}{\overset{112}{\longrightarrow}} Iso$$

B₃: C₁₀H₂₁—[pyrimidine]—[phenyl]—OCH₂C₇F₁₅

Phase transition (°C.)

$$S_X \underset{\longleftarrow}{\overset{75}{\longrightarrow}} S_C \underset{\longleftarrow}{\overset{87}{\longrightarrow}} S_A \underset{\longleftarrow}{\overset{104}{\longrightarrow}} Iso$$

C (chiral dopant):

C₁₀H₂₁—[pyrimidine]—[phenyl]—(CH₂)₂—*CH—*CH—C₅H₁₃ (with lactone O—C(=O))

In the above phase transition series, Sx denotes a smectic phase (unidentified); Sc denotes a smectic C phase; S_A denotes a smectic A phase; and Iso denotes an isotropic phase.

Each of the thus prepared liquid crystal compositions was disposed between a bank cell to provide a liquid crystal cell (device) whereby various characteristics including a layer inclination angle (degrees), a contrast ratio and a memory angle (degrees) were evaluated.

The blank cell was prepared as follows.

To one glass plate provided with an ITO film, a solution of a polyimide precursor (providing a polyimide having a recurring unit of the formula shown below) in a mixture solvent (n-methylpirrolidone (NMP)/n-butylcarbitol (nBC) =2/1) was applied by spin coating. The thus coated glass plate was subjected to hot curing treatment and a rubbing treatment.

Polyimide (recurring unit)

[structure: dianhydride-derived imide linked to phenylenediamine-derived imide, repeating unit]

To another glass plate provided with an ITO film, a solution of a silane coupling agent comprising octadecyltriethoxysilane was applied by spin coating, followed by hot curing.

After silica beads as a spacer were dispersed on one of the above-treated two glass plates, the two glass plates were applied to each other to form a blank cell having a cell gap of 1.8 μm.

The respective characteristics were evaluated or measured as follows.

Layer inclination angle (δ)

The layer inclination angle δ was measured according to a method described in Jpn. J. Appl. Phys. 27, p. L725 (1988).

Contrast ratio

Figure 6:
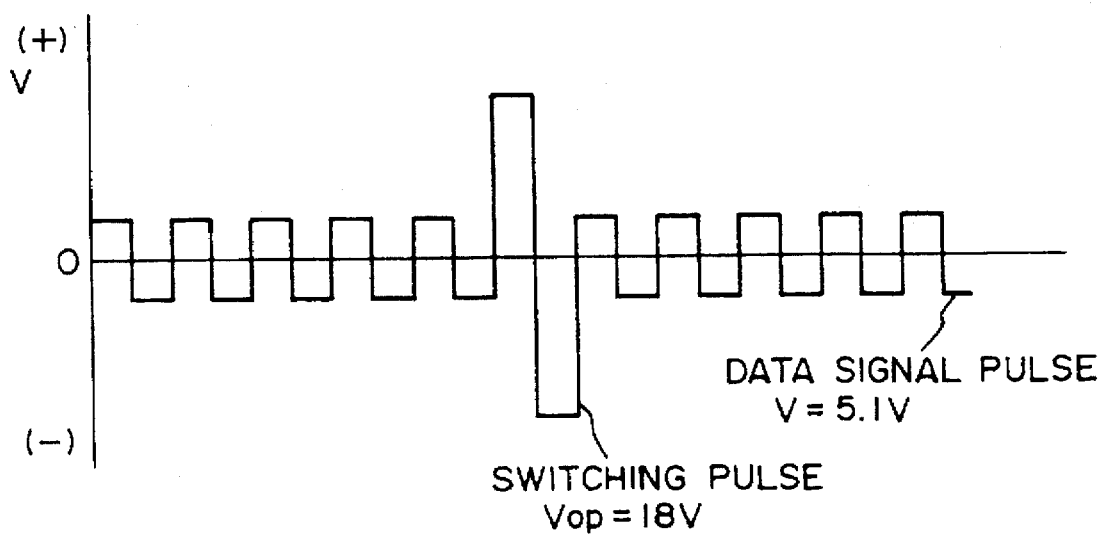
FIG. 6 is a view showing a switching signal used in driving conditions adopted in Examples appearing hereinafter.

The contrast ratio was measured by fixing a stage providing the darkest optical axis by means of a photomultiplier under observation through a polarizing microscope and under application of a switching signal shown in FIG. 6, thereby to find an output value for a dark (black) state and an output value for a bright (white) state. A contrast ratio in a driving state (CR (drive)) was determined by dividing the output value for the white state (after switching) by the output value for the black state (before switching) under voltage (switching signal) application. A contrast ratio in a memory state (CR (memory)) was determined by dividing the output value for the white state by the output value for the black state under no voltage (switching signal) application.

Memory angle

The memory angle is an angle formed between two stable states under no electric field application. More specifically, the memory angle was determined by measuring an angle formed between two stable states each giving the darkest position under polarizing microscope observation and dividing the angle by 2.

EXAMPLE 1

Four liquid crystal compositions (No. 1 to No. 4) were prepared and evaluated by using compounds ① to ③ shown below and the above-mentioned compounds (A, B₁, B₂, B₃ and C) mixed in proportions (by weight) indicated in Table 1 below, respectively. The results are shown in Table 1.

Formula (III) compound

C_αH_{2α+1}—[pyrimidine]—[phenyl]—OC_βH_{2β+1}

(α, β) = ①(6, 9)  ②(6, 10)

③ C₈H₁₇—[pyrimidine]—[phenyl]—O(CH₂)₂O(CH₂)₂OC₄H₉

TABLE 1

| Composition | δ (deg.) | CR (memory) | CR (drive) |
|---|---|---|---|
| No. 1 A/①/C = 82/8/5 | 3.2 | 112 | 67 |
| No. 2 A/②/C = 82/8/5 | 3.4 | 108 | 65 |
| No. 3 A/B1/①/C = 75/7/8/5 | 4.3 | 113 | 63 |
| No. 4 A/B1/B2/B3/③/C = 34.0/12.8/12.8/17.0/10.0/5.0 | 5.7 | 86 | 44 |

The liquid crystal composition (No. 4) showed a memory angle at 25° C. of 21 degrees.

When each of the liquid crystal compositions was subjected to measurement of contrast ratios after once cooled to 10° C., the respective contrast ratios of all of the above compositions were substantially not changed.

Further, all of the above compositions showed a temperature change of a layer spacing of at most 0.5 Å/10 Å.

EXAMPLE 2

Two liquid crystal compositions (No. 5 and No. 6) were prepared and evaluated by using compounds ④ and ⑤ shown below and the above-mentioned compounds (A, $B_1$, $B_2$, $B_3$ and C) mixed in proportions (by weight) indicated in Table 2 below, respectively. The results are shown in Table 2.

Formula (IV) compound

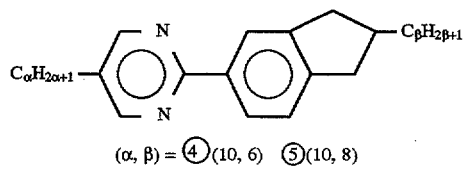

(α, β) = ④(10, 6)  ⑤(10, 8)

TABLE 2

| Composition | δ (deg.) | CR (memory) | CR (drive) |
|---|---|---|---|
| No. 5 A/④/C = 85/5/5 | 3.0 | 121 | 70 |
| No. 6 A/B1/B2/B3/⑤/C = 34.0/12.8/12.8/17.0/15.0/5.0 | 7.5 | 78 | 43 |

The liquid crystal composition (No. 6) showed a memory angle at 25° C. of 20 degrees.

When each of the liquid crystal compositions was subjected to measurement of contrast ratios after once cooled to 10° C., the respective contrast ratios of all of the above compositions were substantially not changed.

Further, all of the above compositions showed a temperature change of a layer spacing of at most 0.5 Å/10 Å.

EXAMPLE 3

Two liquid crystal compositions (No. 7 and No. 8) were prepared and evaluated by using compounds ⑥ and ⑦ shown below and the above-mentioned compounds (A, $B_1$, $B_2$, $B_3$ and C) mixed in proportions (by weight) indicated in Table 3 below, respectively. The results are shown in Table 3.

Formula (V) compound

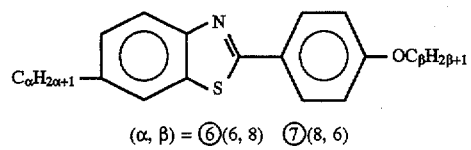

(α, β) = ⑥(6, 8)  ⑦(8, 6)

TABLE 3

| Composition | δ (deg.) | CR (memory) | CR (drive) |
|---|---|---|---|
| No. 7 A/⑦/C = 85/5/5 | 3.6 | 106 | 78 |
| No. 8 A/B1/B2/B3/⑥/C = 34.0/12.8/12.8/17.0/10.0/5.0 | 8.0 | 83 | 39 |

The liquid crystal composition (No. 8) showed a memory angle at 25° C. of 22 degrees.

When each of the liquid crystal compositions was subjected to measurement of contrast ratios after once cooled to 10° C., the respective contrast ratios of all of the above compositions were substantially not changed.

Further, all of the above compositions showed a temperature change of a layer spacing of at most 0.5 Å/10 Å.

EXAMPLE 4

A liquid crystal composition (No. 9) was prepared and evaluated by using a compound ⑧ shown below and the above-mentioned compounds (A, $B_1$, $B_2$, $B_3$ and C) mixed in proportions (by weight) indicated in Table 4 below, respectively. The results are shown in Table 4.

Formula (VI) compound

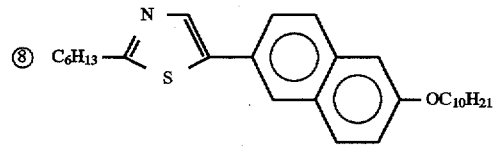

⑧ $C_6H_{13}$

TABLE 4

| Composition | δ (deg.) | CR (memory) | CR (drive) |
|---|---|---|---|
| No. 9 A/B1/B2/B3/⑧/C = 34.0/12.8/12.8/17.0/10.0/5.0 | 8.9 | 86 | 55 |

The liquid crystal composition showed a memory angle at 25° C. of 23 degrees.

When the liquid crystal composition was subjected to measurement of contrast ratios after once cooled to 10° C., the respective contrast ratios of the above composition were substantially not changed.

Further, the above composition showed a temperature change of a layer spacing of at most 0.5 Å/10 Å.

EXAMPLE 5

Two liquid crystal compositions (No. 10 and No. 11) were prepared and evaluated by using a compound 9 shown below and the above-mentioned compounds (A, $B_1$, $B_2$, $B_3$ and C) mixed in proportions (by weight) indicated in Table 5 below, respectively. The results are shown in Table 5.

Formula (VII) compound

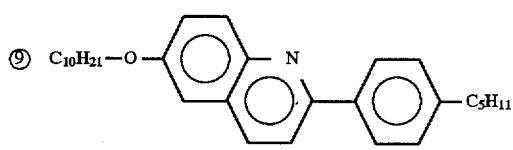

TABLE 5

| Composition | δ (deg.) | CR (memory) | CR (drive) |
|---|---|---|---|
| No. 10 A/⑨/C = 85/5/5 | 3.6 | 146 | 110 |
| No. 11 A/B1/B2/B3/⑨/C = 34.0/12.8/12.8/17.0/15.0/5.0 | 5.9 | 81 | 49 |

The liquid crystal composition (No. 11) showed a memory angle at 25° C. of 17 degrees.

When each of the liquid crystal compositions was subjected to measurement of contrast ratios after once cooled to 10° C., the respective contrast ratios of all of the above compositions were substantially not changed.

Further, all of the above compositions showed a temperature change of a layer spacing of at most 0.5 Å/10 Å.

EXAMPLE 6

A liquid crystal composition (No. 12) was prepared and evaluated by using a compound ⑩ shown below and the above-mentioned compounds (A, $B_1$, $B_2$, $B_3$ and C) mixed in proportions (by weight) indicated in Table 6 below, respectively. The results are shown in Table 6.

Formula (VIII) compound

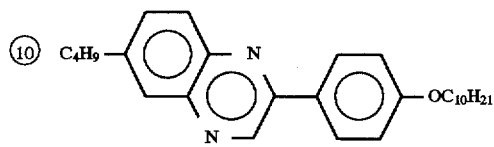

TABLE 6

| Composition | δ (deg.) | CR (memory) | CR (drive) |
|---|---|---|---|
| No. 12 A/B1/B2/B3/⑩/C = 34.0/12.8/12.8/17.0/15.0/5.0 | 5.9 | 80 | 49 |

The liquid crystal composition showed a memory angle at 25° C. of 19 degrees.

When the liquid crystal composition was subjected to measurement of contrast ratios after once cooled to 10° C., the respective contrast ratios of the above composition were substantially not changed.

Further, the above composition showed a temperature change of a layer spacing of at most 0.5 Å/10 Å.

EXAMPLE 7

A liquid crystal composition (No. 13) was prepared and evaluated by using a compound ⑪ shown below and the above-mentioned compounds (A, $B_1$, $B_2$, $B_3$ and C) mixed in proportions (by weight) indicated in Table 7 below, respectively. The results are shown in Table 7.

Formula (IX) compound

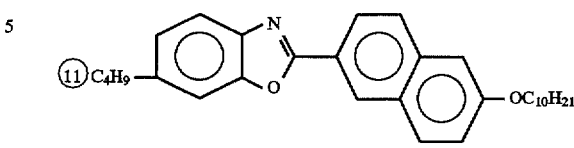

TABLE 7

| Composition | δ (deg.) | CR (memory) | CR (drive) |
|---|---|---|---|
| No. 13 A/B1/B2/B3/⑪/C = 22.0/17.0/17.0/17.0/9.0/5.0 | 8.9 | 79 | 35 |

The liquid crystal composition showed a memory angle at 25° C. of 19 degrees.

When the liquid crystal composition was subjected to measurement of contrast ratios after once cooled to 10° C., the respective contrast ratios of the above composition were substantially not changed.

Further, the above composition showed a temperature change of a layer spacing of at most 0.5 Å/10 Å.

EXAMPLE 8

A liquid crystal composition (No. 14) was prepared and evaluated by using a compound ⑫ shown below and the above-mentioned compounds (A, $B_1$, $B_2$, $B_3$ and C) mixed in proportions (by weight) indicated in Table 8 below, respectively. The results are shown in Table 8.

Formula (X) compound

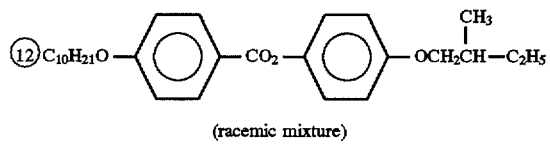

(racemic mixture)

TABLE 8

| Composition | δ (deg.) | CR (memory) | CR (drive) |
|---|---|---|---|
| No. 14 A/B1/B2 /B3/⑫/C = 22.0/17.0/17.0/17.0/9.0/5.0 | 11.0 | 77 | 34 |

The liquid crystal composition showed a memory angle at 25° C. of 19 degrees.

When the liquid crystal composition was subjected to measurement of contrast ratios after once cooled to 10° C., the respective contrast ratios of the above composition were substantially not changed.

Further, the above composition showed a temperature change of a layer spacing of at most 0.5 Å/10 Å.

EXAMPLE 9

Three liquid crystal compositions (No. 15 to No. 17) were prepared and evaluated by using compounds ⑬ to ⑮ shown below and the above-mentioned compounds (A, $B_1$, $B_2$, $B_3$ and C) mixed in proportions (by weight) indicated in Table 9 below, respectively. The results are shown in Table 9.

Formula (XI) compound

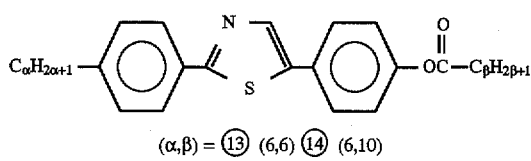

(α,β) = ⑬ (6,6) ⑭ (6,10)

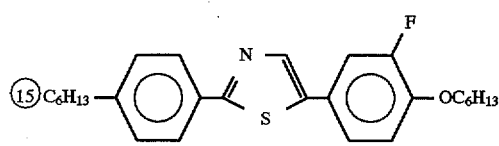

TABLE 9

| Composition | δ (deg.) | CR (memory) | CR (drive) |
| --- | --- | --- | --- |
| No. 15 A/⑬/C = 82/8/5 | 0 | 156 | 102 |
| No. 16 A/⑭/C = 82/8/5 | 2.5 | 144 | 111 |
| No. 17 A/B1/B2/B3/⑮/C = 34.0/12.8/12.8/17.0/ 15.0/5.0 | 5.9 | 89 | 57 |

The liquid crystal composition (No. 16) showed a memory angle at 25° C. of 21 degrees.

When each of the liquid crystal compositions was subjected to measurement of contrast ratios after once cooled to 10° C., the respective contrast ratios of all of the above compositions were substantially not changed.

Further, all of the above compositions showed a temperature change of a layer spacing of at most 0.5 Å/10 Å.

EXAMPLE 10

Four liquid crystal compositions (No. 18 and No. 19) were prepared and evaluated by using a compound ⑯ shown below and the above-mentioned compounds (A, B₁, B₂, B₃ and C) mixed in proportions (by weight) indicated in Table 10 below, respectively. The results are shown in Table 10.

Formula (XII) compound

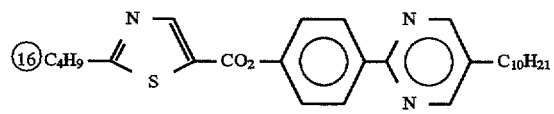

TABLE 10

| Composition | δ (deg.) | CR (memory) | CR (drive) |
| --- | --- | --- | --- |
| No. 18 A/⑯/C = 82/8/5 | 3.8 | 122 | 87 |
| No. 19 A/B1/B2/B3/⑯/C = 34.0/12.8/12.8/17.0/ 15.0/5.0 | 6.5 | 69 | 47 |

The liquid crystal composition (No. 19) showed a memory angle at 25° C. of 18 degrees.

When each of the liquid crystal compositions was subjected to measurement of contrast ratios after once cooled to 10° C., the respective contrast ratios of all of the above compositions were substantially not changed.

Further, all of the above compositions showed a temperature change of a layer spacing of at most 0.5 Å/10 Å.

EXAMPLE 11

A liquid crystal composition (No. 20) was prepared and evaluated by using a compound ⑰ shown below and the above-mentioned compounds (A, B₁, B₂, B₃ and C) mixed in proportions (by weight) indicated in Table 11 below, respectively. The results are shown in Table 11.

Formula (XIII) compound

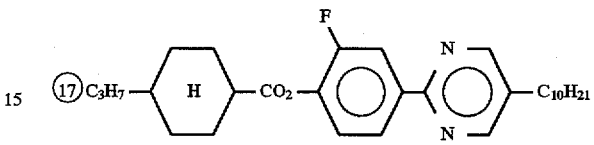

TABLE 11

| Composition | δ (deg.) | CR (memory) | CR (drive) |
| --- | --- | --- | --- |
| No. 20 A/B1/B2/B3/⑰/C = 34.0/12.8/12.8/17.0/ 15.0/5.0 | 6.5 | 59 | 32 |

The liquid crystal composition showed a memory angle at 25° C. of 18 degrees.

When the liquid crystal composition was subjected to measurement of contrast ratios after once cooled to 10° C., the respective contrast ratios of the above composition were substantially not changed.

Further, the above composition showed a temperature change of a layer spacing of at most 0.5 Å/10 Å.

EXAMPLE 12

A liquid crystal composition (No. 21) was prepared and evaluated by using a compound ⑱ shown below and the above-mentioned compounds (A, B₁, B₂, B₃ and C) mixed in proportions (by weight) indicated in Table 12 below, respectively. The results are shown in Table 12.

Formula (XIV) compound

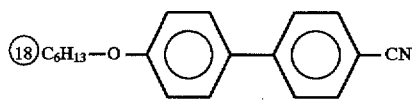

TABLE 12

| Composition | δ (deg.) | CR (memory) | CR (drive) |
| --- | --- | --- | --- |
| No. 21 A/B1/B2/B3/⑱/C = 34.0/12.8/12.8/12.8/ 5.0/5.0 | 5.8 | 69 | 42 |

The liquid crystal composition showed a memory angle at 25° C. of 19 degrees.

When the liquid crystal composition was subjected to measurement of contrast ratios after once cooled to 10° C., the respective contrast ratios of the above composition were substantially not changed.

Further, the above composition showed a temperature change of a layer spacing of at most 0.5 Å/10 Å.

EXAMPLE 13

A liquid crystal composition (No. 22) was prepared and evaluated by using a compound ⑲ shown below and the above-mentioned compounds (A, $B_1$, $B_2$, $B_3$ and C) mixed in proportions (by weight) indicated in Table 13 below, respectively. The results are shown in Table 13.

Formula (XV) compound

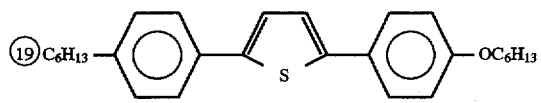

TABLE 13

| Composition | δ (deg.) | CR (memory) | CR (drive) |
|---|---|---|---|
| No. 22 A/B1/B2/B3/⑲/C = 45.0/12.8/12.8/12.8/ 5.0/5.0 | 6.5 | 67 | 38 |

The liquid crystal composition showed a memory angle at 25° C. of 22 degrees.

When the liquid crystal composition was subjected to measurement of contrast ratios after once cooled to 10° C., the respective contrast ratios of the above composition were substantially not changed.

Further, the above composition showed a temperature change of a layer spacing of at most 0.5 Å/10 Å.

EXAMPLE 14

Three liquid crystal compositions (No. 23 to No. 25) were prepared and evaluated by using compounds ⑳ to ㉒ shown below and the above-mentioned compounds (A, $B_1$, $B_2$, $B_3$ and C) mixed in proportions (by weight) indicated in Table 14 below, respectively. The results are shown in Table 14.

Formula (XVI) compound

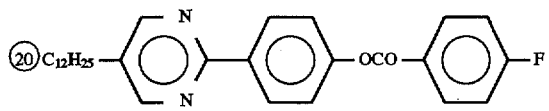

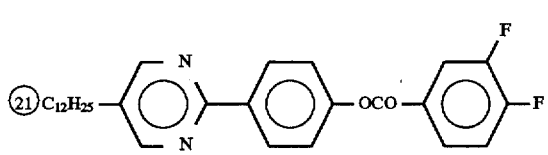

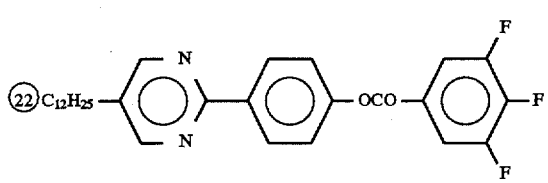

TABLE 14

| Composition | δ (deg.) | CR (memory) | CR (drive) |
|---|---|---|---|
| No. 23 A/B1/B2/B3/⑳/C = 34.0/12.8/12.8/17.8/ 10.0/5.0 | 6.5 | 67 | 38 |
| No. 24 A/B1/B2/B3/㉑/C = 34.0/12.8/12.8/17.8/ 10.0/5.0 | 6.2 | 70 | 43 |
| No. 25 A/B1/B2/B3/㉒/C = 34.0/12.8/12.8/17.8/ 10.0/5.0 | 5.6 | 78 | 46 |

The liquid crystal composition (No. 23) showed a memory angle at 25° C. of 17 degrees.

When each of the liquid crystal compositions was subjected to measurement of contrast ratios after once cooled to 10° C., the respective contrast ratios of all of the above compositions were substantially not changed.

Further, all of the above compositions showed a temperature change of a layer spacing of at most 0.5 Å/10 Å.

REFERENCE EXAMPLE 1

Two reference liquid crystal compositions (No. 1 and No. 2) were prepared and evaluated by mixing the compounds A, $B_1$, $B_2$, $B_3$ and C in proportions indicated in Table 15 below, respectively. The results are shown in Table 15.

TABLE 15

| Reference Composition | δ (deg.) | CR (memory) | CR (drive) |
|---|---|---|---|
| No. 1 A/B1/B2/B3/C = 40.0/15.0/15.0/ 20.0/5.0 | 14.7 | 41 | 12 |
| No. 2 A/C = 90/5 | 1.8 | 38 | 30 |

When the reference liquid crystal composition (No. 2) was subjected to measurement of CR (drive) after once cooled to 20° C. and then restored to 30° C., the reference composition (No. 2) showed a contrast ratio (CR (drive)) of 14. Similarly, the reference composition (No. 2) also showed a CR (drive) of 5 after once cooled to 10° C., thus remarkably decreasing its contrast ratio.

Further, the reference liquid crystal composition (No. 1) showed a memory angle at 25° C. of 28 degrees. The reference liquid crystal composition (No. 2) showed a temperature change of a layer spacing in smectic A phase was 0.52 Å/10 Å.

EXAMPLE 15

Liquid crystal compositions were prepared in the same manner as in Examples 1–14 except that the polyimide alignment film was changed to a polyimide film having a recurring unit (P1) below or a recurring unit (P2) below and the liquid crystal compositions (Nos. 1, 5, 7, 9, 10, 12, 13, 14, 15, 18, 20, 21, 22 and 23) used in Examples 1 and 2 were used, respectively.

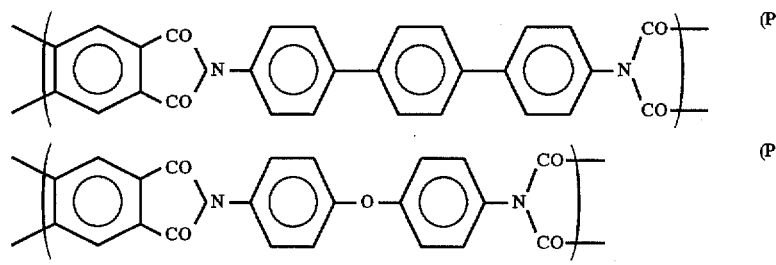

(P1)

(P2)

All of the resultant liquid crystal cells (devices) using the polyimide film having the recurring unit (P1) or (P2) showed a very good alignment state over the entire cell.

EXAMPLES 16–19 AND REFERENCE EXAMPLES 2–5

In this examples, the following mesomorphic compounds A to D shown in Table 16 below were used in proportions (wt. parts) indicated in Table 17 appearing hereinafter, respectively.

The thus treated electrode plate was subjected to rubbing with a nylon cloth to effect alignment treatment.

TABLE 16

| | ΔH (J/g) | Tiso (°C.) | Structural Formula |
|---|---|---|---|
| A | — | 75 | $C_8H_{17}$—⟨N=N⟩—⟨⟩—$OCH_2CF_2OCF_2CF_2OC_4F_9$ |
| B | 103.4 | 142.9 | $C_8H_{17}$—⟨N=N⟩—⟨⟩—$OCH_2$—C(=O)O—C($CH_3$)($CH_3$) |
| C | 33.8 | 66.3 | $C_{10}H_{21}$—⟨N=N⟩—⟨⟩—$(CH_2)_2$—*CH(C(=O)O)—*CH—$C_6H_{13}$ |
| D | 26.2 | 122.5 | $C_{10}H_{21}O$—⟨N⟩—⟨⟩—$C_5H_{11}$ |

ΔH: enthalphy of fusion
Tiso: isotropic - smetic A phase transition temperature

Each of liquid crystal cells (devices) used in these examples was prepared as follows.

Two 1.1 mm-thick glass plates were provided and respectively coated with an c.a. 150 nm-thick ITO film to prepare an electrode plate.

One of the electrode plates was coated with a 0.7 wt. %-solution of polyimide resin precursor in a mixture solvent of N-methyl-2-pyrrolidone (NMP)/n-butyl carbitol (nBC)= 2/1 (by weight) by a spinner coater rotating at 2700 rpm for 20 seconds. Thereafter, the coating film was dried at 80° C. for 5 minutes and subjected to hot curing treatment at 270°C. for 1 hour to obtain a 5 nm-thick alignment control film (polyimide film) comprising polyimide having the following recurring unit:

The other electrode plate was coated with a 0.5 wt. %-solution of a silan coupling agent (octadecyl triethoxysilane (ODS-E)) in ethanol by a spin coating method of 2000 rpm for 20 seconds and dried at 80° C. for 5 minutes, followed by heat curing at 180° C. for 1 hour.

Then, on the above electrode plate subjected to alignment treatment, silica beads with an average particle size of 2.0 µm were dispersed.

The two glass plates were applied to each other to form a blank cell.

Separately, eight liquid crystal compositions (LC-1 to LC-8) were prepared by mixing the above-mentioned mesomorphic compounds A to D in proportions indicated in Table 17 appearing hereinafter. All of these liquid crystal compositions did not show a cholesteric phase and an Iso—SmA phase transition temperature (Tiso) of 70°–80° C.. Among these liquid crystal compositions (LC-1 to LC-8), two liquid crystal compositions (LC-3 and LC-7) caused precipitation to show an insufficient mutual solubility but other liquid crystal compositions (LC-1, LC-2, LC-4, LC-5, LC-6 and LC-8) did not cause precipitation.

Then, each of the liquid crystal compositions (LC-1, LC-2, LC-4, LC-5, LC-6 and LC-8) was heated into an isotropic liquid, and injected into the above-prepared blank cell under vacuum and, after sealing, was gradually cooled to room temperature at a rate of 4° C./min. to effect alignment of liquid crystal molecules, thus preparing a liquid crystal device.

Each of the thus prepared liquid crystal devices was subjected to measurement of a contrast ratio (CR) as measured according to a method described hereinafter. The results of evaluation of a contrast ratio are shown in Table 17 below.

TABLE 17

| | Ex. No. | | | | | | | |
|---|---|---|---|---|---|---|---|---|
| | Ref. Ex.2 | Ex.16 | Ref. Ex.3 | Ref. Ex.4 | Ex.17 | Ex.18 | Ref. Ex.5 | Ex.19 |
| Compound | LC-1 | LC-2 | LC-3 | LC-4 | LC-5 | LC-6 | LC-7 | LC-8 |
| A | 94.5 | 94 | 90 | 95 | 93 | 90 | 85 | 91 |
| B | 0.5 | 1 | 5 | — | — | — | — | 2 |
| C | 5 | 5 | 5 | 5 | 5 | 5 | 5 | 5 |
| D | — | — | — | — | 2 | 5 | 10 | 2 |
| CR | 40 | 110 | *1 | 25 | 70 | 80 | *1 | 115 |

*1: Production occurred and not subjected to measurement of a contrast ratio.

As apparent from the results shown in Table 17, by adding a compound having a limit of solubility in a liquid crystal or a compound having a high phase transition temperature and a large enthalpy of fusion to the liquid crystal, a resultant liquid crystal composition showed an improved alignment state and provided a high contrast ratio.

In these examples (Examples 16–19 and Reference Example 4), the contrast ratio (CR) was measured according to a following method.

A liquid crystal device was sandwiched between a pair of polarizers arranged in cross nicol relationship and supplied with a driving waveform (a pulse of 20 V, ⅓ bias and 1000 duty) shown in Figure 7A. Then, a pulse width is changed and the device is rotated by an angle giving a transmitted light intensity in the darkest state at the time of driving with a threshold pulse width for inversion of bistable states. A transmitted light intensity (transmittance) at this time is detected by a photomultiplier to determine a value of Ib shown in FIG. 7B. In such an arrangement, liquid crystal molecules are switched or inverted, when a transmitted light intensity is detected by a photomultiplier to determine a value of Iw shown in FIG. 7B. The contrast ratio (CR) is obtained by dividing Iw by Ib, i.e., CR=Lw/Lb. In case where a uniform alignment is not obtained, a value of Ib is increased due to leakage of light through an alignment defect portion, thus resulting in a low contrast ratio.

EXAMPLE 20 AND REFERENCE EXAMPLE 6

Each of liquid crystal cells (devices) used in these examples was prepared as follows.

Two 1.1 mm-thick glass plates were provided and respectively coated with an c.a. 150 nm-thick ITO film to prepare an electrode plate.

Each of the electrode plates was coated with a 0.7 wt. %-solution of polyimide resin precursor ("LP-64", available from Toray K.K.) in a mixture solvent of N-methyl-2-pyrrolidone (NMP)/n-butyl carbitol (nBC)=2/1 (by weight) by a spinner coater rotating at 2700 rpm for 20 seconds. Thereafter, the coating film was dried at 80° C. for 5 minutes and subjected to hot curing treatment at 270° C. for 1 hour to obtain a 5 nm-thick alignment control film (polyimide film). The thus treated electrode plate was subjected to rubbing with a nylon cloth to effect alignment treatment.

Then, on one of the above rubbed electrode plates, silica beads with an average particle size of 2.0 μm were dispersed.

The two glass plates were applied to each other so that their rubbed directions were parallel to each other to form a blank cell.

Then, two liquid crystal compositions (LC-4 (for Reference Example 6) used in Reference Example 4 and LC-6 (for Example 20) used in Example 18) was heated into an isotropic liquid, and injected into the above-prepared blank cell under vacuum and, after sealing, was gradually cooled to room temperature at a rate of 4° C./min. to effect alignment of liquid crystal molecules, thus preparing a liquid crystal device.

Each of the thus prepared liquid crystal devices was subjected to measurement of a contrast ratio (CR) in the same manner as in Example 18 and Reference Example 4, whereby the liquid crystal composition (LC-6 for Ex. 20) showed a CR of 65 and the liquid crystal composition (LC-4 for Ref. Ex. 6) showed a CR of 15.

As apparent from the above results, by adding a compound having a limit of solubility in a liquid crystal, a resultant liquid crystal composition provided a high contrast ratio.

EXAMPLE 21

A liquid crystal cell (device) used in this example was prepared as follows.

Two 1.1 mm-thick glass plates were provided and respectively coated with an c.a. 150 nm-thick ITO film to prepare an electrode plate.

One of the electrode plates was coated with a 5 nm-thick alignment control film (polyimide film) comprising polyimide having the following recurring unit:

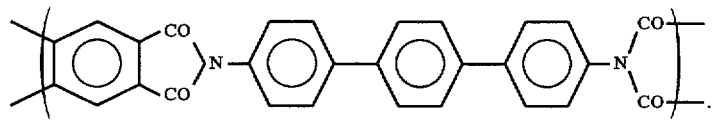

The thus treated electrode plate was subjected to rubbing with a nylon cloth to effect alignment treatment.

The other electrode plate was coated with a 0.5 wt. %-solution of a silan coupling agent (octadecyl triethoxysilane (ODS-E) in ethanol by a spin coating method of 2000 rpm for 20 seconds and dried at 80° C. for 5 minutes, followed by heat curing at 180° C. for 1 hour.

Then, on the above electrode plate subjected to alignment treatment, silica beads with an average particle size of 2.0 μm were dispersed.

The two glass plates were applied to each other to form a blank cell.

Separately, a light crystal composition (LC-9) was prepared by mixing the following compounds E, F and G in a proportion of E/F/G=94/1/4 (by weight).

| Compound No. | Structural Formula |
|---|---|
| E | 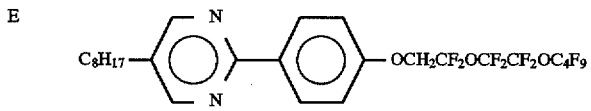 |
| F | 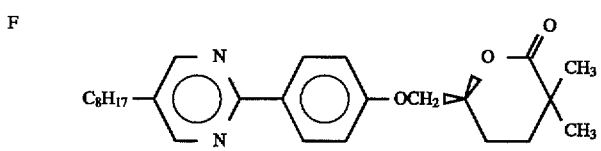 |
| G | 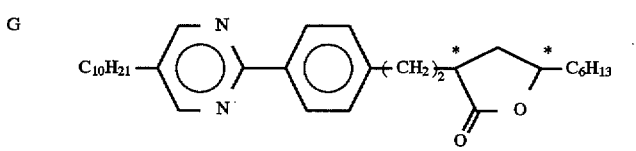 |

Then, the liquid crystal composition (LC-9) was heated into an isotropic liquid, and injected into the above-prepared blank cell under vacuum and, after sealing, was gradually cooled to room temperature at a rate of 4° C./min. to effect alignment of liquid crystal molecules, thus preparing a liquid crystal device. In the liquid crystal device, the liquid crystal composition (LC-9) showed a good alignment state.

EXAMPLE 22

A liquid crystal device was prepared in the same manner as in Example 21 except for using a polyimide film having the following recurring unit as an alignment control film:

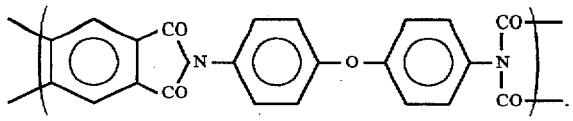

In the liquid crystal device, the liquid crystal composition (LC-9) showed an excellent uniform alignment.

EXAMPLE 23

A liquid crystal device was prepared in the same manner as in Example 21 except for using a polyimide film having the following recurring unit as an alignment control film:

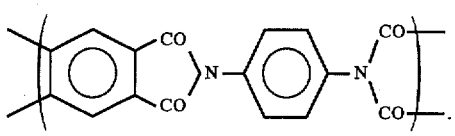

In the liquid crystal device, the liquid crystal composition (LC-9) showed an excellent uniform alignment.

EXAMPLE 24

A liquid crystal device was prepared in the same manner as in Example 21 except for using a polyimide film having the following recurring unit as an alignment control film:

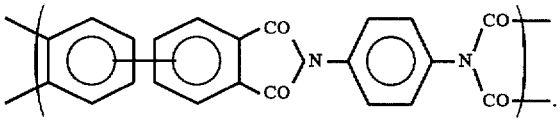

In the liquid crystal device, the liquid crystal composition (LC-9) showed an excellent uniform alignment.

As described above, according to the invention, there is provided a liquid crystal composition, particularly a chiral smectic liquid crystal composition, readily providing a liquid crystal molecular layer having a bookshelf structure or a structure closer thereto having a small layer inclination angle, and exhibiting a good alignment state of the liquid crystal layer which state, e.g., is a bookshelf alignment state stable against a temperature change. As a result, a (chiral smectic or ferroelectric) liquid crystal device using the liquid crystal composition according to the present invention provides various improved properties such as a high contrast ratio, a high responsiveness, a high definition, a high brightness and a large picture area.

In addition, when the liquid crystal device is used as a display device in combination with a light source, drive circuit, etc., a liquid crystal apparatus, such as a liquid crystal display apparatus, providing good display characteristics can be realized.

What is claimed is:
1. A liquid crystal composition, comprising:
    at least one fluorine-containing mesomorphic compound
        (a) represented by the following formula (I):

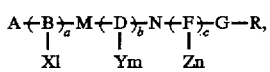 (I)

in which

B, D and F independently denote

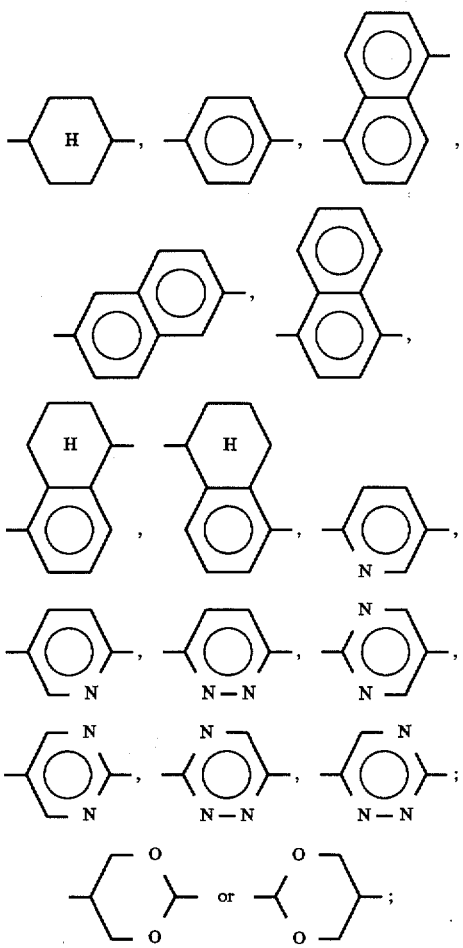

a, b and c independently denote an integer of 0–3 with the proviso that a+b+c is at least 2;

M and N independently denote —COO—, —OCO—, —COS—, —SCO—, —COSe—, —SeCO—, —COTe—, —TeCO—, —(CH₂CH₂)$_d$ wherein d is an integer of 1–4, —CH=CH—, —C≡C—, —CH=N—, —N=CH—, —CH₂O—, —OCH₂—, —CO—, —O— or a single bond;

X, Y and Z independently denote —H, —Cl, —F, —Br, —I, —OR, —OCH₃, —CF₃, —OCF₃—, —CH₃, —CN or —NO₂ and l, m and n independently denote an integer of 0–4;

G is —COO—C$_e$H$_{2e}$—, —O—C$_e$H$_{2e}$—, —C$_e$H$_{2e}$—, —OSOO—, —OOSO—, —SOO—, —SOOC$_e$H$_{2e}$—, —O(C$_e$H$_{2e}$—O)$_q$C$_e$H$_{2e'}$, —C$_e$H$_{2e}$—N(C$_p$H$_{2p+1}$)— SO₂—, —C$_e$H$_{2e}$—N(C$_p$H$_{2p+1}$)—CO— wherein e and e' independently denote an integer of 1–20, q is an integer of 1–6 and p is an integer of 0–4;

A is a linear or branched group represented by —O—(C$_f$H$_{2f}$—)$_w$O—C$_g$H$_{2g+1}$, —(C$_f$H$_{2f}$—O—)$_w$C$_g$H$_{2g+1}$, —C$_f$H$_{2f}$—R', —O—C$_f$H$_{2f}$—R', —COO—C$_f$H$_{2f}$—R', —OCO—C$_f$H$_{2f}$—R' wherein R' is —Cl, —F, —CF₃, —NO₂, —CN, —H, —COO—C$_f$H$_{2f+1}$ or —OCO—C$_f$H$_{2f+1}$ in which f, f' and g independently denote an integer of 1–20 and w is an integer of 1–10; and R is —(C$_x$F$_{2x}$O—)$_z$C$_y$F$_{2y+1}$ wherein x is independently an integer of 1–10 for each C$_x$F$_{2x}$O group, y is an integer of 1–10, and z is an integer of 1–10; and at least one achiral compound (b) selected from the group consisting of those represented by the following formulae (IV) to (XVI) shown below:

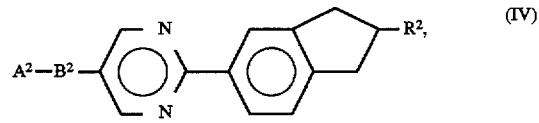 (IV)

in which A² is a linear or branched alkyl group having 1–20 carbon atoms; B² is a single bond, —O—, —COO— or —OCO—; and D² is a linear or branched alkyl group having 1–20 carbon atoms;

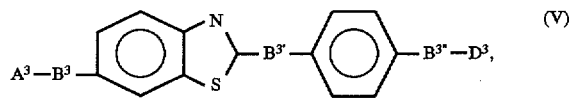 (V)

in which A³ is a linear or branched alkyl group having 1–20 carbon atoms; B³, B³' and B³" independently denote a single bond, —O—, —COO— or —OCO—; and D³ is a linear or branched alkyl group having 1–20 carbon atoms;

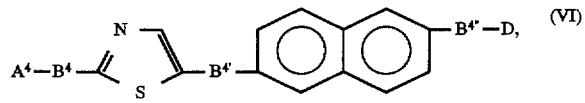 (VI)

in which A⁴ is a linear or branched alkyl group having 1–20 carbon atoms; B⁴, B⁴' and B⁴" independently denote a single bond, —O—, —COO— or —OCO—; and D⁴ is a linear or branched alkyl group having 1–20 carbon atoms;

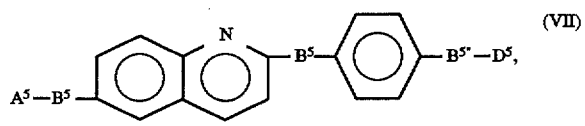 (VII)

in which A⁵ is a linear or branched alkyl group having 1–20 carbon atoms; B⁵, B⁵' and B⁵" independently denote a single bond, —O—, —COO— or —OCO—; and D⁵ is a linear or branched alkyl group having 1–20 carbon atoms;

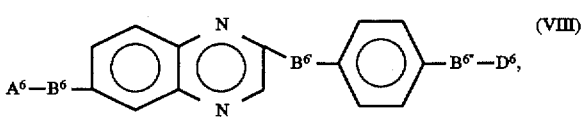 (VIII)

in which A⁶ is a linear or branched alkyl group having 1–20 carbon atoms; B⁶, B⁶' and B⁶" independently denote a single bond, —O—, —COO— or —OCO—; and D⁶ is a linear or branched alkyl group having 1–20 carbon atoms;

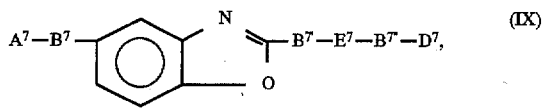

in which $A^7$ is a linear or branched alkyl group having 1–20 carbon atoms; $B^7$, $B^{7'}$ and $B^{7''}$ independently denote a single bond, —O—, —COO— or —OCO—; $D^7$ is a linear or branched alkyl group having 1–20 carbon atoms; and $E^7$ is 1,4-phenylene or 2,6-naphthylene;

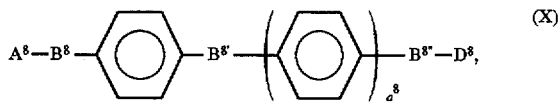

in which $A^8$ is a linear or branched alkyl group having 1–30 carbon atoms; $B^8$, $B^{8'}$ and $B^{8''}$ independently denote a single bond, —O—, —COO— or —OCO—; $D^8$ is a linear or branched alkyl group having 1–20 carbon atoms; and $a^8$ is 1 or 2;

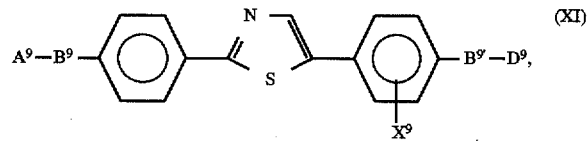

in which $A^9$ is a linear or branched alkyl group having 1–20 carbon atoms; $B^9$ and $B^{9'}$ independently denote a single bond, —O—, —COO— or —OCO—; $D^9$ is a linear or branched alkyl group having 1–20 carbon atoms; and $X^9$ is —H or —F;

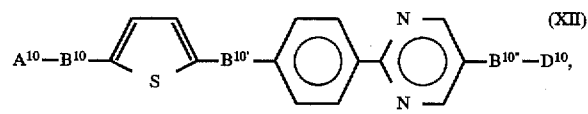

in which $A^{10}$ is a linear or branched alkyl group having 1–20 carbon atoms; $B^{10}$, $B^{10'}$ and $B^{10''}$ independently denote a single bond, —O—, —COO— or —OCO—; and $D^{10}$ is a linear or branched alkyl group having 1–20 carbon atoms;

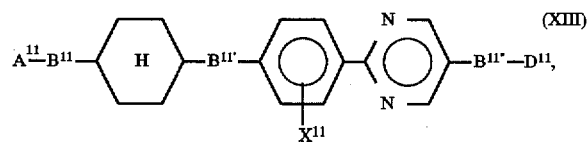

in which $A^{11}$ is a linear or branched alkyl group having 1–20 carbon atoms; $B^{11}$, $B^{11'}$ and $B^{11''}$ independently denote a single bond, —O—, —COO— or, —OCO—; $D^{11}$ is a linear or branched alkyl group having 1–20 carbon atoms; and $X^{11}$ is —H or —F;

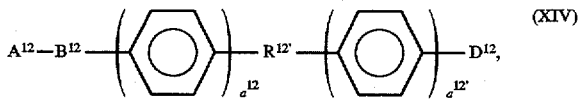

in which $A^{12}$ is a linear or branched alkyl group having 1–20 carbon atoms; $B^{12}$ and $B^{12'}$ independently denote a single bond, —O—, —COO— or —OCO—; $D^{12}$ is a cyano group; and $a^{12}$ and $a^{12'}$ are independently 1 or 2;

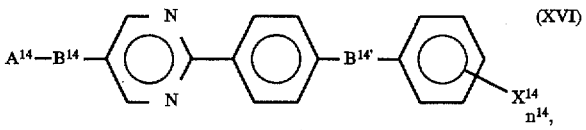

in which $A^{13}$ is a linear or branched alkyl group having 1–20 carbon atoms; $B^{13}$ and $B^{13'}$ independently denote a single bond, —O—, —COO— or —OCO—; and $D^{13}$ is a linear or branched alkyl group having 1–20 carbon atoms; and

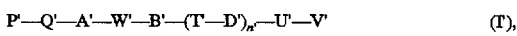

in which $A^{14}$ is a linear or branched alkyl group having 1–20 carbon atoms; $B^{14}$ and $B^{14'}$ independently denote a single bond, —O—, —COO— or —OCO—; $X^{14}$ is —F; and $n^{14}$ is an integer of 1–5.

2. A composition according to claim 1, which comprises at least 20 wt. % of a fluorine-containing mesomorphic compound (a).

3. A composition according to claim 1, which comprises at least 30 wt. % of a fluorine-containing mesomorphic compound (a).

4. A composition according to claim 1, which comprises at least 50 wt. % of a fluorine-containing mesomorphic compound (a).

5. A composition according to claim 1, which further comprises at least one compound represented by the following formula (T):

$$P'—Q'—A'—W'—B'—(T'—D')_{n'}—U'—V' \quad (T),$$

in which

A', B' and D' independently denote a substituted or unsubstituted ring structure selected from an aromatic ring, a heteroaromatic ring, a cycloaliphatic ring and a fused ring formed by at least two rings each selected from the group consisting of an aromatic ring, a heteroaromatic ring and a cycloaliphatic ring;

Q', W' and T' independently denote a single bond, —O—, —COO—, —OCO—, —C≡C—, —CONR"—, —NR"CO—, —NR"—, —CH$_2$—, —CH=N—, —N=CH—, —CH=CH—, —COS—, —SCO—, —CH$_2$CH$_2$—, —CH$_2$O— or —OCH$_2$— wherein R' is an alkyl group;

n' is 0, 1 or 2;

P' is substituted or unsubstituted alkyl group;

U' is —CO—$C_{m'}H_{2m'}$—, —O—$C_{m'}H_{2m'}$—O—, —OSO$_2$—, —SO$_2$O—, —$C_{m'}H_{2m'}$—SO$_2$—, —SO$_2$— or —SO$_2$—$C_{m'}H_{2m'}$— where m is an integer of 1–20; and V' is —$C_{p'}F_{2p'+1}$ where p' is an integer of 1–15.

6. A composition according to claim 1, which has a chiral smectic phase.

7. A liquid crystal device, comprising a liquid crystal composition according to claim 1.

8. A device according to claim 7, comprising a pair of opposite electrode plates and the liquid crystal composition disposed between the electrode plates.

9. A device according to claim 8, which further comprises an alignment control layer.

10. A device according to claim 9, wherein the alignment control layer comprises a polyimide having a recurring unit represented by the following formula (XVII):

$$\diagdown_{R_{21}}\diagup\begin{smallmatrix}CO\\\\CO\end{smallmatrix}\diagdown N-L_{21}-R_{22}-(L_{22})_a-N\diagup\begin{smallmatrix}CO\\\\CO\end{smallmatrix}\diagdown,\quad (XVII)$$

in which $R_{21}$ is

[structure: 1,4-phenylene or biphenylene] ;

$L_{21}$ and $L_{22}$ independently denote 1,4-phenylene;

$R_{22}$ is a single bond or —O—; and a is 0, 1 or 2.

11. A device according to claim 9, wherein the alignment control layer comprises a polyamide having a recurring unit represented by the following formula (XVIII):

$$+R_{31}-R_{32}-L_{31}-R_{33}-(L_{32})_b-R_{34}+, \quad (XVIII)$$

in which $R_{31}$ is 1,4-phenylene or an alkylene group having 1–20 carbon atoms;

$L_{31}$ and $L_{32}$ are independently

[structures: phenylene, biphenylene]

or an alkylene group having 1–20 carbon atoms:

$R_{32}$ and $R_{34}$ are independently —CONH— or —NHCO—;

$R_{33}$ is a single bond or —O—; and b is 0, 1 or 2.

12. A display method, comprising:

providing a liquid crystal composition according to claim 1; and controlling the alignment direction of liquid crystal molecules in accordance with image data to effect display.

13. A liquid crystal apparatus comprising a liquid crystal device according to claim 7.

14. An apparatus according to claim 13, wherein the liquid crystal device is a display device.

15. A liquid crystal composition, comprising:

a liquid crystal comprising one or at least two mesomorphic compounds, said liquid crystal (c) comprising at least one fluorine-containing mesomorphic compound (a) having smectic phase or latent smectic phase and represented by the following formula (I):

$$A+B\!\!\!\!+_a\!\!M+D\!\!\!\!+_b\!\!N+F\!\!\!\!+_c\!G-R, \quad (I)$$
$$\quad\;\;|\quad\;\;\;|\quad\;\;\;|$$
$$\quad\;Xl\quad Ym\quad Zn$$

in which

B, D and F independently denote

[structures shown]

a, b and c independently denote an integer of 0–3 with the proviso that a+b+c is at least 2;

M and N independently denote —COO—, —OCO—, —COS—, —SCO—, —COSe—, —SeCO—, —COTe—, —TeCO—, —(CH$_2$CH$_2$)$_d$ wherein d is an integer of 1–4, —CH=CH—, —C≡C—, —CH=N—, —N=CH—, —CH$_2$O—, —OCH$_2$—, —CO—, —O— or a single bond;

X, Y and Z independently denote —H, —Cl, —F, —Br, —I, —OH, —OCH$_3$, —CF$_3$, —OCF$_3$, —CH$_3$, —CN of —NO$_2$ and l, m and n independently denote an integer of 0–4;

G is —COO—C$_e$H$_{2e}$—, —O—C$_e$H$_{2e}$—, —C$_e$H$_{2e}$—, —OSOO—, —OOSO—, —SOO—, —SOOC$_e$H$_{2e}$—, —O(C$_e$H$_{2e}$—O)$_q$C$_e$H$_{2e'}$—, —C$_e$H$_{2e}$—N(C$_p$H$_{2p+1}$)—SO$_2$—, —C$_e$H$_{2e}$—N(C$_p$H$_{2p+1}$)—CO— wherein e and e' independently denote an integer of 1–20, q is an integer of 1–6 and p is an integer of 0–4;

A is a linear or branched group represented by —O(C$_f$H$_{2f}$)$_w$, O—C$_g$H$_{2g+1}$, (C$_f$H$_{2f}$—O)$_w$C$_g$H$_{2g+1}$, —C$_f$H$_{2f}$—R, —O—C$_f$H$_{2f}$—R', —COO—C$_f$H$_{2f}$—R', —OCO—C$_f$H$_{2f}$—R' wherein R' is —Cl, —F, —CF$_3$, —NO$_2$, —CN, —H, —COO—C$_{f'}$H$_{2f'+1}$ or —OCO—C$_{f'}$H$_{2f'+1}$ in which f, f' and g independently denote an integer of 1–20 and w is an integer of 1–10; and R is —(C$_x$F$_{2x}$O)$_z$C$_y$F$_{2y+1}$ wherein x is independently an integer of 1–10 for each C$_x$F$_{2x}$O group, y is an integer of 1–10, and z is an integer of 1–10; and at least one achiral compound (d) having a limit of solubility in the liquid crystal (c) and an enthalpy of fusion ($\Delta H$) of at least 25 J/g and represented by the following formula (II):

in which $\alpha^1$ and $a^2$ independently denote a linear or branched alkyl group having 1–20 carbon atoms, $\gamma^1$, $\gamma^2$ and $\gamma^3$ independently denote 1,4-phenylene capable of having one or two substituents comprising F, Cl, Br, $CH_3$, $CF_3$ and/or CN; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl, thiazole-2,5-diyl; thiadiazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$\beta^1$, $\beta^2$, $\beta^3$ and $\beta^4$ independently denote a single bond, —COO—, —OCO—, —COS—, —SCO—, —$CH_2O$—, —$OCH_2$—, —$CH_2CH_2$—, —CH=CH— or —C≡C; and a', b' and c' are independently an integer of 0–3 with the proviso that a'+b'+c' is at least 2, said liquid crystal composition containing said compound (d) in a proportion ranging from 20% of the limit of solubility to below the limit of solubility.

16. A composition according to claim 15, which has a chiral smectic phase.

17. A liquid crystal device, comprising a liquid crystal composition according to claim 15.

18. A device according to claim 17, comprising a pair of opposite electrode plates and the liquid crystal composition disposed between the electrode plates.

19. A device according to claim 18, which further comprises an alignment control layer.

20. A display method, comprising:

providing a liquid crystal composition according to claim 15; and controlling the alignment direction of liquid crystal molecules in accordance with image data to effect display.

21. A liquid crystal apparatus comprising a liquid crystal device according to claim 17.

22. A device according to claim 19, wherein one of said electrode plates has been subjected to a uniaxial alignment treatment.

23. A device according to claim 22, wherein said uniaxial alignment treatment is a rubbing treatment.

24. A liquid crystal composition, comprising: a liquid crystal comprising at least one mesomorphic compound having a mesomorphic phase free from cholesteric phase; and at least; one achiral compound (e) having a limit of solubility in the liquid crystal and an enthalpy of fusion ($\Delta H$) of at least 25 J/g and represented by the following formula (II):

$$\alpha^1-\beta^1-(\gamma^1)_a-\beta^2-(\gamma^2)_b-\beta^3-(\gamma^3)_c-\beta^4-\alpha^2 \quad (II),$$

in which $\alpha^1$ and $\alpha^2$ independently denote a linear or branched alkyl group having 1–20 carbon atoms, $\gamma^1$, $\gamma^2$ and $\gamma^3$ independently denote 1,4-phenylene capable of having one or two substituents comprising F, Cl, Br, $CH_3$, $CF_3$ and/or CN; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl, thiazole-2,5-diyl; thiadiazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$\beta^1$, $\beta^2$, $\beta^3$ and $\beta^4$ independently denote a single bond, —COO—, —OCO—, —COS—, —SCO—, —$CH_2O$—, —$OCH_2$—, —$CH_2CH_2$—, —CH=CH— or —C≡C; and a', b' and c' are independently an integer of 0–3 with the proviso that a'+b'+c' is at least 2, said liquid crystal composition containing said compound (e) in a proportion ranging from 20% of the limit of solubility to below the limit of solubility.

25. A composition according to claim 24, wherein the liquid crystal comprises at least one mesomorphic compound represented by the following formula (I):

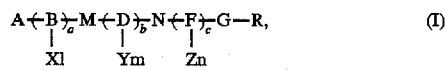

in which

B, D and F independently denote

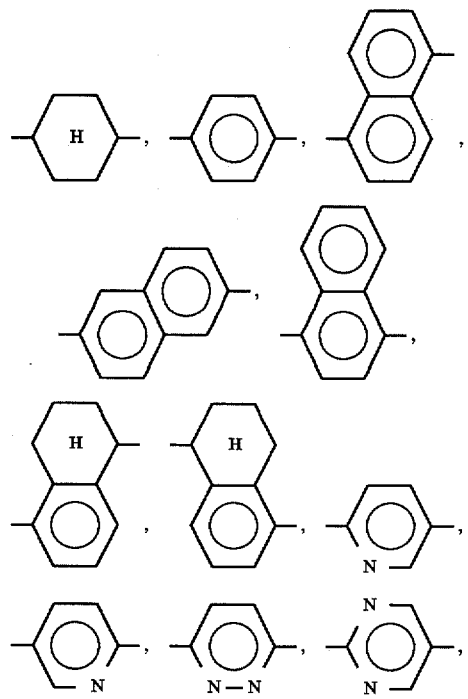

-continued

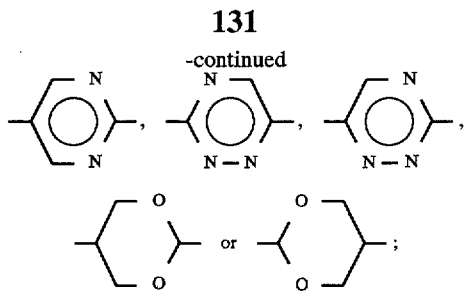

a, b and c independently denote an integer of 0–3 with the proviso that a+b+c is at least 2;

M and N independently denote —COO—, —OCO—, —COS—, —SCO—, —COSe—, —SeCO—, —COTe—, —TeCO—, —(CH$_2$CH$_2$)$_d$ wherein d is an integer of 1–4, —CH=CH—, —C≡C—, —CH=N—, —N=CH—, —CH$_2$O—, —OCH$_2$—, —CO—, —O— or a single bond;

X, Y and Z independently denote —H, —Cl, —F, —Br, —I, —OH, —OCH$_3$, —CN or —NO$_2$ and l, m and n independently denote an integer of 0–4;

G is —COO—C$_e$H$_{2e}$—, —O—C$_e$H$_{2e}$—, —C$_e$H$_{2e}$—, —OSOO—, —OOSO—, —SOO—, —SOOC$_e$H$_{2e}$—, —OC$_e$H$_{2e}$—OC$_e$H$_{2e'}$—, —C$_e$H$_{2e}$—N(C$_p$H$_{2p+1}$)—SO$_2$—, —C$_e$H$_{2e}$—N(C$_p$H$_{2p+1}$)—CO— wherein e and e' independently denote an integer of 1–20 and p is an integer of 0–4;

A is a linear or branched group represented by —O—C$_f$H$_{2f}$—O—C$_g$H$_{2g+1}$, —C$_f$H$_{2f}$—O—C$_g$H$_{2g+1}$, —C$_f$H$_{2f}$—R', O—C$_f$H$_{2f}$—R', —COO—C$_f$H$_{2f}$—R', —OCO—C$_f$H$_{2f}$—R' wherein R' is —Cl, —F, —CF$_3$, —NO$_2$, —CN, —H, —COO—C$_{f'}$H$_{2f'+1}$ or —OCO—C$_{f'}$H$_{2f'+1}$ in which f, f' and g independently denote an integer of 1–20; and R is —(C$_x$F$_{2x}$O)$_z$—C$_y$F$_{2y+1}$ wherein x is independently an integer of 1–10 for each C$_x$F$_{2x}$O group, y is an integer of 1–10, and z is an integer of 1–10.

26. A composition according to claim 24, wherein the liquid crystal comprises at least one mesomorphic compound represented by the following formula (I'):

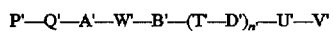

P'—Q'—A'—W'—B'—(T'—D')$_{n'}$—U'—V'  (I'), in which

A', B' and D' independently denote a substituted or unsubstituted ring structure selected from an aromatic ring, a heteroaromatic ring, a cycloaliphatic ring and a fused ring of these rings;

Q', W' and T' independently denote a single bond, —O—, —COO—, —OCO—, —C≡C—, —CONR''—, —NR''CO—, —NR''—, —CH$_2$—, —CH=N—, —N=CH—, —CH=CH—, —COS—, —SCO—, —CH$_2$CH$_2$—, —CH$_2$O— or —OCH$_2$— wherein R'' is an alkyl group;

n' is 0, 1 or 2;

P' is substituted or unsubstituted alkyl group;

U' is —CO—C$_m$H$_{2m'}$—, —O—C$_m$H$_{2m'}$—, —C$_m$H$_{2m'}$—, —C$_m$H$_{2m'}$—CO—, —C$_m$H$_{2m'}$—O—, —OSO$_2$—, —SO$_2$O—, —C$_m$H$_{2m'}$—SO$_2$—, —SO$_2$— or —SO$_2$—C$_m$H$_{2m'}$— where m is an integer of 1–20; and V' is —C$_p$F$_{2p'+1}$ where p' is an integer of 1–15.

27. A composition according to claim 24, wherein said compound (e) has an enthalpy of fusion (ΔH) of at least 25 J/g.

28. A composition according to claim 24, wherein said compound (e) has a phase transition temperature from isotropic phase to mesomorphic phase or from isotropic phase to crystal phase higher than a phase transition temperature of the liquid crystal from isotropic phase to smectic A phase.

29. A composition according to claim 24, which contains said compound (e) in a proportion ranging from 40% of the limit of solubility to below the limit of solubility.

30. A composition according to claim 24, which has a chiral smectic phase.

31. A liquid crystal device, comprising a liquid crystal composition according to claim 30.

32. A device according to claim 31, comprising a pair of opposite electrode plates and the liquid crystal composition disposed between the electrode plates.

33. A device according to claim 32, which further comprises an alignment control layer.

34. A device according to claim 33, wherein the alignment control layer comprises a polyimide having a recurring unit represented by the following formula (XVII):

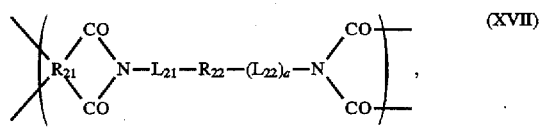

in which $R_{21}$ is

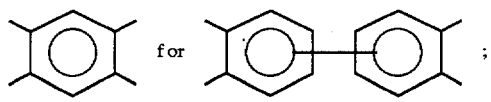

$L_{21}$ and $L_{22}$ independently denote 1,4-phenylene;

$R_{22}$ is a single bond or O; and a is 0, 1 or 2.

35. A device according to claim 33, wherein the alignment control layer comprises a polyamide having a recurring unit represented by the following formula (XVIII):

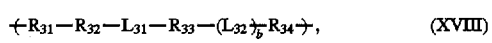

in which $R_{31}$ is 1,4-phenylene or an alkylene group having 1–20 carbon atoms;

$L_{31}$ and $L_{32}$ are independently

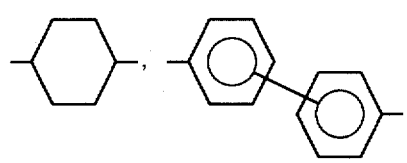

or an alkylene group having 1–20 carbon atoms:

$R_{32}$ and $R_{34}$ are independently —CONH— or —NHCO—;

$R_{33}$ is a single bond or —O—; and b is 0, 1 or 2.

36. A display method, comprising:

providing a liquid crystal composition according to claim 24; and controlling the alignment direction of liquid crystal molecules in accordance with image data to effect display.

37. A liquid crystal apparatus comprising a liquid crystal device according to claim 31.

38. An apparatus according to claim 37, wherein the liquid crystal device is a display device.

39. A device according to claim 33, wherein one of said electrode plates has been subjected to a uniaxial alignment treatment.

40. A device according to claim 39, wherein said uniaxial alignment treatment is a rubbing treatment.

41. A liquid crystal device, comprising: a pair of opposite electrode plates each provided with an alignment control layer, and a liquid crystal composition disposed between the electrode plates, wherein
one of the electrode plates has been subjected to a uniaxial alignment treatment, and
said liquid crystal composition comprises:
at least one fluorine-containing mesomorphic compound
(a) having smectic phase or latent smectic phase and represented by the following formula (I)

$$A\text{-}(B)_a\text{-}M\text{-}(D)_b\text{-}N\text{-}(F)_c\text{-}G\text{-}R, \quad (I)$$
$$\quad\quad | \quad\quad | \quad\quad |$$
$$\quad\quad Xl \quad\quad Ym \quad\quad Zn$$

in which
B, D and F independently denote

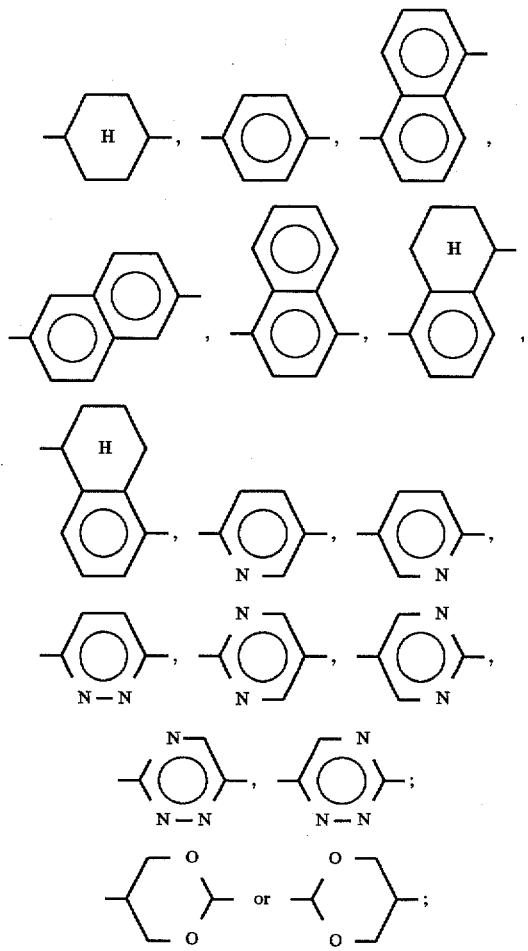

a, b and c independently denote an integer of 0–3 with the proviso that a+b+c is at least 2;
M and N independently denote —COO—, —OCO—, —COS—, —SCO—, —COSe—, —SeCO—, —COTe—, —TeCO—, —(CH$_2$CH$_2$)$_d$ wherein d is an integer of 1–4, —CH=CH—, —C≡C—, —CH=N—, —N=CH—, —CH$_2$O—, —OCH$_2$—, —CO—, —O— or a single bond;

X, V and Z independently denote —H, —Cl, —F, —Br, —I, —OH, —OCH$_3$, —CF$_3$, —OCF$_3$—, —CH$_3$, —CN or —NO$_2$ and l, m and n independently denote an integer of 0–4;

G is —COO—C$_e$H$_{2e}$—, —O—C$_e$H$_{2e}$—, —C$_e$H$_{2e}$—, —OSOO—, —OOSO—, —SOO—, —SOOC$_e$H$_{2e}$—, —O(C$_e$H$_{2e}$—O)$_q$C$_{e'}$H$_{2e'}$—, —C$_e$H$_{2e}$—N(C$_p$H$_{2p+1}$)—SO$_2$—, —C$_e$H$_{2e}$—N(C$_p$H$_{2p+1}$)—CO— wherein e and e' independently denote an integer of 1–20, q is an integer of 1–6 and p is an integer of 0–4;

A is a linear or branched group represented by —O(C$_f$H$_{2f}$)$_w$, O—C$_g$H$_{2g+1}$, (C$_f$H$_{2f}$—O)$_w$C$_g$H$_{2g+1}$, —C$_f$H$_{2f}$—R', —O—C$_f$H$_{2f}$—R', —COO—C$_f$H$_{2f}$—R', —OCO—C$_f$H$_{2f}$—R' wherein R' is —Cl, —F, —CF$_3$, —NO$_2$, —CN, —H, —COO—C$_f$H$_{2f+1}$ or —OCO—C$_f$H$_{2f+1}$ in which f, f' and g independently denote an integer of 1–20 and w is an integer of 1–10; and R is —(C$_x$F$_{2x}$O)$_z$C$_y$F$_{2y+1}$ wherein x is independently an integer of 1–10 for each C$_x$F$_{2x}$O group, y is an integer of 1–10, and z is an integer of 1–10; and at least one achiral compound (b) represented by the following formula (II):

$$\alpha^1\text{—}\beta^1\text{—}(\gamma^1)_{a'}\text{—}\beta^2\text{—}(\gamma^2)_{b'}\text{—}\beta^3\text{—}(\gamma^3)_{c'}\text{—}\beta^4\text{—}\alpha^2 \quad (II),$$

in which $\alpha^1$ and $\alpha^2$ independently denote a linear or branched alkyl group having 1–20 carbon atoms, $\gamma^1$, $\gamma^2$ and $\gamma^3$ independently denote 1,4-phenylene capable of having one or two substituents comprising F, Cl, Br, CH$_3$, CF$_3$ and/or CN; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl, thiazole-2,5-diyl; thiadiazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or alkylcoumaran-2,5-diyl having a linear or branched alkyl group having 1–18 carbon $\beta^1$, $\beta^2$, $\beta^3$ and $\beta^4$ independently denote a single bond, —COO—, —OCO—, —COS—, —SCO—, —CH$_2$O—, —OCH$_2$—, —CH$_2$CH$_2$—, —CH=CH— or —C≡C—; and a', b' and c' are independently an integer of 0–3 with the proviso that a'+b'+c' is at least 2.

42. A device according to claim 41, wherein the compound (a) of the formula (I) is a fluorine-containing mesomorphic compound represented by the following formula:

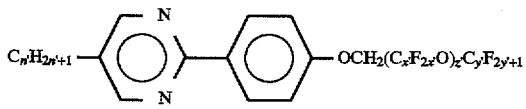

in which n' is an integer of 5–10, x' is independently an integer of 1–3 for each $C_{x'}F_{2x'}O$ group, y' is an integer of 1–4, and z' is an integer of 1–3.

43. A device according to claim 41, wherein the compound (b) is a mesomorphic compound represented by the following formula (III):

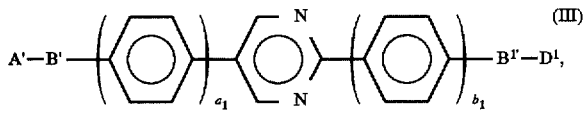

in which $A^1$ is a linear or branched alkyl group having 1–20 carbon atoms;

$B^1$ and $B^{1'}$ independently denote a single bond, —O—, —COO— or —OCO—;

$D^1$ is a linear or branched alkyl group having 1–20 carbon atoms or $-(C_2H_4O)_{n1}R^1$ wherein n1 is an integer of 1–5 and $R^1$ is a linear or branched alkyl group having 1–15 carbon atoms; and $a_1$ and $b_1$ are independently 0, 1 or 2 with the proviso that $a_1+b_1$ is at least 1.

44. A device according to claim 41, wherein the compound (b) is a mesomorphic compound represented by the following formula (IV):

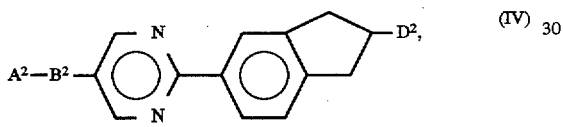

in which $A^2$ is a linear or branched alkyl group having 1–20 carbon atoms; $B^2$ is a single bond, —O—, —COO— or —OCO—; and $D^2$ is a linear or branched alkyl group having 1–20 carbon atoms.

45. A device according to claim 41, wherein the compound (b) is a mesomorphic compound represented by the following formula (V):

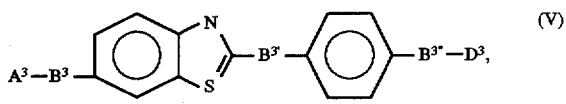

in which $A^3$ is a linear or branched alkyl group having 1–20 carbon atoms; $B^3$, $B^{3'}$ and $B^{3''}$ independently denote a single bond, —O—, —COO— or —OCO—; and $D^3$ is a linear or branched alkyl group having 1–20 carbon atoms.

46. A device according to claim 41, wherein the compound (b) is a mesomorphic compound represented by the following formula (VI):

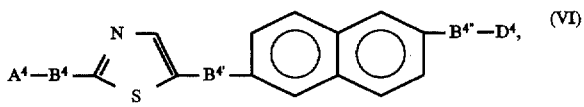

in which $A^4$ is a linear or branched alkyl group having 1–20 carbon atoms; $B^4$, $B^{4'}$ and $B^{4''}$ independently denote a single bond, —O—, —COO— or —OCO—; and $D^4$ is a linear or branched alkyl group having 1–20 carbon atoms.

47. A device according to claim 41, wherein the compound (b) is a mesomorphic compound represented by the following formula (VII):

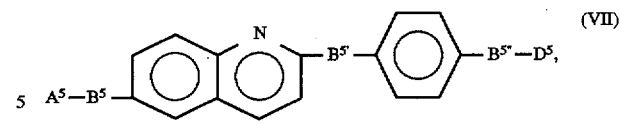

in which $A^5$ is a linear or branched alkyl group having 1–20 carbon atoms; $B^5$, $B^{5'}$ and $B^{5''}$ independently denote a single bond, —O—, —COO— or —OCO—; and $D^5$ is a linear or branched alkyl group having 1–20 carbon atoms.

48. A device according to claim 41, wherein the compound (b) is a mesomorphic compound represented by the following formula (VIII):

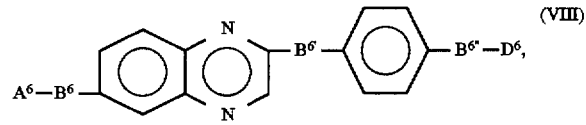

in which $A^6$ is a linear or branched alkyl group having 1–20 carbon atoms; $B^6$, $B^{6'}$ and $B^{6''}$ independently denote a single bond, —O—, —COO— or —OCO—; and $D^6$ is a linear or branched alkyl group having 1–20 carbon atoms.

49. A device according to claim 41, wherein the compound (b) is a mesomorphic compound represented by the following formula (IX):

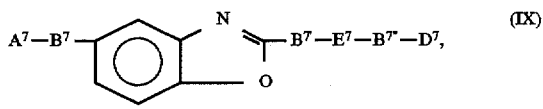

in which $A^7$ is a linear or branched alkyl group having 1–20 carbon atoms; $B^7$, $B^{7'}$ and $B^{7''}$ independently denote a single bond, —O—, —COO— or —OCO—; $D^7$ is a linear or branched alkyl group having 1–20 carbon atoms; and $E^7$ is 1,4-phenylene or 2,6-naphthylene.

50. A device according to claim 41, wherein the compound (b) is a mesomorphic compound represented by the following formula (X):

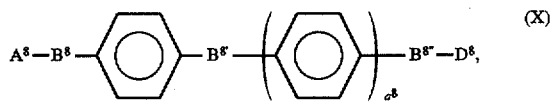

in which $A^8$ is a linear or branched alkyl group having 1–20 carbon atoms; $B^8$, $B^{8'}$ and $B^{8''}$ independently denote a single bond, —O—, —COO— or —OCO—; $D^8$ is a linear or branched alkyl group having 1–20 carbon atoms; and $a^8$ is 1 or 2.

51. A device according to claim 41, wherein the compound (b) is a mesomorphic compound represented by the following formula (XI):

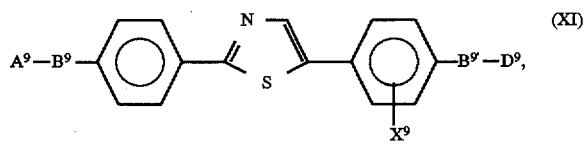

in which $A^9$ is a linear or branched alkyl group having 1–20 carbon atoms; $B^9$ and $B^{9'}$ independently denote a single bond, —O—, —COO— or —OCO—; $D^9$ is a linear or branched alkyl group having 1–20 carbon atoms; and $X^9$ is —H or —F.

52. A device according to claim 41, wherein the compound (b) is a mesomorphic compound represented by the following formula (XII):

$$A^{10}-B^{10}\diagup\hspace{-2pt}\underset{S}{\diagdown}-B^{10'}-\hspace{-2pt}\langle\bigcirc\rangle-\underset{N\diagdown}{\overset{N\diagup}{\langle\bigcirc\rangle}}-B^{10''}-D^{10}, \quad \text{(XII)}$$

in which $A^{10}$ is a linear or branched alkyl group having 1–20 carbon atoms; $B^{10}$, $B^{10'}$ and $B^{10''}$ independently denote a single bond, —O—, —COO— or —OCO—; and $D^{10}$ is a linear or branched alkyl group having 1–20 carbon atoms.

53. A device according to claim 41, wherein the compound (b) is a mesomorphic compound represented by the following formula (XIII):

$$A^{11}-B^{11}-\langle H\rangle-B^{11'}-\underset{\underset{X^{11}}{|}}{\langle\bigcirc\rangle}-\underset{N\diagdown}{\overset{N\diagup}{\langle\bigcirc\rangle}}-B^{11''}-D^{11}, \quad \text{(XIII)}$$

in which $A^{11}$ is a linear or branched alkyl group having 1–20 carbon atoms; $B^{11}$, $B^{11'}$ and $B^{11''}$ independently denote a single bond, —O—, —COO— or —OCO—; $D^{11}$ is a linear or branched alkyl group having 1–20 carbon atoms; and $X^{11}$ is —H or —F.

54. A device according to claim 41, wherein the compound (b) is a mesomorphic compound represented by the following formula (XIV):

$$A^{12}-B^{12}-(\langle\bigcirc\rangle)_{a^{12}}-B^{12'}-(\langle\bigcirc\rangle)_{a^{12'}}-D^{12}, \quad \text{(XIV)}$$

in which $A^{12}$ is a linear or branched alkyl group having 1–20 carbon atoms; $B^{12}$ and $B^{12'}$ independently denote a single bond, —O—, —COO— or —OCO—; $D^{12}$ is a cyano group; and $a^{12}$ and $a^{12'}$ are independently 1 or 2.

55. A device according to claim 41, wherein the compound (b) is a mesomorphic compound represented by the following formula (XV):

$$A^{13}-B^{13}-\langle\bigcirc\rangle-\diagup\hspace{-2pt}\underset{S}{\diagdown}-\langle\bigcirc\rangle-B^{13'}-D^{13}, \quad \text{(XV)}$$

in which $A^{13}$ is a linear or branched alkyl group having 1–20 carbon atoms; $B^{13}$ and $B^{13'}$ independently denote a single bond, —O—, —COO— or —OCO—; and $D^{13}$ is a linear or branched alkyl group having 1–20 carbon atoms.

56. A device according to claim 41, wherein the compound (b) is a mesomorphic compound represented by the following formula (XVI):

$$A^{14}-B^{14}-\underset{N\diagdown}{\overset{N\diagup}{\langle\bigcirc\rangle}}-\langle\bigcirc\rangle-B^{14'}-\langle\bigcirc\rangle_{X_n^{14}}, \quad \text{(XVI)}$$

in which $A^{14}$ is a linear or branched alkyl group having 1–20 carbon atoms; $B^{14}$ and $B^{14'}$ independently denote a single bond, —O—, —COO— or —OCO—; $X^{14}$ is —F; and $n^{14}$ is an integer of 1–5.

57. A device according to claim 41, which comprises at least 20 wt. % of a fluorine-containing mesomorphic compound (a).

58. A device according to claim 41, which comprises at least 30 wt. % of a fluorine-containing mesomorphic compound (a).

59. A device according to claim 41, which comprises at least 50 wt. % of a fluorine-containing mesomorphic compound (a).

60. A device according to claim 41, which further comprises at least one compound represented by the following formula (T'):

$$P'—Q'—A'—W'—B'—(T'—D')_{n'}U'—V' \quad \text{(T')},$$

in which

A', B' and D' independently denote a substituted or unsubstituted ring structure selected from an aromatic ring, a heteroaromatic ring, a cycloaliphatic ring and a fused ring formed by at least two rings each selected from the group consisting of an aromatic ring, a heteroaromatic ring and a cycloaliphatic ring;

Q', W' and T' independently denote a single bond, —O—, —COO—, —OCO—, —C≡C—, —CONR"—, —NR"CO—, —NR"—, —CH$_2$—, —CH—N—, —N=CH—, —CH=CH—, —COS—, —SCO—, —CH$_2$CH$_3$—, —CH$_2$O— or —OCH$_2$— wherein R' is an alkyl group;

n' is 0, 1 or 2;

P' is substituted or unsubstituted alkyl group;

U' is —CO—C$_m$H$_{2m'}$—, —O—C$_m$H$_{2m'}$—, —C$_m$H$_{2m'}$—, —C$_m$H$_{2m'}$·CO—, —C$_m$H$_{2m'}$·O—, —OSO$_2$—, —SO$_2$O—, —C$_m$H$_{2m'}$—SO$_2$—, —SO$_2$— or —SO$_2$—C$_m$H$_{2m'}$— where m is an integer of 1–20; and V' is —C$_p$F$_{2p'+1}$ where p' is an integer of 1–15.

61. A device according to claim 41, which has a composition with a chiral smectic phase.

62. A device according to claim 41, which further comprises an alignment control layer, wherein the alignment control layer comprises a polyimide having a recurring unit represented by the following formula (XVII):

$$\left[\begin{array}{c}\diagup\overset{CO}{\diagdown}\\R_{21}\phantom{xx}N-L_{21}-R_{22}-(L_{22})_a-N\\\diagdown\underset{CO}{\diagup}\end{array}\overset{CO}{\diagdown}\underset{CO}{\diagup}\right], \quad \text{(XVII)}$$

in which $R_{21}$ is $$\langle\bigcirc\rangle \quad \text{or} \quad \langle\bigcirc\rangle-\langle\bigcirc\rangle \quad ;$$

$L_{21}$ and $L_{22}$ independently denote 1,4-phenylene;

$R_{22}$ is a single bond or —O—; and a is 0, 1 or 2.

63. A device according to claim 41, wherein the alignment control layer comprises a polyamide having a recurring unit represented by the following formula (XVIII):

$$+R_{31}-R_{32}-L_{31}-R_{33}-(L_{32})_b-R_{34}+, \quad \text{(XVIII)}$$

in which $R_{31}$ is 1,4-phenylene or an alkylene group having 1–20 carbon atoms;

$L_{31}$ and $L_{32}$ are independently
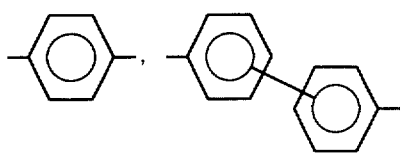
or an alkylene group having 1–20 carbon atoms:
$R_{32}$ and $R_{34}$ are independently —CONH— or —NHCO—;
$R_{33}$ is a single bond or —O—; and
b is 0, 1 or 2.
64. A device according to claim 41, wherein said uniaxial alignment treatment is a rubbing treatment.
* * * * *

UNITED STATES PATENT AND TRADEMARK OFFICE
CERTIFICATE OF CORRECTION

PATENT NO. : 5,688,437

DATED : November 18, 1997

INVENTOR(S): KOICHI SATO ET AL.  Page 1 of 12

It is certified that error appears in the above-identified patent and that said Letters Patent is hereby corrected as shown below:

ON THE TITLE PAGE AT [56]
  FOREIGN PATENT DOCUMENTS, "93/22396   11/1993   WIPO." should be deleted.

ON THE TITLE PAGE AT [56]
  OTHER PUBLICATIONS, After Epstein et al., "Internal" should read --International--;

ON THE TITLE PAGE AT [56]
  OTHER PUBLICATIONS, After Epstein et al. . . . . Conference, "p. 46" should read --P-46--.

ON THE TITLE PAGE AT [57] IN THE ABSTRACT
  Line 11, "a the" should read --the--;
  Line 12, "(e)," should read --(e)--.

COLUMN 1
  Line 21, "when" should read --when it--;
  Line 37, "use" should be deleted;
  Line 50, "uses" should read --use--;
  Line 52, "milli-seconds" should read --milliseconds--.

COLUMN 2
  Line 42, "of" should read --of the--;
  Line 59, "just" should read --only just been--;
  Line 64, "Internal" should read --International--.

UNITED STATES PATENT AND TRADEMARK OFFICE
CERTIFICATE OF CORRECTION

PATENT NO. : 5,688,437

DATED : November 18, 1997

INVENTOR(S) : KOICHI SATO ET AL.

Page 2 of 12

It is certified that error appears in the above-identified patent and that said Letters Patent is hereby corrected as shown below:

COLUMN 8
Line 3, "$C_fH_{2f+1}$ or $-OCO-C_fH_{2f+1}$" should read --$C_fH_{2f+1}$ or $-OCO-C_fH_{2f+1}$--;
Line 14, "descried" should read --described--.

COLUMN 11
Line 41, delete "there has been known that";
Line 42, delete "a temperature where a layer spacing exceeds that";
Line 64, "$\alpha^L-\beta_1$-" should read --$\alpha^L-\beta^L-$ --.

COLUMN 12
Line 20, "atom" should read --atoms--.
Line 27, "$-C\equiv C$" should read -- $-C\equiv C-$ --.

COLUMN 16
Line 22, 23, "$-O(-CH_2)_6-\overset{CH_3}{\underset{|}{C}}HC_2H_5$" should read -- $-O(-CH_2)_5-\overset{CH_3}{\underset{|}{C}}HC_2H_5$ --;

UNITED STATES PATENT AND TRADEMARK OFFICE
CERTIFICATE OF CORRECTION

PATENT NO. : 5,688,437

DATED : November 18, 1997

INVENTOR(S) : KOICHI SATO ET AL.

It is certified that error appears in the above-identified patent and that said Letters Patent is hereby corrected as shown below:

COLUMN 16

Line 27, 28, " $-(CH_2)_6-CH(CH_3)C_3H_7$ " should read -- $-(CH_2)_5-CH(CH_3)C_3H_7$ --.

COLUMN 20

Line 13, "$C_8H_{16}-$" should read --$C_8H_{17}-$--.

COLUMN 30

Line 43, "$-B^{3'}-D^3$" should read -- $-B^{3''}-D^3$--.

COLUMN 47

Line 15, "$C_6F_{13}-$" should read --$C_6H_{13}-$--;
Line 21, "$C_8F_{17}$" should read --$C_8H_{17}$--;
Line 27, "$C_{10}F_{21}$" should read --$C_{10}H_{21}$--.

COLUMN 49

Line 48, "$C_{12}H_{26}O$" should read --$C_{12}H_{25}O$--.

COLUMN 51

Line 55, "$C_{12}H_{26}$" should read --$C_{12}H_{25}$--.

UNITED STATES PATENT AND TRADEMARK OFFICE
CERTIFICATE OF CORRECTION

PATENT NO. : 5,688,437

DATED : November 18, 1997

INVENTOR(S): KOICHI SATO ET AL.

It is certified that error appears in the above-identified patent and that said Letters Patent is hereby corrected as shown below:

COLUMN 52
Line 41, "—$C_{12}H_{26}$" should read -- —$C_{12}H_{25}$--.

COLUMN 53
Line 29, "$C_{12}H_{26}$" should read --$C_{12}H_{25}$--.

COLUMN 54
Line 32, "$C_{12}H_{26}$" should read --$C_{12}H_{25}$--.

COLUMN 56
Line 47, "$B^{11}$" should read --$B^{8*}$--.
Line 54, "(1973))" should read --(1973)--.

COLUMN 57
Line 7, "—$OC_2$—$C_4H_9$" should read -- —$CO_2$—$C_4H_9$--;
Line 12, "—$OC_2$—$C_{12}H_{25}$" should read -- —$CO_2$—$C_{12}H_{25}$--;
Line 57, "$C_4H_{19}$—" should read --$C_4H_9$— --.

COLUMN 61
Line 2, "$C_6H_{11}$—" should read --$C_5H_{11}$— --.

COLUMN 62
Line 2, "$C_6H_{11}$—" should read --$C_5H_{11}$— --.

UNITED STATES PATENT AND TRADEMARK OFFICE
CERTIFICATE OF CORRECTION

PATENT NO. : 5,688,437
DATED : November 18, 1997
INVENTOR(S) : KOICHI SATO ET AL.

Page 5 of 12

It is certified that error appears in the above-identified patent and that said Letters Patent is hereby corrected as shown below:

COLUMN 69
Lines 1-57, should read

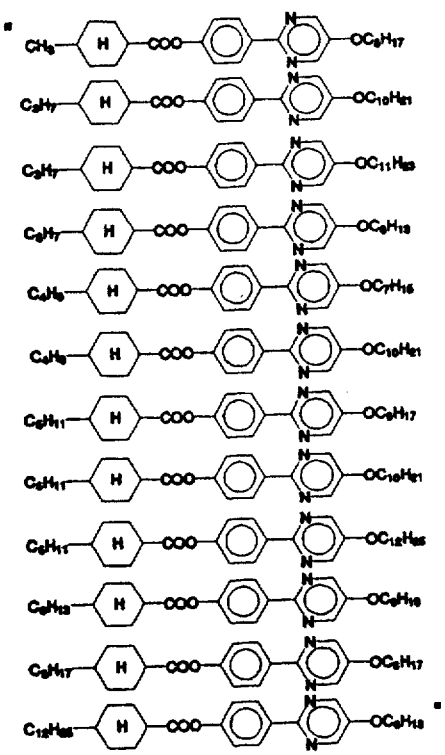 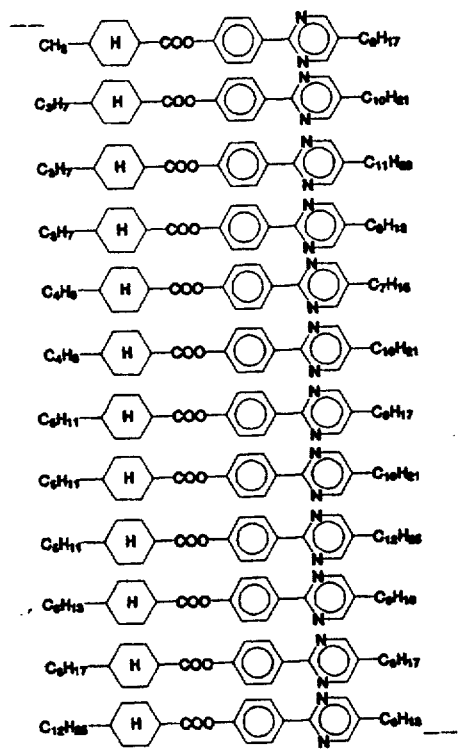

UNITED STATES PATENT AND TRADEMARK OFFICE
CERTIFICATE OF CORRECTION

PATENT NO. : 5,688,437

DATED : November 18, 1997

INVENTOR(S): KOICHI SATO ET AL.

It is certified that error appears in the above-identified patent and that said Letters Patent is hereby corrected as shown below:

COLUMN 71
Line 6, "(1976))" should read --(1976)--.

COLUMN 72
Line 16, "$C_8H_{13}O-$" should read --$C_8H_{17}O-$ --;
Line 27, "--$B^{13"}$--" should read ----$B^{13'}$-- --.

COLUMN 74
Line 43, "$X_n14^{14}$" should read -- $X_n14^{14}$ --;
Line 52, "corn" should read --corr.--.

COLUMN 77
Line 22, "$C_8H_{17}-$" should read --$C_8H_{17}O-$ --.

COLUMN 84
Line 21, "R'" should read --R"--;
Line 32, "descried" should read --described--.

COLUMN 85
Compound I'-11, "$C_6F_{11}CH_2O-$" should read --$C_5F_HCH_2O-$ --.

COLUMN 91
Compound I'-48, "$C_6F_{11}CH_2O-$" should read --$C_5F_{11}CH_2O-$ --.

COLUMN 97
Line 18, "descried" should read --described--;
Line 42, "ia" should read --a--.

UNITED STATES PATENT AND TRADEMARK OFFICE
CERTIFICATE OF CORRECTION

PATENT NO. : 5,688,437

DATED : November 18, 1997

INVENTOR(S): KOICHI SATO ET AL.

It is certified that error appears in the above-identified patent and that said Letters Patent is hereby corrected as shown below:

COLUMN 98
  Line 31, "forms" should read --form--;
  Line 61, "may" should read --may be--.

COLUMN 102
  Line 55, "an" should read --a--.

COLUMN 105

Line 1-4 "  " should read --  --;

Line 50, "such a a" should read --such as a--.

COLUMN 106
  Line 65, "(°C.)))" should read --(°C.))--.

COLUMN 107
  Line 53, "bank" should read --blank--.

COLUMN 109
  Line 18, "once" should read --being--;
  Line 55, "once" should read --being--.

UNITED STATES PATENT AND TRADEMARK OFFICE
CERTIFICATE OF CORRECTION

PATENT NO. : 5,688,437

DATED : November 18, 1997

INVENTOR(S) : KOICHI SATO ET AL.

It is certified that error appears in the above-identified patent and that said Letters Patent is hereby corrected as shown below:

COLUMN 110
   Line 23, "once" should read --being--;
   Line 56, "once" should read --being--.

COLUMN 111
   Line 24, "once" should read --being--;
   Line 57, "once" should read --being--.

COLUMN 112
   Line 24, "once" should read --being--;
   Line 55, "once" should read --being--.

COLUMN 113
   Line 31, "once" should read --being--;
   Line 65, "once" should read --being--.

COLUMN 114
   Line 31, "once" should read --being--;
   Line 63, "once" should read --being--.

COLUMN 115
   Line 29, "once" should read --being--.

COLUMN 116
   Line 19, "once" should read --being--;
   Line 46, "once" should read --being--;
   Line 50, "once" should read --being--;
   Line 56, "was" should read --of--.

UNITED STATES PATENT AND TRADEMARK OFFICE
CERTIFICATE OF CORRECTION

PATENT NO. : 5,688,437

DATED : November 18, 1997

INVENTOR(S): KOICHI SATO ET AL.

It is certified that error appears in the above-identified patent and that said Letters Patent is hereby corrected as shown below:

COLUMN 117
  Line 19, "this" should read --these--;
  Line 58, "an c.a." should read --a ca.--.

COLUMN 118
  Line 56, "silan" should read --silane--.

COLUMN 120
  Line 1, "Lw/Lb" should read --Iw/Ib--;
  Line 11, "an c.a." should read --a ca.--;
  Line 30, "18)" should read --18--;
  Line 52, "an c.a." should read --a ca.--

COLUMN 121
  Line 2, "silan" should read --silane--;
  Line 3, "(ODS-E)" should read --(ODS-E))--.

COLUMN 123
  Line 55, "—OR" should read ---OH--;
  Line 60 "—O($C_eH_{2e}$-O)$_9$ $C_eH_{2e}$." should read ---O($C_eH_{2e}$-O)$_9$ $C_eH_{2e}$— --.

COLUMN 124
  Line 1, "$C_FH_{2F+1}$" should read --$C_{F'}H_{2F'+1}$--;
  Line 2, "$C_FH_{2F+1}$" should read --$C_{F'}H_{2F'+1}$--.
  Line 12, "$R^2$" should read --$D^2$--.

Line 23-25 "  " should read --  --.

UNITED STATES PATENT AND TRADEMARK OFFICE
CERTIFICATE OF CORRECTION

PATENT NO. : 5,688,437

DATED : November 18, 1997

INVENTOR(S): KOICHI SATO ET AL.

It is certified that error appears in the above-identified patent and that said Letters Patent is hereby corrected as shown below:

COLUMN 125
Line 19, "1-30" should read --1-20--.

COLUMN 126
Line 48, "R'" should read --R"--;
Line 52, "—O—," should read -- —$C_{m'}H_{2m'}$—, —$C_{m'}H_{2m'}$—CO—, —$C_{m'}H_{2m'}$—O—,--.

COLUMN 128
Line 50, "of" should read --or--;
Line 62, "$C_FH_{2F+1}$" should read --$C_{F'}H_{2F'+1}$--;
Line 63, "$C_FH_{2F+1}$" should read --$C_{F'}H_{2F'+1}$--.

COLUMN 129
Line 5, after "formula (II)" add --$\alpha^1$—$\beta^1$—$(\gamma^1)_a$, —$\beta^2$—$(\gamma^2)_b$, —$\beta^3$—$(\gamma^3)_c$, —$\beta^4$—$\alpha^2$ (II),--;
Line 7, "a²" should read --$\alpha^2$--;
Line 21, "atom" should read --atoms--;
Line 27, "—C≡C" should read -- —C≡C— --;
Line 59, "least;" should read --least--.
Line 65, "--$(\gamma^1)_n$—" should read -- —$(\gamma^1)_a$—--.

COLUMN 130
Line 12, "quinoline-2," should read --quinoline-2,6-diyl;--;
Line 13, "6-naphthylene" should read --2,6-naphthylene--;
Line 15, "atom" should read --atoms--;
Line 23, "—C≡C" should read -- —C≡C— --.

UNITED STATES PATENT AND TRADEMARK OFFICE
CERTIFICATE OF CORRECTION

PATENT NO. : 5,688,437

DATED : November 18, 1997

INVENTOR(S): KOICHI SATO ET AL.

It is certified that error appears in the above-identified patent and that said Letters Patent is hereby corrected as shown below:

COLUMN 131
   Line 34, "$C_FH_{2f+1}$" should read --$C_{F'}H_{2F'+1}$--;
   Line 35, "$C_FH_{2f+1}$" should read --$C_{F'}H_{2F'+1}$--;
   Line 56, "R'" should read --R"--.

COLUMN 132

Line 33, "f or" should read --or--.

COLUMN 134
   Line 5, "V" should read --Y--;
   Line 20, "$C_FH_{2F+1}$" should read --$C_{F'}H_{2F'+1}$--;
   Line 21, "$C_FH_{2F+1}$" should read --$C_{F'}H_{2F'+1}$--;
   Line 44, "naphthylene" should read --2,6-naphthylene--;
   Line 46, "atom" should read --atoms--;
   Line 54, "−C≡C" should read -- —C≡C— --.

COLUMN 135
   Line 10, "A'—B'—" should read --$A^L$—$B^L$— --.

UNITED STATES PATENT AND TRADEMARK OFFICE
CERTIFICATE OF CORRECTION

PATENT NO. : 5,688,437

DATED : November 18, 1997

INVENTOR(S): KOICHI SATO ET AL.

It is certified that error appears in the above-identified patent and that said Letters Patent is hereby corrected as shown below:

COLUMN 137
  Line 43, "—$B^{13"}$—" should read -- —$B^{13'}$— --;
  Line 56, "$X_n14^{14}$" should read -- $X_n14^{14}$ --.

COLUMN 138
  Line 24, "—$CH_2CH_3$—" should read -- —$CH_2CH_2$— --, and "R'" should read --R"--.

Signed and Sealed this

Thirteenth Day of October 1998

Attest:

BRUCE LEHMAN

Attesting Officer        Commissioner of Patents and Trademarks